(12) United States Patent
Murthy et al.

(10) Patent No.: US 12,743,424 B1
(45) Date of Patent: Sep. 22, 2026

(54) VERIFICATION OF EXECUTION OF NATURAL LANGUAGE DATA ANALYTICS REQUESTS

(71) Applicant: Isotopes AI, Inc., Palo Alto, CA (US)

(72) Inventors: Arun Chikkatur Murthy, Palo Alto, CA (US); Gopal Vijayaraghavan, South San Francisco, CA (US); Sunil Govindan, Fremont, CA (US); Prasanth Jayachandran, San Jose, CA (US); Vivek Ratnavel Subramanian, San Jose, CA (US)

(73) Assignee: Isotopes AI, Inc., Palo Alto, CA (US)

( * ) Notice: Subject to any disclaimer, the term of this patent is extended or adjusted under 35 U.S.C. 154(b) by 0 days.

(21) Appl. No.: 19/570,041

(22) Filed: Mar. 17, 2026

(51) Int. Cl.
*G06F 16/24* (2019.01)
*G06F 16/2453* (2019.01)

(52) U.S. Cl.
CPC .............................. *G06F 16/24542* (2019.01)

(58) Field of Classification Search
CPC ........... G06F 16/24542; G06F 16/2455; G06F 16/243
See application file for complete search history.

(56) References Cited

U.S. PATENT DOCUMENTS 12,443,595 B1 * 10/2025 Sehwag .............. G06F 16/2425
2022/0414228 A1 * 12/2022 Difonzo ................ G06F 40/169
2023/0169074 A1 * 6/2023 Kim ...................... G06F 40/247 704/9
2026/0080084 A1 * 3/2026 Padmanabhan ..... G06F 21/6218

* cited by examiner

*Primary Examiner* — Loc Tran
(74) *Attorney, Agent, or Firm* — Fenwick & West LLP

(57) ABSTRACT

A system performs verification of results of natural language data analytics requests using a machine learning based language model. The system generates an execution plan comprising ordered data processing steps to produce an analytical result. The system traverses the execution plan in reverse, and for each step, identifies applicable invariants from a seed library or by generating new ones, produces structured query input describing the step and invariants, and uses the language model to generate executable verification code. The verification code is executed on step inputs/outputs to determine invariant satisfaction without exposing raw data to the model. Discrepancies are localized to specific steps, correlated with possible root causes, and presented in a detailed verification report with lineage and metrics. The system provides metadata-driven, privacy-preserving, explainable verification of AI-generated analytics, enabling detection of errors and ensuring correctness across complex multi-source analytical workflows.

20 Claims, 25 Drawing Sheets

FIG. 12E
Verification Passed
Quality: 100%
Result
Key total amount ~ 106.09
Pipeline: 5 → 4 steps → 5 rows
Plan Objective:
There were 5 invoices, and in the final outcome, there are only 2 of them. Verify what happened and explain.
How We Got This Result:
The pipeline parsed 5 invoice PDFs in Step 2, but filtered to only those dated May 2025, resulting in 2 invoices in invoices_df. Step 3 standardized these 2 invoices. Step 4 reconciled them to QBO, producing 1 match and 1 unmatched. The reduction from 5 to 2 is due to the date filter in Step 2. The verification plan traces this lineage and checks that all 5 input invoices are accounted for, and explains which were filtered out and why.
Verification Checks
7/7 passed
Steps
4
Checks Passed
7 / 7
Data Coverage
100 %
View Full Lineage Details
Exporting...

Critical Metrics Progression

| Metric | Step 2<br>Extract invoice data... | Step 3<br>Standardize and clea... | Step 5<br>Summarize reconcilia... |
|---|---|---|---|
| amount | 106.09 | 106.09 | 77.09 |

Pipeline Data Flow

Extract invoice data
2

Standardize and clean invo...
26

Reconcile invoices t...
2

Summarize reconcilia...
5

Step 5: Summarize reconciliation findings

OPERATION TYPE aggregate

ROW COUNT 5 rows

WHAT CHANGED

The aggregation grouped reconciliation results into summary categories, providing counts and total amounts for each. All required columns are present and complete, and the output matches the expected cardinality.

INPUT 1 matched invoice (matches_df), 1 unmatched invoice (unmatched_df), summary stats.

OUTPUT 5 rows in reconciliation_summary_df (categories: match/unmatch types, summary of unmatched invoices).

KEY METRICS

| | |
|---|---|
| rows in | 2 |
| rows out | 5 |
| groupby | category |

FIG. 12F

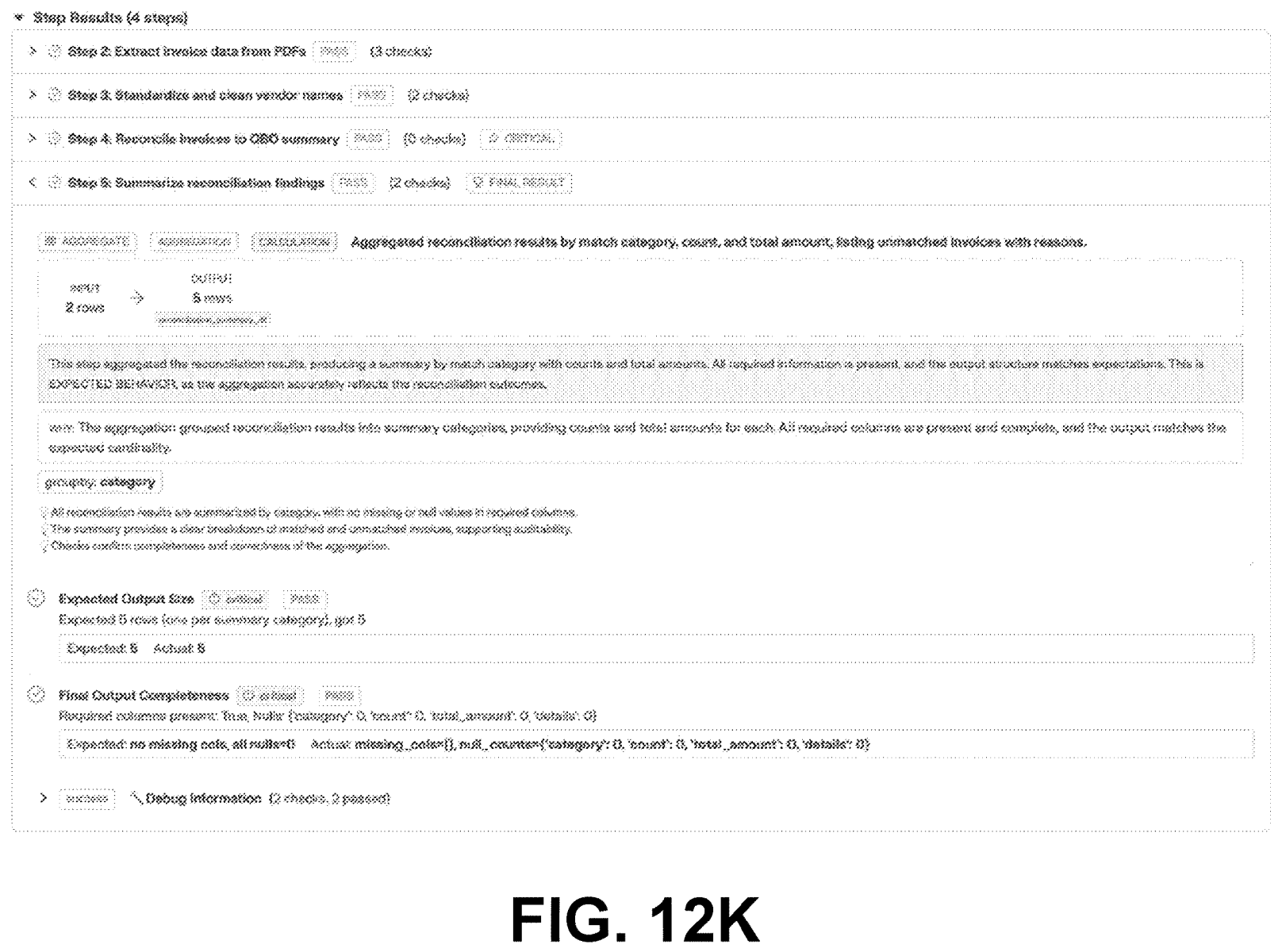

Step Results (4 steps)

> Step 2: Extract invoice data from PDFs PASS (3 checks)

> Step 3: Standardize and clean vendor names PASS (2 checks)

> Step 4: Reconcile invoices to CBO summary PASS (0 checks) CRITICAL

Step 5: Summarize reconciliation findings PASS (2 checks) FINAL RESULT

AGGREGATE AGGREGATION CALCULATION Aggregated reconciliation results by match category, count, and total amount, listing unmatched invoices with reasons.

INPUT 2 rows → OUTPUT 5 rows

This step aggregated the reconciliation results, producing a summary by match category with counts and total amounts. All required information is present, and the output structure matches expectations. This is EXPECTED BEHAVIOR, as the aggregation accurately reflects the reconciliation outcomes.

The aggregation grouped reconciliation results into summary categories, providing counts and total amounts for each. All required columns are present and complete, and the output matches the expected cardinality.

groupby: category

- All reconciliation results are summarized by category, with no missing or null values in required columns.
- The summary provides a clear breakdown of matched and unmatched invoices, supporting auditability.
- Checks confirm completeness and correctness of the aggregation.

Expected Output Size critical PASS

Expected 5 rows (one per summary category), got 5

Expected: 5 Actual: 5

Final Output Completeness critical PASS

Required columns present: True, Nulls: {'category': 0, 'count': 0, 'total_amount': 0, 'details': 0}

Expected: no missing cols, all nulls=0 Actual: missing_cols=[], null_counts={'category': 0, 'count': 0, 'total_amount': 0, 'details': 0}

> Debug Information (2 checks, 2 passed)

FIG. 12K

VERIFICATION OF EXECUTION OF NATURAL LANGUAGE DATA ANALYTICS REQUESTS

TECHNICAL FIELD

One or more aspects described herein relate generally to artificial intelligence, and more specifically to verifying results generated by data analytics processes using machine learning-based language models, such as large language models.

BACKGROUND

Organizations generate large amounts of data, for example, data describing transactions, events generated by various systems, logs generated by various platforms, sensor data generated by IoT (Internet of Things) devices, and so on. The data generated is typically stored in heterogeneous systems using various formats, for example, in files, relational databases, documents, transaction logs, and so on. Organizations generate analytics reports based on such data to gain insights into the data. These analytics are often produced from heterogeneous data sources, such as relational databases, data warehouses, document stores, spreadsheets, CSV files, logs, or sensor feeds, and involve complex multi-step data processing pipelines include steps such as data cleansing, joins, aggregations, filtering, and transformations. While systems can generate such data processing pipelines, the correctness of the resulting insights is typically not guaranteed. Errors such as incorrect joins, unintended data loss, misuse of aggregation formulas, improper filtering, or policy violations may go undetected until a human manually reviews the process. However, such manual verification is slow, costly, and prone to oversight. This results in significant risks, for example, incorrect results can lead to flawed strategies, regulatory non-compliance, and erosion of trust in the system.

SUMMARY

In accordance with one or more aspects, a system, for example, an online system performs verification of data analytics results generated using data analytics pipelines. The system receives a natural language data analytics request based on data stored in one or more data sources. The system generates an execution plan that includes a plurality of ordered data processing steps for producing an analytical result from the request, with each step defined by its input data, output data, and associated metadata. The system then verifies execution of the plan by traversing it in reverse order, starting from the analytical result and moving back toward the steps that retrieve the original data. For each step encountered during this reverse traversal, the system identifies a set of invariants applicable to that step, where each invariant specifies expected properties or relationships between the step's input and output data. The system generates a structured query input describing the step's metadata and the identified invariants, and provides this input to a machine learning based language model. The system uses the language model to generate executable verification code from the structured input and executes that code to determine whether the step satisfies the identified invariants. The system detects any discrepancies between expected and actual outputs for each step in the plan, enabling accurate validation of the multi-step analytics process.

Embodiments of the invention include computer-implemented methods described herein, non-transitory computer readable storage media storing instructions for performing steps of the methods disclosed herein, and systems comprising one or more computer processors and computer readable non-transitory storage medium to perform steps of the computer-implemented methods disclosed herein.

BRIEF DESCRIPTION OF THE DRAWINGS

FIG. 12F depicts a detailed step view combining critical metrics progression, pipeline flow, and step-specific metadata.

FIG. 12K provides a consolidated step-results panel with pass/fail indicators and a narrative for the final aggregation.

Figure 1:
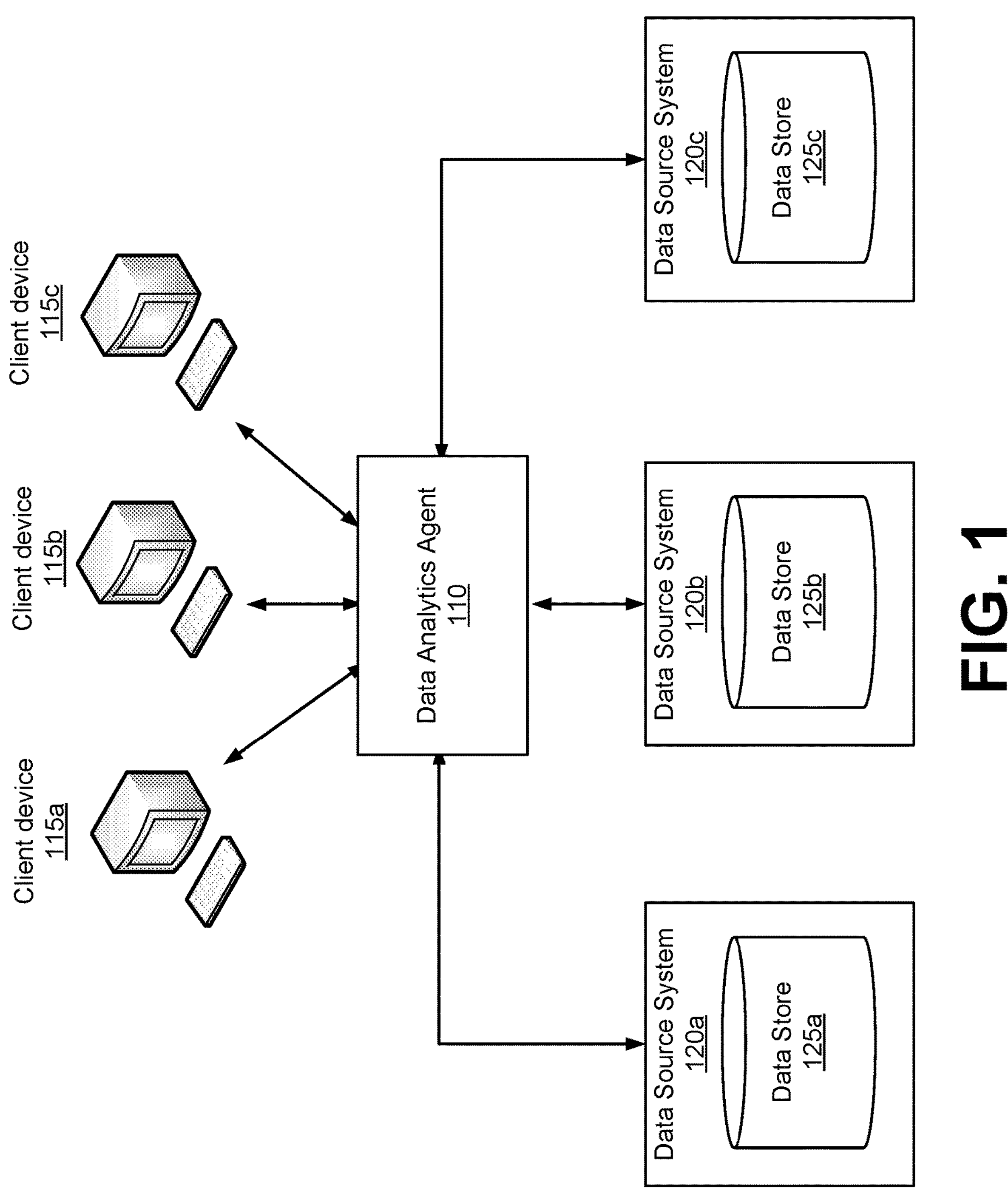
FIG. 1 shows the overall system environments in which a data analytics agent operates, according to an embodiment.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Organizations often store data in various data sources, for example, relational databases, data warehouses, files, spreadsheets, logs, document databases and so on. Users that typically have expertise in interacting with such systems are data engineers. Data engineers typically perform various tasks such as cleansing of the data stored in various data stores and preprocessing it for analysis. Domain experts that understand high-level requirements of data analysis and the types of analytics reports that need to be generated interact with such data engineers to guide their data cleansing or data processing efforts.

Organizations increasingly rely on complex data analytics pipelines (or data processing pipelines) to generate insights from heterogeneous data sources, such as relational databases, data warehouses, logs, spreadsheets, and sensor streams. These data analytics pipelines often involve multiple stages, for example, data loading, cleansing, joining, aggregating, and transforming. The data analytics pipelines are executed to produce analytical results or metrics. In modern AI-driven environments, machine learning based language models, for example, large language model (LLM)-based agents can automatically generate and execute analytics plans. However, end users and stakeholders have limited visibility into how a reported result was derived, whether each intermediate transformation was performed correctly, and where discrepancies may have been introduced. Errors such as incorrect joins, inappropriate filtering, data loss, misapplied aggregation formulas, or inconsistent policy enforcement can go undetected, leading to flawed insights, poor decision-making, and compliance risks. Furthermore, raw operational datasets may be too large or contain sensitive information that cannot be exposed directly to machine learning based language models, complicating the verification process.

The disclosed system addresses these challenges by introducing an AI-driven verification framework that operates on metadata rather than raw data. The system traverses execution plans in reverse from the final result back to initial sources, and verifies each step against predefined or dynamically generated invariants. The system integrates modules for execution plan traversal, invariant selection, prompt generation, verification code synthesis, execution of verification checks, discrepancy detection, and detailed reporting. Contextual information from preceding and succeeding steps, along with a seed library of invariants, guides invariant selection and enables custom invariant generation when no suitable rule exists. Users can specify targeted verification intents, and the system correlates failed checks with likely root causes, recommending corrective modifications to the analytics plan. By checkpointing intermediate outcomes, reusing previously validated code fragments, and enforcing policy constraints across plans, the system ensures consistency, improves efficiency, and provides explainable, actionable verification results, all without leaking raw data to the machine learning based language model.

These techniques are applicable to a variety of technical domains, including business intelligence reporting, automated data processing pipelines, anomaly detection in analytics outputs, and cross-system reconciliation tasks, especially where ensuring the integrity, explainability, and reproducibility of AI-generated analytical results is critical.

System Environment

FIG. 1 shows the overall system environments in which a data analytics agent operates, according to an embodiment. FIG. 1 illustrates an example system environment for an online system 200, in accordance with one or more embodiments. The system environment illustrated in FIG. 1 includes client device 115, a data analytics agent 110 and one or more data source systems 120. Alternative embodiments may include more, fewer, or different components from those illustrated in FIG. 1, and the functionality of each component may be divided between components differently from the description below. Additionally, each component may perform their respective functionalities in response to a request from a human, or automatically without human intervention. Additionally, any number of client devices 115 may interact with the data analytics agent 110. A data analytics agent 110 may also be referred to herein as an artificial intelligence agent or AI agent. Multiple data analytics agent 110 may interact with each other to perform a data analytics process.

Figure 2:
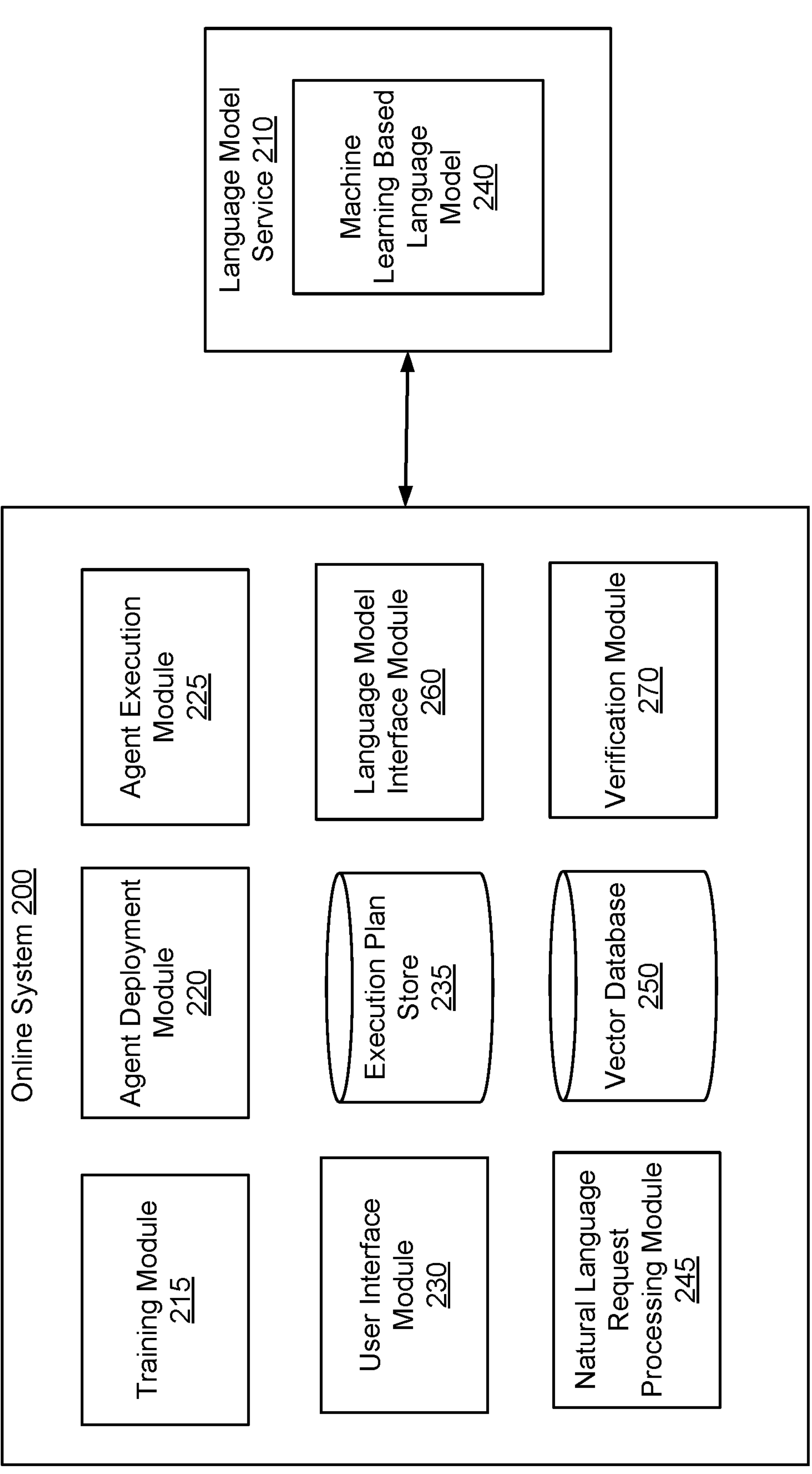
FIG. 2 shows the system architecture of an online system interacting with a language model service, according to an embodiment.

The data analytics agent 110 may execute in an online system, for example, the online system 200 illustrated in FIG. 2. The data analytics agent 110 receives natural language questions from the client device 115. The client device 115 may display a user interface that allows an expert, for example, an analyst to input natural language questions. The natural language questions may specify a data analytics report based on data stored in various data stores 125*a*, 125*b*, 125*c* available in the data source systems 120*a*, 120*b*, 120*c* respectively. A natural language question that requests a data analytics report may also be referred to herein as a natural language data analytics question or a natural language analytics question. The data analytics agent 110 uses a machine learning based language model to generate an execution plan for processing the natural language question. The execution plan is executed to generate the report requested by the user via the client device 115.

The report is displayed via a user interface, for example, a dashboard displayed via a client device 115.

Although FIG. 1 shows a single data analytics agent 110, other embodiments have multiple data analytics agents 110. For example, different agents may be trained to interact with different types of data sources; certain data analytics agents 110 may have the knowledge to perform specific type of analytic processing and so on. According to an embodiment, the system creates a network of agents that interact with each other to process the full data analysis pipeline. For example, a data analytics agent 110 that is trained to generate high level process flow interacts with data analytics agents 110 that are trained to process individual steps of the high-level process flow and coordinates the interactions between different data analytics agents 110. Accordingly, a hierarchy of data analytics agents 110 may be created to divide the data analytics task recursively into smaller subtasks and process them.

The client device 115 can be a personal or mobile computing device, such as a smartphone, a tablet, a laptop computer, or desktop computer. In some embodiments, the client device 100 executes a client application that uses an application programming interface (API) to communicate with the data analytics agent 110. The client device 100 presents a user interface that allows the user to interact with the data analytics agent 110.

The client device 115 allows users to interact with the data analytics agent 110 via a network. (not shown in FIG. 1) that enables communications between the devices. In one embodiment, the network uses standard communications technologies and/or protocols. The data exchanged over the network can be represented using technologies and/or formats including the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. Depending upon the embodiment, the network can also include links to other networks such as the Internet.

System Architecture

FIG. 2 shows the system architecture of an online system interacting with a language model service, according to an embodiment. Other embodiments can have fewer or more modules than indicated in FIG. 2. The online system 200 illustrated in FIG. 2 includes a training module 215, an agent deployment module 220, an analytics agent execution module 225, a user interface module 230, an execution plan store 235, a language model interface module 260, a natural language request processing module 245, a verification module 270, and a vector database 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The user interface module 230 configures user interfaces for presentation to a user via a client device 100. The user interfaces configured by the user interface module 230 allow users to provide information to the online system 200, for example, natural language data analytics requests.

The verification module 270 validates the correctness and integrity of results produced by execution plans generated for natural language data analytics requests. The verification module 270 operates by traversing an execution plan in reverse order, starting from the final analytical result and working back toward the original data sources to examine each step's inputs, outputs, and associated metadata. The verification module 270 performs invariant processing to identify a set of applicable invariants for each step, generate structured query inputs describing the step and the invariants, and employ a machine learning based language model to produce executable verification code. The verification module 270 runs this code to confirm that each step satisfies its expected properties, while the discrepancy determination submodule records any deviations and localizes their origin. The verification module 270 A produces detailed, user-readable reports outlining step-level checks, discrepancies, data lineage, and metrics, which can be reviewed and acted upon through the user interaction submodule to improve trust, compliance, and explainability of analytical outputs.

The training module 215 generates agents trained to perform specific tasks. For example, an agent may be trained to interact with a particular type of data store. According to an embodiment, the training of a data analytics agent is based on in-context learning. For example, a user such as an expert user, uses the data analytics agent to interact with a data store in a particular context and makes several natural language data analytics requests specific to the context. The online system asks the user several questions related to evaluation of each natural language data analytics request that is processed. The user provides feedback, for example, by approving whether certain types of techniques used for data analytics are suitable for use in the context, whether the instructions used for performing certain steps conform to certain policy constraints of the organization, and so on.

The agent deployment module 220 generates artifacts that store all the information needed to instantiate an agent on a system. The agent deployment module 220 transmits the artifacts to a target system so that the target system can instantiate the agent and execute it.

The analytics agent execution module 225 receives the artifacts provided by the agent deployment module 220 and executes the agent. The agent may interact with a system for example, a data store. An agent may interact with a user by receiving natural language requests from the user and processing the natural language requests.

The user interface module 230 configures user interfaces and presents to the user. The user interface module 230 receives user inputs via the user interfaces and provides the user input to appropriate modules of the online system 200. For example, the user interface module 230 may receive natural language requests and provide them to the natural language request processing module 245. The user interface module 230 further receives results of processing the natural language requests from the machine learning based language model 240 and provides them to the user. For example, the result of processing a natural language request may be a visualization of a particular report. The user interface module 230 configures a user interface that displays the visualized report and sends for display to a client device 115.

The execution plan store 235 stores execution plans of previously received natural language requests, for example, natural language data analytics requests. The online system 200 may execute a natural language data analytics request on a periodic basis to display a visualization of a report via a dashboard. According to an embodiment, the online system 200 may receive a modification of previously received natural language data analytics requests and access the closest matching natural language data analytics requests that was previously processed. The online system 200 may use the vector database to identify the closest natural language data analytics request to the input natural language data analytics request received, for example, based on vector distances of previously processed natural language data analytics requests from the input natural language data analytics request. The online system 200 accesses the execution plan of the closest natural language data analytics request that was previously processed and modifies the execution plan of the previously processed natural language data analytics request to generate an execution plan of the input natural language data analytics request.

According to an embodiment, the execution plan represents a data pipeline, and each step of the execution plan corresponds to a stage of the data pipeline. Each stage receives data generated by a previous stage, processes the data and provides the data as input to the next stage in the pipeline. The first stage receives input that is processed by the data pipeline and the last stage outputs the result of executing the data pipeline.

The language model interface module 260 interfaces with the language model service 210. The language model service 210 includes a machine learning based language model 240. The machine learning based language model 240 may generate prompts for sending to the language model service 210. The machine learning based language model 240 invokes APIs (application programming interfaces) of the language model service 210 to execute the 240 using the generated prompt and receive a response obtained by executing the machine learning based language model 240. The language model service 210 may be invoked by other modules of the online system 200 for example, the natural language request processing module 245.

The natural language request processing module 245 executes the various processes described herein to receive a natural language request, for example, a natural language data analytics request and generates an execution plan for processing the natural language request. The execution plan may comprise a sequence of steps. Each step may further comprise steps to perform specific tasks. For example, natural language data analytics request may identify a particular type of data analysis and the execution plan may comprise steps such as accessing data from a specific source, segmenting users based on a particular technique, using a specific statistical model to analyze the segments, generate a report, generate visualization of the report, and so on.

According to an embodiment, the online system stores information such as natural language data analytics requests received in the past in a vector database 250. According to an embodiment, the natural language request processing module 245 generates a vector representation of natural language data analytics requests. The vector representation of a natural language data analytics request may be an embedding representing an output of a hidden layer of a neural network trained to encode natural language text. According to an embodiment, the natural language request processing module 245 requests the machine learning based language model to generate the vector embeddings corresponding to a natural language data analytics request. The vector database 250 allows the online system 200 to identify past natural language data analytics requests that are similar to an input natural language data analytics request. The vector database 250 identifies natural language data analytics requests having vector representations that are within a threshold vector distance of an input natural language data analytics request. The vector distance may be based on a cosine similarity metric. The online system 200 may provide a vector representation of a natural language data analytics request to the vector database 250 to determine all past natural language data analytics requests that are similar to an input natural language data analytics request so as to access their execution plans from the execution plan store 235.

In one or more embodiments, the machine learning based language model 240 is a large language model (LLM) trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 200 or one or more entities different from the online system 200. An LLM may be trained on a large amount of data from various data sources. For example, the data sources include websites, articles, posts on the web, and the like. From this massive amount of data coupled with the computing power of LLMs, the LLM is able to perform various tasks and synthesize and formulate output responses based on information extracted from the training data.

In one or more embodiments, the machine learning based language model 240 is a transformer neural network architecture. Specifically, the transformer model is coupled to receive sequential data tokenized into a sequence of input tokens and generates a sequence of output tokens depending on the task to be performed. In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the machine learning based language model 240 can be configured as any other appropriate architecture including, but not limited to, long short-term memory (LSTM) networks, Markov networks, BART, generative-adversarial networks (GAN), diffusion models (e.g., Diffusion-LM), and the like.

The training module 215 trains machine learning models used by the online system 200. The online system 200 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

In one or more embodiments, the online system 200 receives a pre-trained machine learning based language model 240 and the training module 215 additionally fine-tunes parameters of the machine learning based language model 240 using multiple instances of training data. An instance in the training data may include strings or sentences obtained by concatenating inputs and expected outputs of the machine learning based language model. For example, the training data may comprise natural language questions received from users with lists of items, item types, or categories of items associated with the natural language question. The machine learning based language model receives an input sentence with missing tokens from the output portion of the input sentence and predicts the missing tokens. A loss function is computed by aggregating loss values obtained from the predicted tokens and the known tokens of the output portion of the sentences provided as training data. The errors obtained from the loss function are backpropagated to update parameters of the machine-learned model.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The training module 215 generates the set of parameters for a machine learning model by "training" the machine learning model. Once trained, the machine learning model uses the set of parameters to transform inputs into outputs.

The training module 215 trains a machine learning model based on a set of training examples. Each training example includes input data to which the machine learning model is applied to generate an output. For example, each training example may include user data, item data, or order data. In some cases, the training examples also include a label which represents an expected output of the machine learning model. In these cases, the machine learning model is trained by comparing its output from input data of a training example to the label for the training example.

The training module 215 may apply an iterative process to train a machine learning model whereby the training module 215 trains the machine learning model on each of the set of training examples. To train a machine learning model based on a training example, the training module 215 applies the machine learning model to the input data in the training example to generate an output. The training module 215 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The training module 215 updates the set of parameters for the machine learning model based on the score generated by the loss function. For example, the training module 215 may apply gradient descent to update the set of parameters.

With respect to the machine-learned models hosted by the model serving system 150, the machine-learned models may already be trained by a separate entity from the entity responsible for the online system 200. In another embodiment, when the model serving system 150 is included in the online system 200, the training module 215 may further train parameters of the machine-learned model based on data specific to the online system 200 stored in the data store 125. As an example, the training module 215 may obtain a pre-trained transformer language model and further fine tune the parameters of the transformer model using training data stored in the data store 125.

Generating Execution Plans for Natural Language Data Analytics Requests

Figure 3:
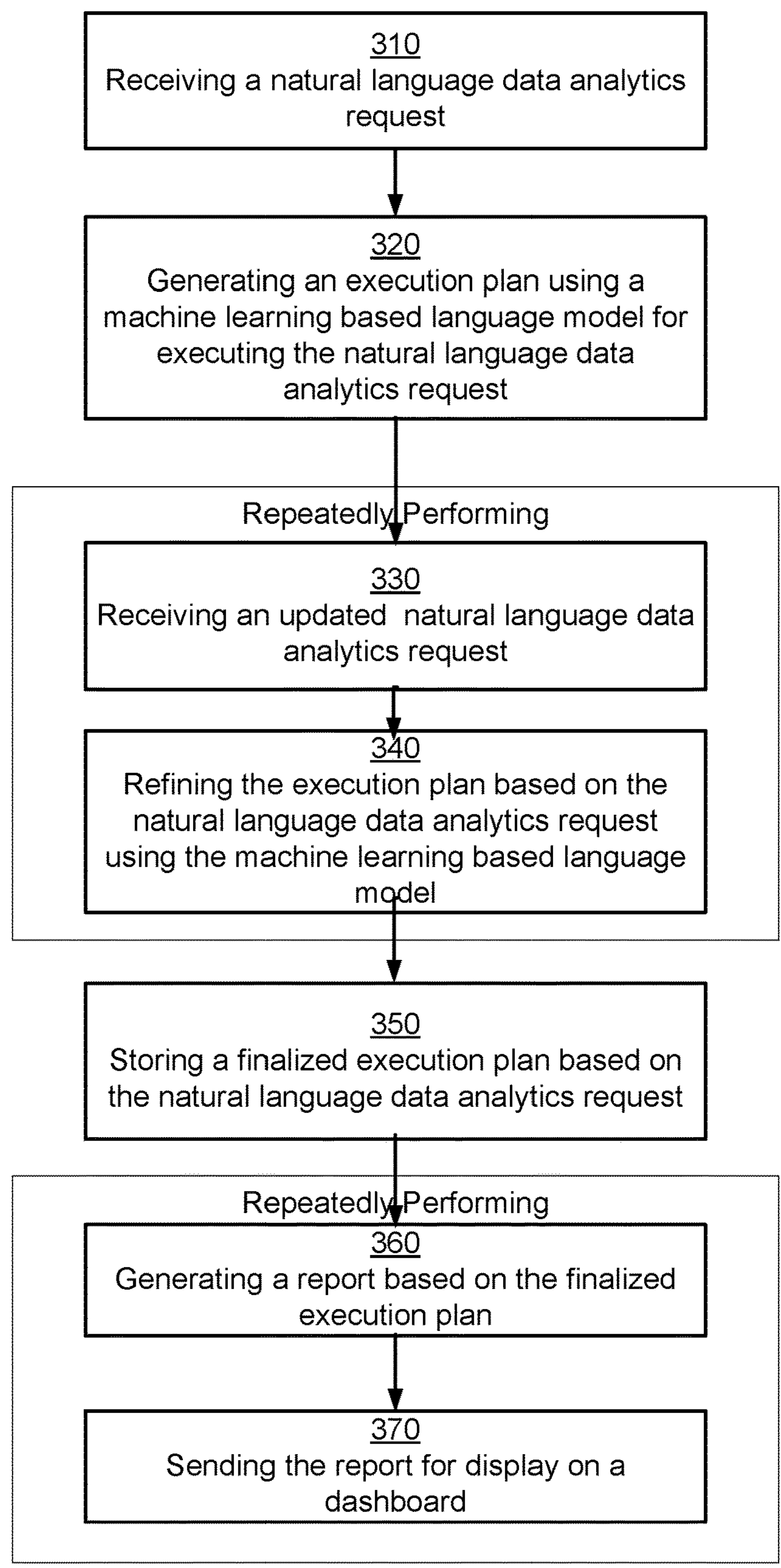
FIG. 3 is a flowchart illustrating a process for generating an execution plan based on a natural language data analytics request, according to an embodiment.

FIG. 3 is a flowchart illustrating a process for generating an execution plan based on a natural language data analytics request, according to an embodiment. Alternative embodiments may include more, fewer, or different steps from those illustrated in FIG. 3, and the steps may be performed in a different order from that illustrated in FIG. 3. The steps are described as being performed by a system, for example, the online system 200 and may be performed by one or more modules of the system. Additionally, each of these steps may be performed automatically by the online system without human intervention.

As shown in the flowchart of FIG. 3, the system receives 310 a natural language data analytics request. The natural language data analytics request is a request specified using natural language and requesting information based on data analytics performed using data stored in one or more data stores 125. The natural language data analytics request may be received from a user who is a domain expert, for example, an analyst.

The system generates 320 an execution plan for processing the natural language data analytics request. The execution plan is generated using a machine learning based language model 240. According to an embodiment, the system generates a prompt for sending to a machine learning based language model. The prompt is based on the natural language data analytics request. The prompt requests the machine learning based language model 240 to generate an execution plan for processing the natural language data analytics request. The system sends the prompt to the machine learning based language model, for example, by invoking an API (application programming interface) of the language model service 210. The system receives a response from the language model service 210. The response is generated by the machine learning based language model 240 by processing the prompt. The system processes the response to extract the execution plan from the response. Accordingly, the system generates 320 the execution plan for processing the natural language data analytics request based on a response received from the machine learning based language model;

The system iteratively refines the execution plan for processing the natural language data analytics request by performing steps including 330 and 340. The system provides the execution plan for display to the user, for example, the analyst. The analyst may review the execution plan and revise the natural language data analytics request to provide an updated natural language data analytics request. For example, if the execution plan uses a particular model M1 for performing a specific step of analysis, the user may specify via the natural language data analytics request to use a different model M2 instead of model M1. The models M1 and M2 may be statistical models or may be other kinds of models that perform specialized processing. The data analytics agent refines 340 the execution plan based on the natural language data analytics request using the machine learning based language model. The data analytics agent also generates the instructions for executing the model for processing the required step.

The system generates an updated prompt based on the updated natural language data analytics request and provides the updated prompt to the machine learning based language model 240. The system receives a response from the language model service 210. The response is generated by executing the updated response and includes an updated execution plan for processing the natural language data analytics request. The system extracts the updated execution plan from the updated response received from the machine learning based language model. The steps 330 and 340 may be repeated multiple times until the user approves the execution plan as being final.

According to an embodiment, the system configures and presents a user interface to the user describing the details of individual steps of the execution plan. The system receives feedback on individual steps from the user. For example, the data analytics agent 110 may have processed a particular step of analysis using a specific technique. The user may modify the natural language request to specify a different technique for performing that step of analysis. The system finalizes the execution plan after each step of the execution plan is approved by the user.

The system stores 350 the finalized execution plan for processing the natural language data analytics request obtained as a result of the iterative refinement of the execution plan. The system may generate several such execution plans for different natural language data analytics requests.

The execution plans may be accessed for processing the natural language data analytics requests that are received subsequently. For example, natural language data analytics requests may be included in a dashboard for display to a user. The dashboard may be updated periodically to display updated reports based on the natural language data analytics requests. Accordingly, the system repeats one or more times the steps 360 and 370. The system executes 360 the finalized execution plan to generate a report and sends 370 the generated report for displaying via a user interface.

According to an embodiment, the system saves sets of instructions that perform specific tasks that represent steps of execution plans. The saved sets of instructions are associated with the description of the step that they correspond to. This allows the system to reuse the sets of instructions. For example, a set of instructions for performing a particular step S1 of execution plan E1 of a natural language data analytics request R1 may be saved. Subsequently the system receives another natural language data analytics request R2. The system generates an execution plan E2 for the natural language data analytics request R2 and determines whether any step of the execution plan matches a step for which sets of instructions were previously generated and stored. If the system determines that a step S2 of the execution plan E2 matches the description of the step S2, the system reuses the set of instructions for step S1 for performing step S2. This reuse of sets of generated instructions allows efficiently generating execution plans and also provides consistency in results of execution of different natural language data analytics requests. For example, the machine learning based language model used for generation of instructions may be non-deterministic. As a result, the step S2 of execution plan E2 in the above example may use a different model for performing analysis compared to step S1 of execution plan E1. As a result, the results of execution of the two requests R1 and R2 may be significantly different even if the differences in the requests R1 and R2 are minor. The reuse of sets of generated instructions avoids such discrepancies across multiple executions of the same natural language data analytics requests as well as across executions of similar natural language data analytics requests.

Furthermore, the sets of instructions generated conform to constraints, for example, policy constraints of an organization requiring certain types of analysis to be performed using specific techniques or models. The reuse of sets of instructions that were previously approved results in ensuring that subsequent execution plans that reuse the set of instructions also conform to the constraints. This results in simplifying enforcement of policies across organizations.

Furthermore, reuse of sets of instructions previously generated is efficient since the machine learning based language model is not invoked for generating the set of instructions. Machine learning based language models are typically computationally intensive and use significant computational resources. Furthermore, if the machine learning based language model is executing on a separate server such as the language model service 210, the system also saves on network resources if the amount of data being transmitted to and from the language model service 210 is significant for generating the set of instructions for individual steps of the execution plan. As a result, the system saves on computational resources as well as networking resources by reusing the sets of instructions generated for steps across execution plans.

According to an embodiment, the prompt generated for the machine learning based language model is provided instructions in the prompt to generate instructions to invoke a set of instructions that was previously generated and stored. For example, if the set of instructions needs specific parameter values to interface with the rest of the execution plan, the machine learning based language model generates instructions for extracting the parameter values and providing them as input to the set of instructions being invoked. The machine learning based language model is provided with instructions in the prompt to generate instructions in the execution plan to receive any data or results generated by the set of instructions and provide them to a subsequent step of the execution plan.

According to an embodiment, the system generates prompts that ask the machine learning based language model to treat the stored set of instructions as inline code that is included in the execution plan without any modifications. Accordingly, the prompt generated for the machine learning based language model includes explicit instructions to not modify the set of previously generated instructions that are identified. The prompt provides instructions to the machine learning based language model to run the stored set of instructions without modifying them and to adjust the portions of the instructions that invoke the set of instructions to prepare the parameters passed as input to the set of instructions and appropriately set the parameter values before invoking the instructions.

The system further generates descriptions of the sets of instructions that are stored. The description acts as documentation of the sets of instructions. The system correlates the description of the set of instructions with steps of the execution plans and the natural language data analytics requests that resulted in generation of the execution plans. This provides documentation for the processes used in the organization, for example, business processes. The documentation describes how specific processing is performed in the organization. According to an embodiment, the system generates documentation for processes of an organization by collecting the descriptions of the various sets of instructions that are frozen and categorizing them based on the natural language data analytics requests. For example, the system may identify a category of natural language data analytics requests that invoke the same set of instructions and generate documentation describing how the category of natural language data analytics requests is processed in the organization. Furthermore, the documentation of the processes also supports standardization of the processes for the organization.

The system further determines whether two different natural language data analytics requests are processing the same step using different computations. This allows the system to determine whether different groups within the organization are consistently using the same technique for a particular step of analysis, for example, if they are using the same model for certain data analytics steps. The system can analyze the sets of instructions used by different natural language data analytics requests to determine whether any user or group within the organization does not conform to the policy constraints specified by the organization. As a result, the system helps enforce polices of the organization specifying how specific processes or process steps related to data analysis should be carried out within the organization.

Partially Materialized Execution Plans

According to an embodiment, the system generates partially materialized execution plans that include one or more sets of instructions that are identified as frozen. A machine learning based language model may include stochastic components that result in generation of non-deterministic outputs. As a result, a machine learning based language model may generate different responses each time the machine learning based language model is executed for the same input. A different execution plan may be generated each time even if the same natural language data analytics request is processed using the same prompt that is provided as input to the machine learning based language model. As a result, the execution of the same natural language data analytics request at different times may return different results.

The system according to an embodiment, identifies a set of instructions (also referred to as code) of the execution plan generated from a natural language data analytics request and freezes the identified set of instructions so that they do not change when the execution plan is regenerated by the machine learning based language model for processing the same natural language data analytics request. Freezing a set of instructions of an execution plan is also referred to herein as materializing the set of instructions. The set of instructions that is materialized may also be shared across execution plans generated for other natural language data analytics requests.

Figure 4:
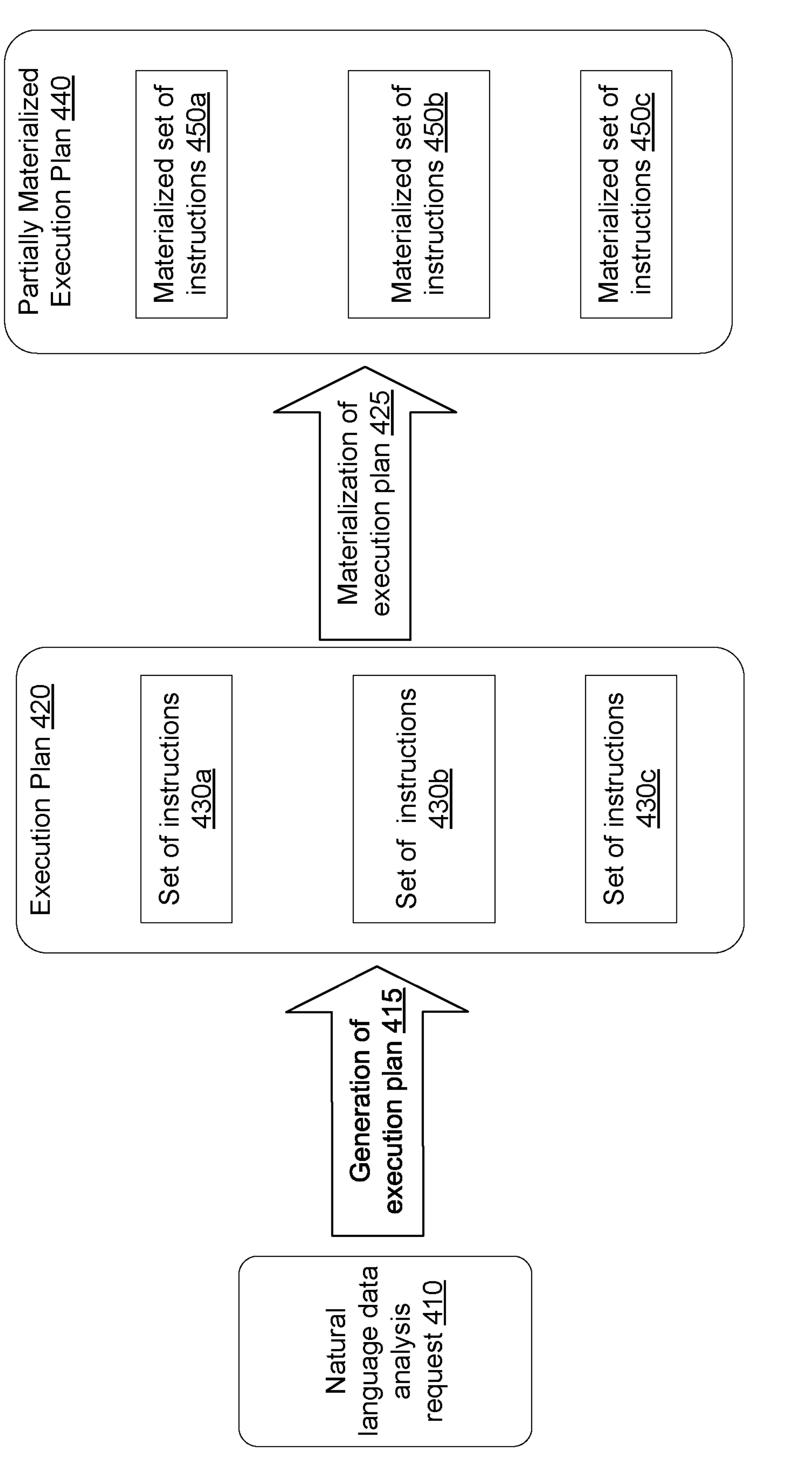
FIG. 4 illustrates partial materialization of an execution plan for a natural language data analytics request, according to an embodiment.

FIG. 4 illustrates partial materialization of an execution plan for a natural language data analytics request, according to an embodiment. The system receives a natural language data analytics request 410. The system generates 415 the execution plan for processing the natural language data analytics request 410. The system identifies one or more sets of instructions 430*a*, 430*b*, 430*c* for materializing. Materializing a set of instructions represents freezing the set of instructions so that the materialized set of instructions is not modified even if the machine learning based language model is executed again with the same input, even if the machine learning based language model has non-deterministic behavior. A materialized set of instructions may also be referred to herein as a frozen set of instructions or an immutable set of instructions.

For example, the sets of instructions may represent core computation of the execution plan that may have significant impact on the result of executing the execution plan. The system materializes 425 the execution plan 420 to obtain the materialized execution plan 440 by materializing each identified set of instructions 430*a*, 430*b*, 430*c* to obtain materialized sets of instructions 450*a*, 450*b*, 450*c* respectively. The system may not materialize all instructions of the execution plan 420, for example, instructions that are less critical to the computation of the result. The materialization of various sets of instructions may be performed iteratively, for example, as the system generates instructions for each step of the execution plan.

Figure 5A:
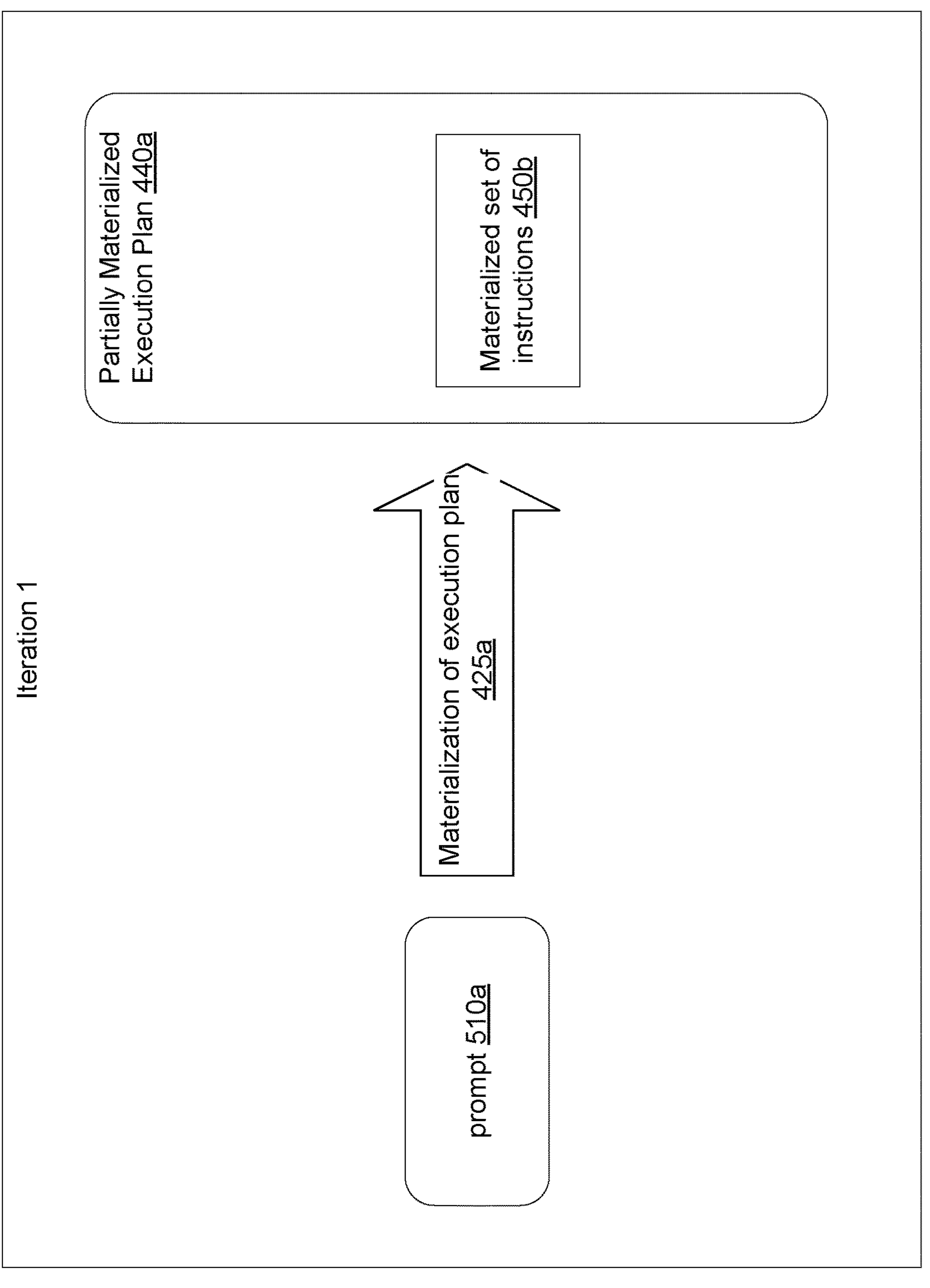
FIG. 5A shows an iteration of generation of partially materialized execution plan, according to an embodiment.
Figure 5B:
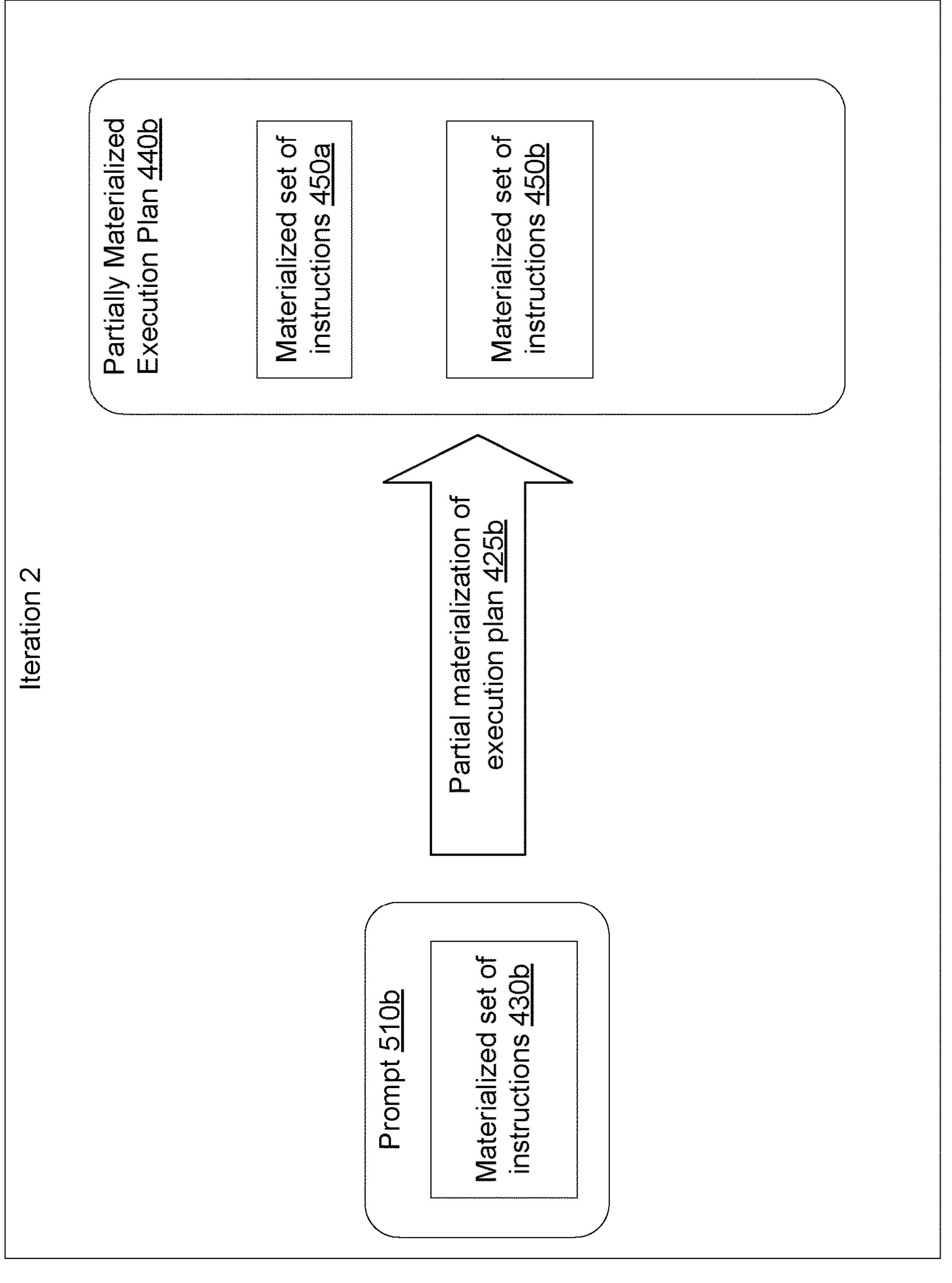
FIG. 5B shows a subsequent iteration of generation of partially materialized execution plan, according to an embodiment.
Figure 5C:
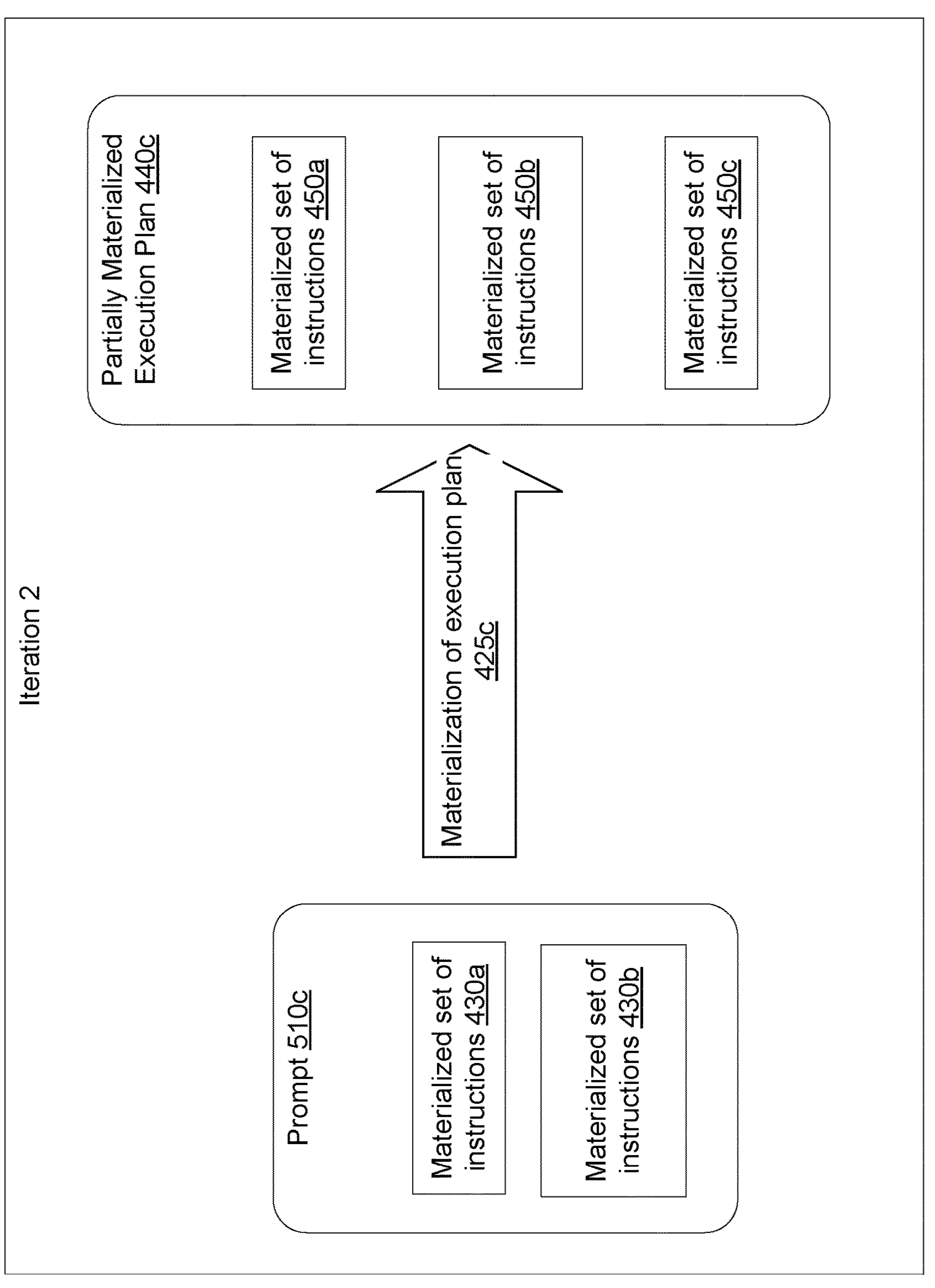
FIG. 5C shows another subsequent iteration of generation of partially materialized execution plan, according to an embodiment.

FIGS. 5A, 5B, and 5C illustrate partial materialization of an execution plan for a natural language data analytics request through iterative refinement, according to an embodiment.

FIG. 5A shows an iteration of generation of partially materialized execution plan, according to an embodiment. The system receives a natural language data analytics request 410 and generates a prompt including the natural language data analytics request. The system identifies a set of instructions to materialize and performs the materialization 425*a* to generate a partially materialized execution plan 440*a* that includes a materialized set of instructions 450*b*.

FIG. 5B shows a subsequent iteration of generation of partially materialized execution plan, according to an embodiment. During this iteration, the system generates a prompt that includes the natural language data analytics request 410 along with the materialized set of instructions 450*b*. The prompt further includes instructions for the machine learning based language model specifying that the materialized set of instructions 450*b* should not be modified. The prompt may further describe how to pass parameter values to the materialized set of instructions 450*b* for interfacing with the remaining instructions of the partially materialized execution plan 440*b*. The materialization step 425*b* may add another materialized set of instructions 450*a* to the partially materialized execution plan 440*b*.

FIG. 5C shows another subsequent iteration of generation of partially materialized execution plan, according to an embodiment. During this iteration, the system generates a prompt that includes the natural language data analytics request 410 along with all the currently materialized set of instructions including 430*a* and 430*b*. The prompt further includes instructions for the machine learning based language model specifying that the materialized set of instructions 450*a*, 450*b* should not be modified. The prompt may further describe how to pass parameter values to the materialized set of instructions 450*a*, 450*b* for interfacing with the remaining instructions of the partially materialized execution plan 440*b*. The materialization step 425*b* may add another materialized set of instructions 450*c* to the partially materialized execution plan 440*c*.

Figure 6:
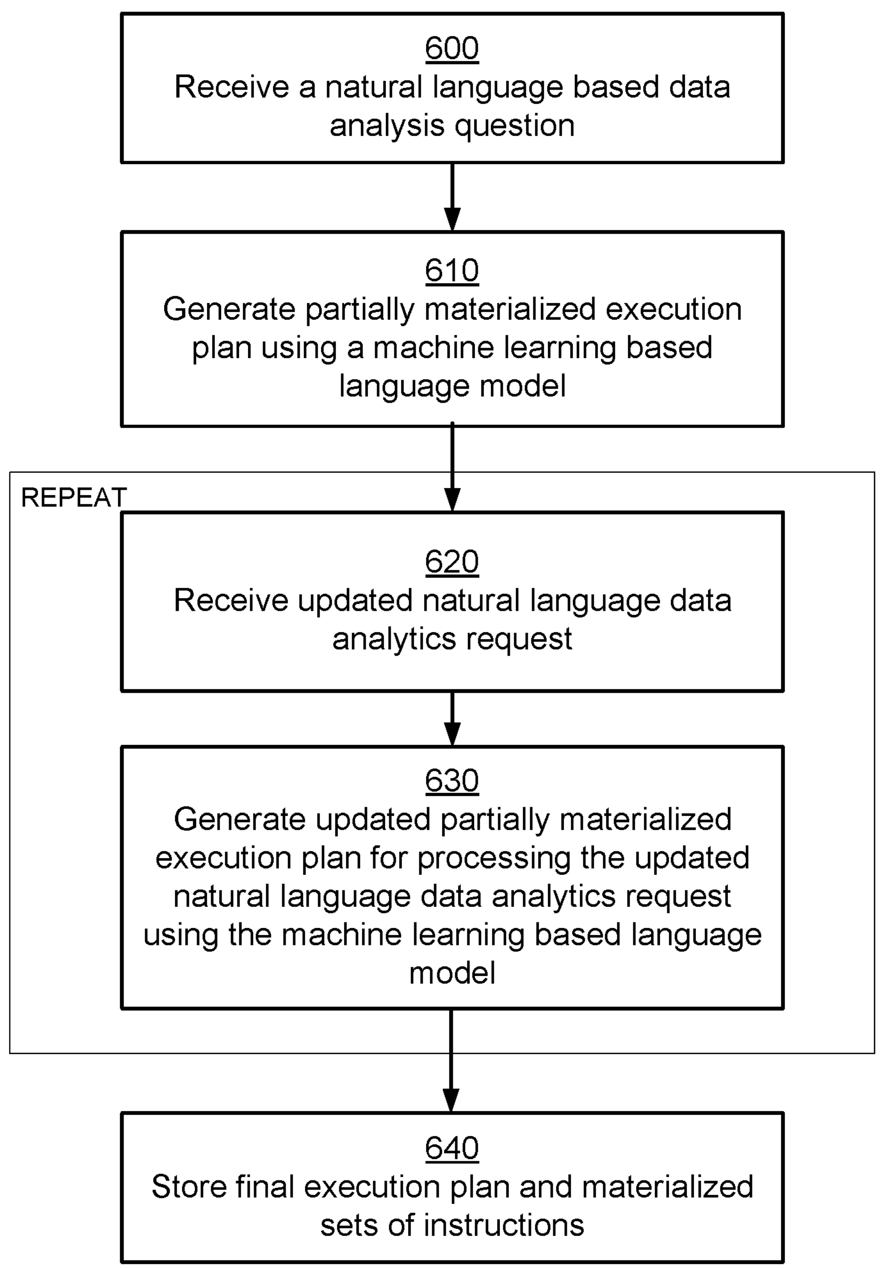
FIG. 6 is a flowchart illustrating a process for generating an execution plan for processing a natural language data analytics request, according to an embodiment.

FIG. 6 is a flowchart illustrating a process for generating an execution plan for processing a natural language data analytics request, according to an embodiment.

The system receives 600 a natural language data analytics request based on data stored in one or more data stores.

The system generates 610 a partially materialized execution plan for processing the natural language data analytics request using a machine learning based language model. The partially materialized execution plan comprises at least a set of instructions identified as materialized. A materialized set of instructions is unchanged if the partially materialized execution plan was regenerated from the natural language data analytics request using the machine learning based language model.

The system iteratively refines the partially materialized execution plan by repeatedly executing the steps 620 and 630. The system receives 620 an updated natural language data analytics request. The system generates 630 an updated partially materialized execution plan for processing the updated natural language data analytics request. The updated partially materialized execution plan is generated using the machine learning based language model and includes at least an additional set of instructions identified as materialized along with sets of instructions identified as materialized during previous iterations.

The system stores 640 a finalized execution plan obtained by iteratively refining the partially materialized execution plan. The system may execute the finalized execution plan to generate a report that may be displayed via a user interface, for example, a dashboard.

Generating partially materialized execution plans allows the system to display a consistent behavior in spite of use of machine learning based language models that may be non-deterministic. Furthermore, the materialized sets of instructions are reusable across execution plans, thereby allowing code reuse. The materialized sets of instructions represent core computations for an organization and the system uses machine learning based language models to generate documentation for the materialized sets of instructions. This documentation acts as the documentation of the core computations of the organization and codifies the polices of the organization. The system may further generate reports describing whether the materialized sets of instructions conform to policy constraints of the organization or if there are any discrepancies that need to be highlighted and fixed.

Determining Exposure of Datasets to Changes in Policy Constraints

According to an embodiment, the steps of the execution plan are implemented so as to satisfy certain constraints. The constraints may be specified as policy constraints. For example, an enterprise may have policies that a specific type of analysis is performed using a specific technique or a model. The constraint may specify that the model used for analyzing certain steps may depend on the context. For, the step may be performed using a particular model in one context and another model in a different context. The context may depend on the user performing the analysis, the group within the organization that is performing the analysis, a target system for which the analysis is being performed, and so on. The constraint may be based on resources that are available or resources being used for the analysis. For example, a model that uses lower resources may be preferred for a target system that has fewer computational resources.

Figure 7A:
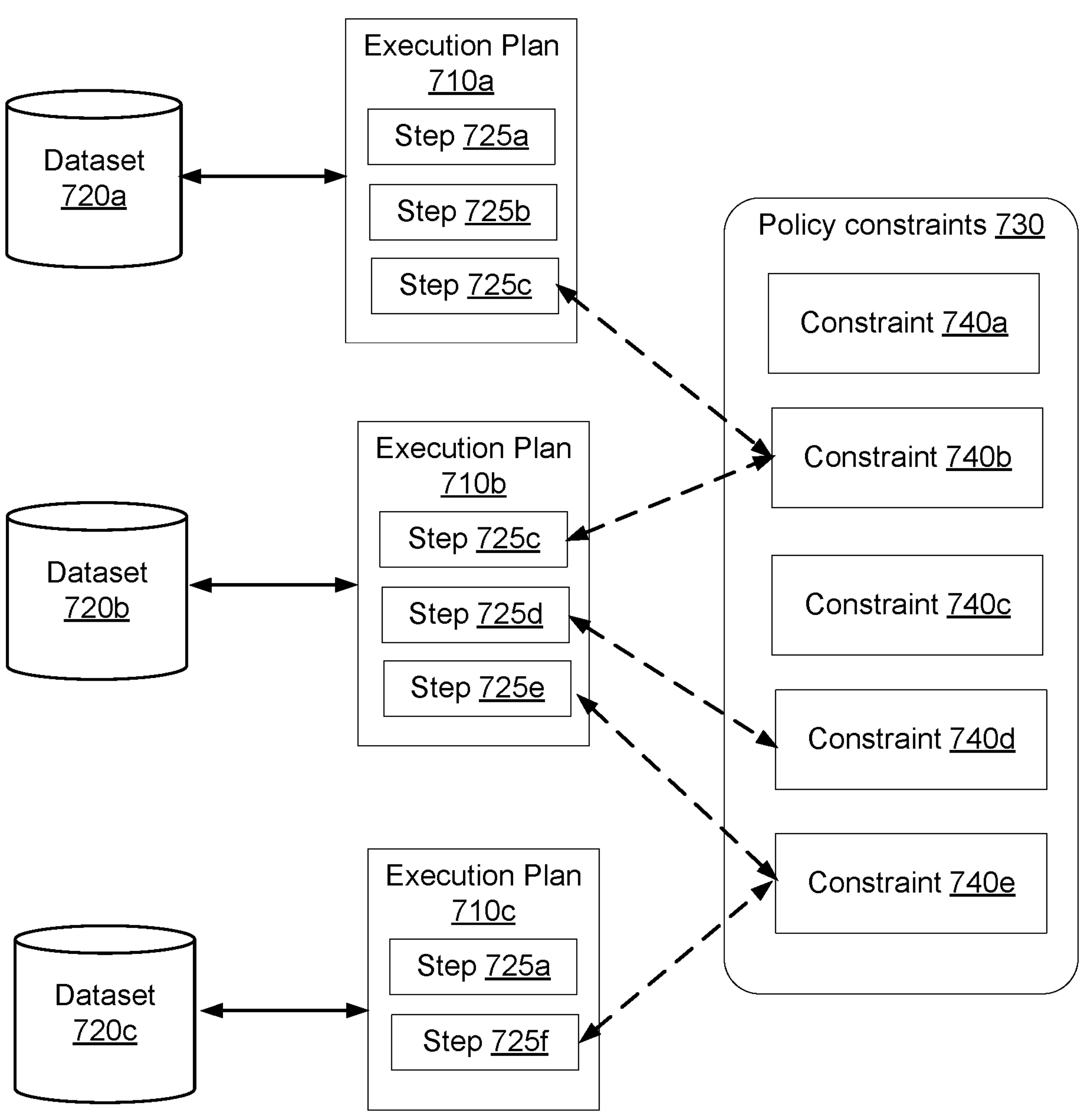
FIG. 7A illustrates the process of determining exposure of datasets to changes in policy constraints, according to an embodiment.

FIG. 7A illustrates the process of determining exposure of datasets to changes in policy constraints, according to an embodiment. FIG. 7A shows datasets 720*a*, 720*b*, 720*c*. Each dataset is generated by executing an execution plan. For example, the datasets 720*a*, 720*b*, 720*c* are generated by executing the execution plans 710*a*, 710*b*, and 710*c* respectively. Each execution plan is generated from a natural language data analysis request. Each plan comprises a set of steps. The set of instructions for a step may be reused across execution plans. For example, execution plan 710*a* includes steps 725*a*, 725*b*, and 725*c*; execution plan 710*b* includes steps 725*c*, 725*d*, and 725*e*; and execution plan 710*c* includes steps 725*a*, 725*f*. The instructions for step 725*c* are shared between execution plans 710*a* and 710*b*. Similarly, instructions for step 725*a* are shared between execution plans 710*b* and 710*c*.

The system stores policy constraints 730 including constraints 740*a*, 740*b*, 740*c*, 740*d*, and 740*e*. A constraint may be linked to a step of an execution plan if the constraint is applicable to the instructions of the step. As shown in FIG. 7A, constraint 740*b* is linked to step 725*c* of execution plan 710*a* and 710*b*; constraint 740*d* is linked to step 725*d* of execution plan 710*b*; and constraint 740*e* is linked to step 725*e* of execution plan 710*b* and step 725*f* of execution plan 710*c*. A dataset is linked to all the constraints that are linked to the steps of the execution plan used for creating the dataset. For example, dataset 720*a* is linked to constraint 740*b* since the constraint 740*b* is linked to step 725*c* of execution plan 710*a* used to create the dataset 720*a*. Dataset 720*b* is linked to constraint 740*b* since the constraint 740*b* is linked to step 725*c* of execution plan 710*b*; dataset 720*b* is linked to constraint 740*d* since the constraint 740*d* is linked to step 725*d* of execution plan 710*b*; dataset 720*b* is also linked to constraint 740*e* since the constraint 740*e* is linked to step 725*e* of execution plan 710*b*. Dataset 720*c* is linked to constraint 740*e* since the constraint 740*e* is linked to step 725*f* of execution plan 710*c*. These links between datasets and constraints can be used to determine the impact of a change in a constraint.

Figure 7B:
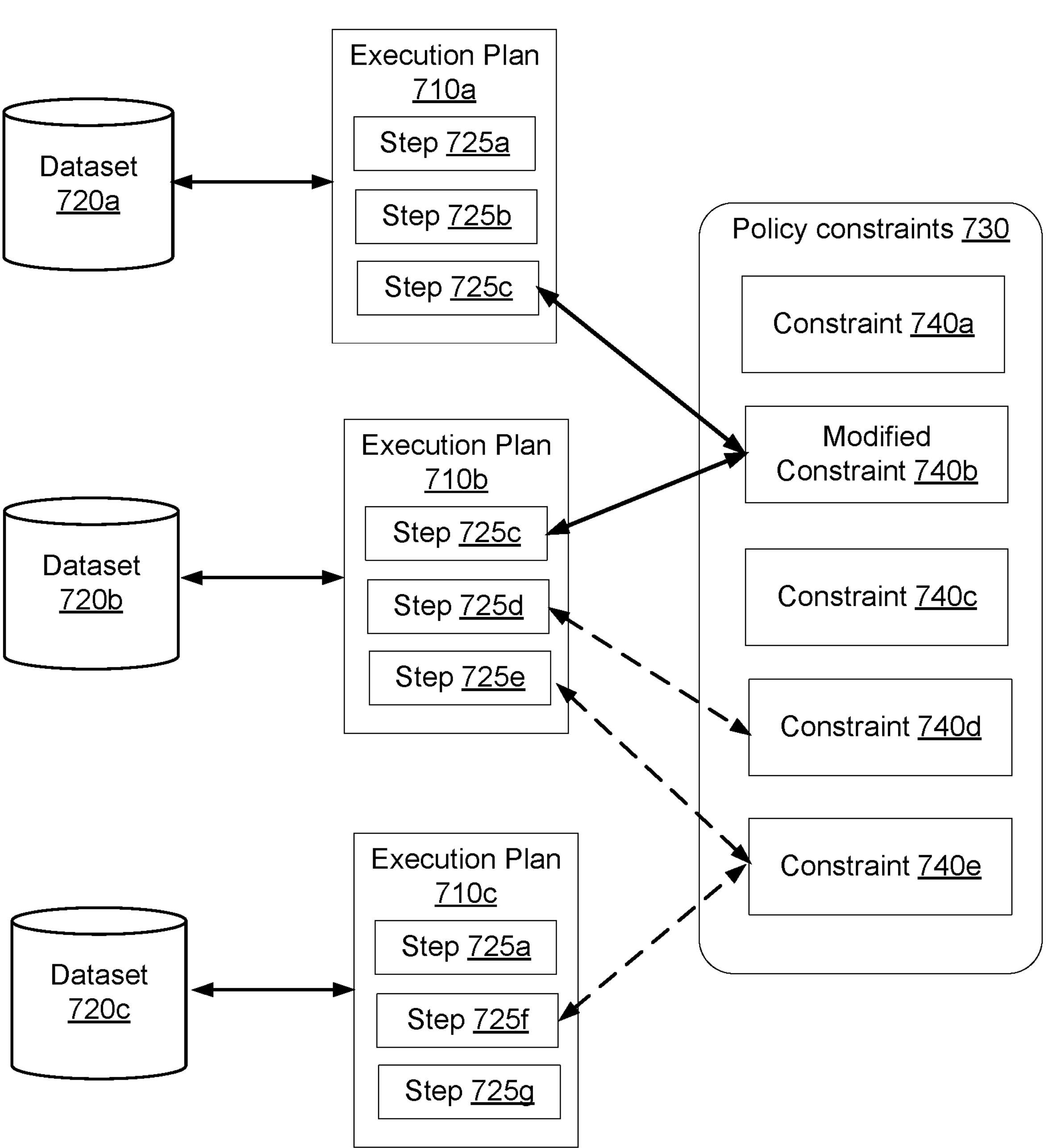
FIG. 7B shows that the constraint is modified or a request for modifying constraint is received, according to an embodiment.

FIG. 7B shows that the constraint 740*b* is modified or a request for modifying constraint 740*b* is received, according to an embodiment. The constraint 740*b* is linked to step 725*c* of execution plans 710*a* and 710*b* which are linked to datasets 720*a* and 720*b* respectively. Modifying constraints 740*b* does not have any impact on the dataset 720*c*. Accordingly, the associations between datasets and constraints allow the system to identify which execution plans need to be regenerated and correspondingly, which datasets need to be rebuilt. This makes the process of modifying constraints efficient since only specific steps of execution plans need to be rebuilt and also only a subset of the dataset may have to be rebuilt. This makes the process of modifying policy constraints computationally efficient.

Figure 8:
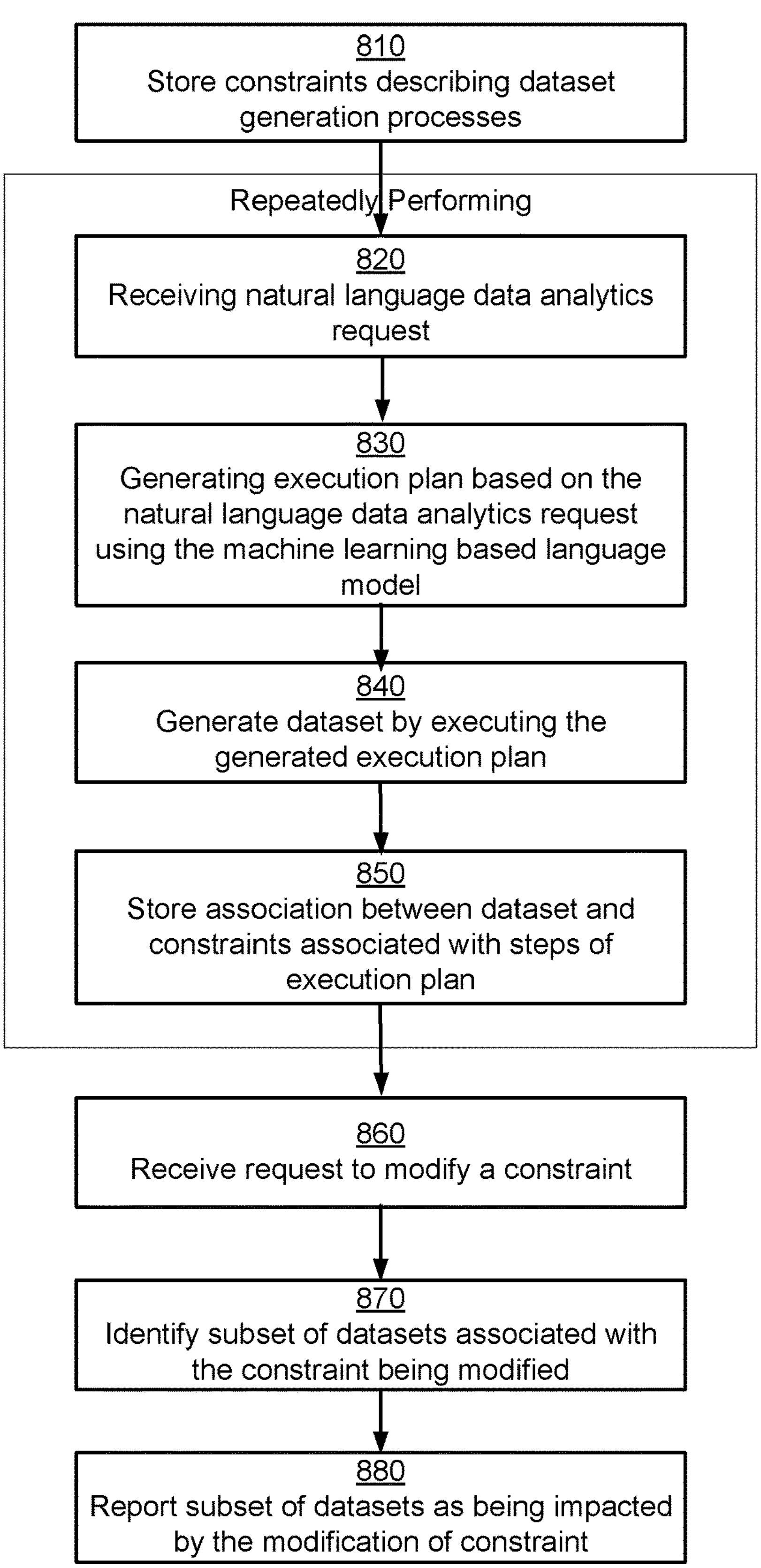
FIG. 8 shows a flowchart illustrating a process of determining exposure of datasets to changes in policy constraints, according to an embodiment.
Figure 9:
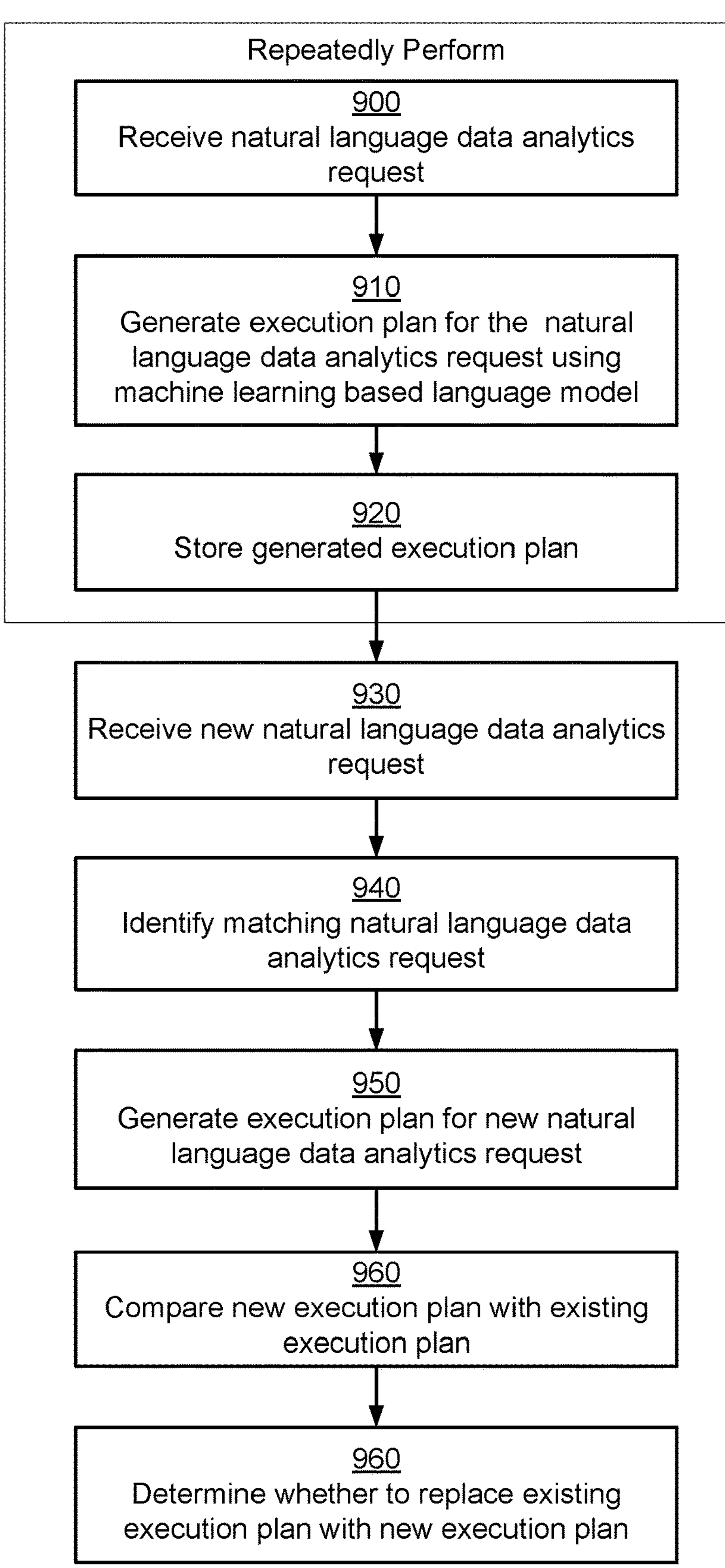
FIG. 9 shows a flowchart illustrating a process of in-context learning for data analytics agents, according to an embodiment.

FIG. 8 shows a flowchart illustrating a process of determining exposure of datasets to changes in policy constraints, according to an embodiment. The steps shown in FIG. 9 are performed by various modules of the online system 200. The steps may be performed in an order different from that indicated herein.

The system stores 810 a set of constraints associated with datasets of an organization. These constraints may represent policies of the organization. A constraint may be referred to as a policy constraint. A set of policy constraints form a policy of the organization. Each constraint may describe a step performed for creating a dataset. For example, a constraint may specify that only a specific type of model may be used for certain analysis steps. As another example, a constraint may specify that a certain type of analysis must be performed using a specific analysis technique or algorithm.

The system generates a plurality of datasets by processing each of a plurality of natural language data analytics requests using steps 820, 830, 840, and 850. The system receives 820 a natural language data analytics request based on data stored in one or more data stores. The system generates 830 an execution plan for processing the natural language data analytics request using a machine learning based language model, the execution plan comprising a set of steps. Each step comprises a set of instructions. One or more steps of the execution plan are associated with a constraint of the set of constraints. For example, if a constraint specifies use of a particular type of technique for a particular type of operation and the step performs that particular type of operation, the system associates the step with the constraint. The system may associate steps with constraints based on user feedback. Alternatively, the system determines that a step should be associated with a constraint based on matching of the description of the step and the description of constraints and confirms with a user whether the association is accurate. If confirmed, the system stores a link describing the association.

The system generates 840 the dataset by executing the execution plan and storing an association between the dataset and the constraint. The system also stores 850 an association between the dataset and constraints associated with steps used the create the dataset.

The system receives 860 a request to replace a constraint with a modified constraint. This step represents a potential policy change of the organization, for example, if a decision is made to use a model M2 instead of model M1 that is currently being used. The system identifies 870 a subset of datasets that are associated with the constraint based on the links between the constraints and the datasets. The system sends information describing the subset of datasets as datasets impacted by modification of the constraint. This information represents the exposure of the datasets to a potential modification to a policy constraint.

If the exposure of the change is large, i.e., the number of impacted datasets is above a threshold, the system may automatically determine not to make the modification of the policy constraint. Alternatively, a user may make the decision and provide the decision to the system by blocking the policy constraint modification.

Alternatively, the system or a user may make a decision to proceed with the policy constraint modification. The system assists with regeneration of the datasets impacted by the change in policy constraint. Accordingly, for each dataset impacted by the modification of the constraint, the system identifies the execution plan used to generate the dataset. The system identifies one or more steps of the execution plan used to generate the datasets that are associated with the constraint. The system regenerates instructions of at least the one or more steps of the execution plan using the machine learning based language model.

In-Context Learning Based Data Analytics Agents

According to an embodiment, the system performs in-context learning to generate data analytics agents for different contexts. For example, an organization, an enterprise, or even an individual user may be a tenant (or a customer) of the online system. The in-context learning may be performed for a tenant or customer of the online system. The in-context learning helps the online system generate execution plans that are specific to the context of a customer. The online system learns from the past analysis performed by users, e.g., employees of an organization to continuously refine and improve execution plans.

According to an embodiment, a data analytics agent is specialized for interacting with a specific type of data source, for example, a relational database or a document database. A data analytics agent may be specialized for a specific domain, for example, a vertical industry. The system simplifies the process of training a data analytics agent via in-context learning. A user, for example, a domain expert may use the system to process several context specific natural language data analytics questions. The system prompts the user for every execution plan being generated. The user responses guide the system to generate information specific to the data analytics agent including execution plans that are appropriate for a given context. The execution plans and their natural language data analytics equations as well as their instructions or code is stored. A software artifact may be generated based on the information generated for the data analytics agent. The software artifact may be deployed in specific contexts and allows other users to use the context specific data analytics agent.

FIG. 9 shows a flowchart illustrating a process of in-context learning for data analytics agents, according to an embodiment. The steps shown in FIG. 9 are performed by various modules of the online system 200. The steps may be performed in an order different from that indicated herein.

The system performs in-context learning of data analytics agents by generating execution plans for natural language data analytics requests specific to the data agent. A user provides several natural language data analytics requests relevant to the context for which the data analytics agent is being trained. Multiple users may provide feedback during various phases including planning phase, execution phase, and result analysis phase. The planning phase performs generation of an execution plan for natural language data analytics requests. User feedback is obtained to confirm various steps of the execution plan that are generated. Certain steps of the execution plan may be regenerated based on the user feedback. Alternatively certain portions of the execution plan may be determined to be finalized based on user confirmation. The execution phase performs execution of the execution plans of the natural language data analytics requests. User feedback is also provided for result analysis phase. After execution of the execution plan, the system finalizes and presents results. User feedback is obtained for the accuracy of results as well as the presentation of the results. For example, the presentation of the results may be modified based on user feedback. The system may generate a particular type of graph for displaying the results. If the user feedback indicates that the presented graph is inadequate or not preferred by the user, the system may regenerate the results in a different form, for example, a different type of graph or present the results in a different format, for example, in a table form. Once the presentation of result is approved by a user, the system may reuse the same presentation style in similar contexts, for example, for similar reports that may be generated. The system may store a mapping from categories of reports to the types of presentation styles approved by users over time. The system uses the mapping to determine the presentation style for new reports. For example, the system may match a new report with existing reports or categories of reports that were previously finalized. The system identifies the closest matching report and uses the presentation style that was previously used for the matching report or for reports of a matching category. The system may match reports by generating a vector representation of descriptions of reports and performing a vector comparison, for example, based on cosine similarity or certain vector distance metric. The system may generate a vector representation for a description of report based on the natural language description received for generating the report. The system may include information describing the execution plan of the report to generate the vector representation from information describing the report. Explicit feedback provided by users as well as implicit feedback is used for evaluating the new execution plan to determine whether it should replace an existing execution plan.

The system generates a plurality of execution plans by repeating the steps 900, 910, 920 for each of a plurality of natural language data analytics requests. The system receives 900 a natural language data analytics request. The system generates 910 an execution plan for processing the natural language data analytics request using a machine learning based language model. According to an embodiment, the system generates 910 the execution plan by generating a prompt that specifies the natural language data analytics request and requests a machine learning based language model 240 to generate the execution plan for the natural language data analytics request. The system receives a response obtained by executing the machine learning based language model 240 and extracts the execution plan from the response. The system stores 930 the generated execution plan and corresponding sets of instructions in association with the natural language data analytics request.

The system receives 930 a new natural language data analytics request. The system matches the new natural language data analytics request against each of the plurality of natural language data analytics requests to identify 940 a matching natural language data analytics request. According to an embodiment, the system generates vector embeddings for the new natural language data analytics request and compares the vector embeddings against vector embeddings of natural language data analytics requests that were previously processed. The system selects a matching natural language data analytics request based on vector distances between vector embeddings for the new natural language data analytics request vector embeddings of natural language data analytics requests that were previously processed. For example, the system may compare the vector distances with a threshold value to determine whether the two vector embeddings match.

The system generates 950 an execution plan for processing the new natural language data analytics request. The system uses a prompt for requesting the machine learning based language model to generate an execution plan for the new natural language data analytics request. The prompt specifies the new natural language data analytics request and also provides the execution plan of the matching natural language data analytics request for guidance. According to an embodiment, the prompt also specifies the matching natural language data analytics request. According to an embodiment, the prompt also specifies the instructions generated for the execution plan of the matching natural language data analytics request. The additional information helps the machine learning based language model generate the execution plan for the new natural language data analytics request.

It is possible that the new execution plan generated uses techniques that are superior to the execution plan of the matching natural language data analytics request. The system compares the execution plan of the new natural language data analytics request with the execution plan of the matching natural language data analytics request based on feedback received for each execution plan. According to an embodiment, the comparison is based on feedback received by the system for execution of different execution plans.

The system may receive explicit feedback from users. For example, during various steps of generation of execution plan or during execution of the execution plan, the system may present questions to the user and receive feedback based on user responses. The system aggregates feedback across various questions presented to the user and also across multiple users providing feedback.

The system may receive implicit feedback, for example, based on a number of users that execute the execution plan or based on execution efficiency of the execution plan. The system may generate a metric describing the feedback, for example, as a weighted aggregate of different types of feedback received.

The system determines whether to replace the execution plan of the matching natural language data analytics request with the execution plan of the new natural language data analytics request based on the feedback. For example, if the system determines that the new execution plan is superior, the system may replace an existing execution plan of a matching new natural language data analytics request with the new execution plan. According to an embodiment, the system replaces the existing execution plan by regenerating the existing execution plan using a prompt that provides the existing natural language data analytics request and the new execution plan and request the machine learning language model to generate an execution plan for the existing natural language data analytics request using the new execution plan for guidance.

According to an embodiment, the system executes the execution plan of the new natural language data analytics request to generate a report and sends the report for displaying via a user interface. According to an embodiment, the user interface for displaying the report is a dashboard. The system may execute the execution plan of the new natural language data analytics request to generate a report and sending the report for displaying via a user interface are performed based on a predetermined schedule for displaying the report on the dashboard.

According to an embodiment, the execution plan of the new natural language data analytics request incorporates one or more sets of instructions from the execution plan of the matching natural language data analytics request. Each of the one or more sets of instructions is marked as materialized.

Verification of Execution of Data Analytics Requests

The verification module 270 is configured to ensure the correctness, integrity, and explainability of analytical results generated from execution plans that process natural language data analytics requests. Operating within the online system 200, the verification module examines each step of an execution plan to confirm that intermediate outputs meet expected properties and relationships, without exposing raw data to the machine learning based language model. This is accomplished by traversing the execution plan in reverse, starting from the final analytical result and working back toward the original data sources, so that potential errors or unintended data transformations introduced along the way can be identified and localized.

The system traverses the execution plan in reverse order so it can start from the final analytical result and work backwards toward the original data sources, validating each intermediate step along the way. This reverse-walk approach allows the verification module to check whether every transformation, join, filter, or aggregation performed during forward execution preserved correctness and aligned with the intended computation. By analyzing the output of each step against applicable invariants, the system can accurately identify steps where discrepancies originated, for example, unintended data loss, incorrect joins, or faulty filters, rather than only detecting that the final output is wrong. The system works in reverse order of steps of the execution plan, also making use of breadcrumbs or checkpoints left during forward execution (e.g., row counts, key distributions), enabling the system to re-execute targeted verification code without exposing raw data to the machine learning based language model. This step-by-step backward validation provides precise localization of issues and a clear data lineage for explainability. The system may use external systems for running machine learning based language models, for example, LLMs. Exposing raw data to the machine learning based language model may require the system to expose sensitive data to external systems that may be unacceptable for several applications. Therefore, the system implements an architecture that uses the machine learning based language model for generating verification code that is executed locally by the system, thereby ensuring that raw data is never exposed to external systems.

To perform this analysis, the verification module incorporates several specialized submodules that coordinate closely. It manages extraction of step-level metadata, selection and application of appropriate invariants from a seed library or dynamically generated via the language model, construction of structured query inputs for AI-assisted code generation, execution of the generated verification code in a controlled environment, determination of any discrepancies against invariant expectations, and generation of detailed verification reports that present lineage, metrics, and failure points to the user. Together, these components enable the verification module to provide a robust, privacy-preserving framework for validating multi-stage analytics workflows, increasing user confidence in outputs while supporting debugging, compliance enforcement, and iterative refinement of execution plans.

System Architecture of Verification Module

Figure 10:
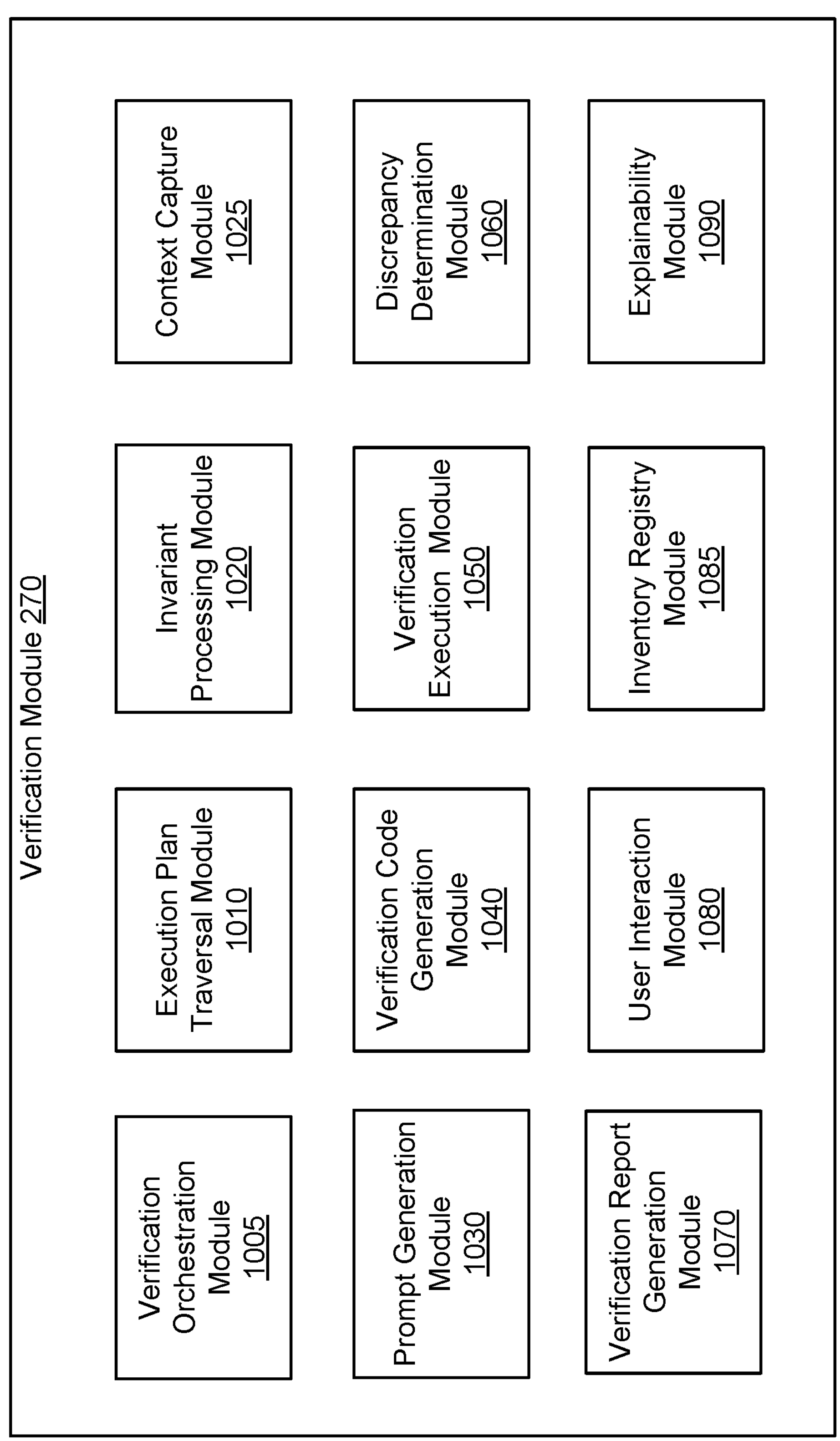
FIG. 10 illustrates the system architecture of a verification module, according to an embodiment.

FIG. 10 illustrates the system architecture of a verification module, according to an embodiment. The verification module 270 includes a verification orchestration module 1005, execution plan traversal module 1010, invariant processing module 1020, context capture module 1025, prompt generation module 1030, verification code generation module 1040, verification execution module 1050, discrepancy determination module 1060, verification report generation module 1070, user interaction module 1080, inventory registry module 1085, and explainability module 1090. Other embodiments may include more or fewer modules than those indicated herein. The modules may be executed by different processes in a distributed system. Each module is further described in detail.

Verification Orchestration Module

The verification orchestration module 1005 coordinates the verification workflow and manages pathway separation between generation and verification agents. The verification orchestration module 1005 serves as the central controller for the verification pipeline, coordinating multiple verification sub-roles, sequencing step execution, and enforcing deterministic operation across the entire workflow. The verification orchestration module 1005 accepts a verification trigger and a reference to the execution plan and artifacts, decomposes the work into per-step tasks, assigns them to specialized agents (planner, code writer, code critic, executor, summarizer), and tracks progress and outcomes until verification reports are produced. The orchestration logic ensures strict pathway separation between generation agents and verification agents, pins versions of templates and registries, and manages immutable, read-only access to artifacts so that verification runs are reproducible and auditable.

According to an embodiment, the verification orchestration module 1005 initializes a verification session by retrieving step lineage and metadata from the execution plan traversal module 1010 and establishing a per-step state machine. The verification orchestration module 1005 invokes the invariant processing module 1020 to select applicable invariants, bounded by policy, and passes the context to the prompt generation module 1030 to build structured inputs for verification code generation. The verification orchestration module 1005 delegates code creation to the verification code generation module 1040 and executes the resulting checks via the verification execution module 1050 within isolated, read-only sandboxes. Upon completion, the verification orchestration module 1005 forwards raw results to the discrepancy determination module 1060 for evaluation and to the verification report generation module 1070 and explainability module 1090 for human-readable summaries and lineage visualizations.

In one embodiment, the verification orchestration module 1005 enforces pathway separation through physical and logical isolation. The verification orchestration module 1005 runs verification agents in separate processes or containers from generation agents, applies distinct network policies and credentials, and mounts data artifacts in read-only mode. The verification orchestration module 1005 limits the information that can cross from verification to generation pathways and vice versa to metadata and signed references, preventing leakage of raw data or execution bias. The verification orchestration module 1005 ensures that only metadata and invariant specifications pass to language model services through the language model interface, while any execution against datasets occurs locally within controlled environments managed by the module.

According to an embodiment, the verification orchestration module 1005 constructs a step dependency graph from the execution plan and employs resource-aware scheduling rules (e.g., per-step CPU or memory budgets, maximum concurrency) to execute verification tasks deterministically. In some embodiments, the verification orchestration module 1005 implements a per-step finite-state machine with canonical states such as queued, planned, code_generated, executed, evaluated, and finalized. To guarantee deterministic operation, the verification orchestration module 1005 pins versions of invariant registries, prompt templates, tool images, and runtime environments for each verification session. The verification orchestration module 1005 applies canonical sorting of inputs, caps the number of invariants per step to a configured maximum, and records all random seeds used by downstream components where applicable. When appropriate, the module reuses previously verified code fragments keyed by invariant and step type, reducing variability and cost while preserving correctness guarantees.

In an error management embodiment, the verification orchestration module 1005 classifies failures into planning errors, code generation errors, execution errors, and invariant violations. For planning, code, or execution errors, the module applies deterministic recovery actions such as regenerating prompts with pinned templates, switching to cached code snippets, or migrating execution to a clean sandbox while preserving immutability of inputs. For invariant violations, the module triggers a remediation loop by assembling a discrepancy brief and optionally invoking planner and code writer roles to generate corrective suggestions, subject to user confirmation through the user interaction module 1080. The module escalates unresolved or policy-critical failures and can suspend verification for specific steps pending human review.

The verification orchestration module 1005 publishes progress and status events for consumption by the user interaction module 1080 and reporting components. In a streaming or incremental verification embodiment, the verification orchestration module 1005 monitors changes to upstream datasets or policy constraints and schedules verification only for affected steps, reusing prior pass artifacts where valid. In an embodiment, the verification orchestration module 1005 performs invariant selection pruning based on past success rates and step characteristics. The verification orchestration module 1005 records detailed timelines, resource usage, and per-agent metrics, correlating them with trace identifiers that span the verification session. The module exposes real-time progress to the user interaction module 1080, including counts of steps queued, in progress, passed, failed, and blocked, and provides drill-downs into agent-level logs attached to each state transition.

In operation, the verification orchestration module 1005 begins when a verification request is created, resolves plan and artifact references, constructs the verification DAG, and schedules planner work. Code generation and execution are then orchestrated step by step with deterministic gating and artifact attestation, followed by evaluation and reporting. The session is finalized by sealing all state, exporting audit trails, and releasing resources, ensuring that the entire verification pathway can be replayed or independently audited at any time.

Execution Plan Traversal Module

The execution plan traversal module 1010 traverses the execution plan in reverse order from the analytical result toward the original data sources, extracting per-step context including inputs, outputs, and metadata, and coordinating the sequence of step-by-step verification. This reverse traversal enables the system to verify the correctness of each intermediate step that led to the final analytical output. The execution plan traversal module 1010 identifies the sequence of steps in the execution plan, extracts key contextual information for each step, including input datasets, output datasets, and associated metadata and coordinates verification in a controlled and consistent manner.

In one embodiment, the execution plan traversal module 1010 operates on an execution plan represented as a structured data model, such as a graph or a linked list, where each node represents a step in the data processing pipeline. The execution plan traversal module 1010 starts traversal at the terminal node representing the final analytical output and progresses upstream through connected nodes until reaching one or more nodes representing the original data retrieval steps. At each node, the execution plan traversal module 1010 retrieves information such as transformation type, dependency mapping, identifiers of input and output tables or datasets, column-level metadata, and operational parameters. This information is passed to downstream modules, such as the invariant processing module 1020 or the prompt generation module 1030, for verification-specific actions. The execution plan traversal module 1010 invokes APIs to query the execution plan store for step-specific context and metadata, ensuring that only the necessary metadata, and not raw data is exposed, preserving privacy and reducing the overhead of verification operations.

To support deterministic, reproducible verification, the execution plan traversal module 1010 performs execution plan traversal within a dedicated verification pathway that is isolated from the generation pathway. This includes using separate agent processes, execution environments, and immutable artifact access patterns so that verification are not influenced by generation-time non-determinism. As part of traversal, every transformation step is classified by type (e.g., load, filter, aggregate, join, transform) and augmented with comprehensive context capture, recording What changed, When and Where it changed, How the transformation was performed, Who executed it, Which data was affected, and Why the operation was intended. This context may be referred to as the captured context, context, or W7 ontology context. These evidentiary records form the basis for invariant selection and explainability later in the pipeline.

Alternative embodiments perform traversal of the execution plan using event logs captured during the forward execution of the plan. In such embodiments, the execution plan traversal module 1010 reads logged events that include step identifiers, input/output descriptions, and state changes, and reconstructs the reverse path from output to source. This log-driven approach can be advantageous in scenarios where the execution plan dynamically changes or when live access to the plan representation is limited. In some embodiments, these logs are supplemented with code summaries from generation agents and any semantic lineage annotations so the verification plan has both programmatic and human-readable context.

According to an embodiment, the execution plan traversal module 1010 coordinates traversal with checkpoint data recorded at runtime. Checkpoints store intermediate results or summaries of intermediate states, such as row counts, null value statistics, hash values of datasets, and match/mismatch counts, which are used to validate whether intermediate steps retained data integrity. These checkpoints are treated as immutable, read-only artifacts in the verification pathway to guarantee reproducibility.

In some embodiments, the execution plan traversal module 1010 incorporates multi-tier lineage tracking that combines computed lineage, semantic lineage, and the context captured to map outputs back to their originating inputs. This enables detailed reconstruction of dependencies between steps and supports complex verification scenarios involving branching or merging of data flows. Lineage records can be queried at multiple levels of granularity, from high-level summaries of "what happened" to detailed transformation logs explaining "how" and "why" data changed.

The execution plan traversal module 1010 can be configured to selectively traverse only segments relevant to a specific verification request, such as a filter step or join operation flagged for analysis. This targeted traversal reduces computational costs and focuses verification agents on particular areas of concern. By integrating with other components of the verification module, and by operating as the orchestration layer for an independent, deterministic verification pipeline, the execution plan traversal module 1010 ensures each step's context is extracted, classified, and sequenced to support accurate, property-based, metadata-driven reverse verification of analytical results, with explainable outputs tailored to stakeholder expertise.

Invariant Processing Module

The invariant processing module 1020 manages and processes rules, referred to as invariants, that define expected properties or relationships between input and output data for each step of an execution plan under verification. These invariants act as validation constraints to ensure correctness of operations performed by the execution plan. The invariant processing module 1020 maintains a library of seed invariants, which are defined based on patterns and lessons learned from prior queries and verification tasks. The seed invariants may be provided by a user, for example, an expert, and are stored in a deterministic invariant registry with fixed templates, criticality levels (critical, warning, informational), and property categories (mathematical, structural, business-rule, temporal, preservation). This seed library represents a foundational set of rules covering common operations such as joins, aggregations, filters, and data transformations.

In one embodiment, the invariant processing module 1020 stores seed invariants in a structured format, such as a rule database or a configuration repository, with metadata describing each invariant's applicability conditions, required inputs, and expected outputs. The invariant registry is immutable for a given verification run to ensure reproducible outcomes. When a specific step in the execution plan is encountered during reverse traversal, the invariant processing module 1020 compares the step's characteristics, including transformation type (e.g., load, join, aggregate, filter, transformation), operation parameters, and associated metadata from the comprehensive context capture (What, When, Where, How, Who, Which, Why) with the invariants in the registry to deterministically select relevant rules. The selection process can use fixed mapping tables for transformation types, deterministic matching based on predefined tags or attributes, or semantic matching using keyword extraction and similarity scoring from the metadata.

In another embodiment, the invariant processing module 1020 determines and applies combinations of invariants for multi-constraint verification checks, allowing complex operations to be validated across multiple dimensions simultaneously. For example, an aggregation step might be checked for numeric accuracy, preservation of non-null values, and completeness of category coverage in the output. The invariant processing module 1020 assembles such combinations dynamically, guided by both classification-by-transformation-type and contextual metadata, and enforces a computational efficiency constraint by capping the number of invariants applied per step (e.g., maximum five per step).

If no seeded invariant matches the current step's purpose, the invariant processing module 1020 may trigger new invariant generation. In one embodiment, the invariant processing module 1020 generates new invariants by creating a structured query input for the machine learning-based language model, including the step's metadata, the captured context, intended transformation semantics, and any criticality classification, and requesting synthesis of a new invariant definition capturing expected input-output relationships or property constraints. The invariant processing module 1020 receives the language model's response, extracts the new invariant, and optionally stores it back into the registry for future reuse subject to human or automated review, thereby expanding step coverage deterministically over time.

In some embodiments, the invariant processing module 1020 incorporates closed-loop feedback where verification results and discrepancy patterns inform refinement of invariant applicability conditions or the template itself. This enables the set of invariants to evolve based on actual execution outcomes while maintaining deterministic behavior for identical inputs.

Context Capture Module

The context capture module 1025 captures relevant context for every transformation step executed within a verification session, recording the What, When, Where, How, Who, Which, and Why dimensions as a structured context record. The context capture module 1025 establishes a durable, tamper-evident source of truth that unifies technical artifacts with business intent, enabling deterministic verification, auditability, and rich explainability without relying on raw data exposure. By separating comprehensive context capture from traversal and verification logic, the module ensures that each step's evidentiary record is collected consistently, normalized across pipelines, and made available to downstream components that need consistent, privacy preserving context.

According to an embodiment, the context capture module 1025 captures following information for each transformation or step: What (the operation performed and the observed change, e.g., filters applied, columns added), When (monotonic timestamps and monotonic sequence numbers), Where (runtime and deployment environment identifiers, region, cluster, container image digests), How (tool names and versions, code and template hashes, parameter values), Who (user or service principal, tenant, role, approval context), Which (input and output dataset identifiers, schema fingerprints, content-addressed artifact references), and Why (declared business intent, policy references, and rationale captured from user instructions or system-inferred objectives). Each record is assigned a step identifier, linked to upstream and downstream step identifiers, and stored with cryptographic digests so equivalently produced steps generate identical context fingerprints across runs. The context capture module 1025 may persist these records in an append-only event store for replay and auditing and index them in a graph or relational store for low-latency queries.

The context capture module 1025 exposes resulting context objects to the prompt generation module 1030 as privacy safe, structured inputs and to the verification report generation module 1070 and explainability module 1090 for multi-level narratives and lineage visualizations. To guarantee determinism and auditability, the context capture module 1025 can compute and store identifiers for code, prompts, invariant definitions, and tool images referenced in the How dimension. Redaction and minimization controls are applied before any context leaves the local environment so that sensitive values are replaced with classifications or statistical descriptors, allowing downstream components to reason about structure and intent without raw data exposure.

The context capture module 1025 performs privacy and policy enforcement. A policy filter evaluates each W7 field against tenant-specific rules before distribution to other modules, masking identities or locations where necessary and producing context bundles tailored for the intended consumer. For the prompt generation module 1030, the module exports a canonical, metadata-only view that includes operation type, invariant list, lineage summaries, and environment digests, omitting identities or sensitive parameters. For the verification report generation module 1070 and explainability module 1090, the context capture module 1025 exports enriched narratives and references to visualizable lineage while preserving redaction requirements.

The module may integrate with external organizational systems to enrich and validate context records. An identity provider can be queried to resolve actor roles for the Who dimension. A configuration or CMDB can supply canonical environment identifiers for the Where dimension. An enterprise data catalog can augment Which with standardized dataset semantics, while a policy engine can validate Why against approved policy references.

By classifying and storing W7 attributes per step, merging programmatic lineage with semantic and business lineage, and exposing curated context bundles to prompt generation and reporting, the comprehensive context capture module 1025 supplies the explainability and determinism backbone of the verification pathway. The module's structured, immutable records allow downstream agents to reason precisely about each transformation's intent and execution environment, while its privacy-aware exports ensure that externalized intelligence operates solely on metadata and policy-approved descriptors. As a result, verification outcomes, narratives, and remediation guidance remain reproducible, auditable, and aligned with both technical and business requirements across diverse deployment models.

Prompt Generation Module

The prompt generation module 1030 constructs a structured query input, referred to herein as a prompt, for the machine learning based language model in the context of verification operations within the verification module 270. According to an embodiment, the prompt generation module 1030 operates as part of a dedicated verification pathway that is isolated from the generation pathway, in keeping with the deterministic verification architecture. By doing so, it ensures separation of duties between generation agents and verification agents, uses distinct execution environments, and applies immutable artifact access patterns so that verification outcomes are reproducible.

The prompt generation module 1030 takes the data and context available for a particular step in an execution plan and translates it into a concise, well-formatted, privacy-safe instruction set that the language model can act upon to produce verification code or recommendations. The prompt includes at least the following information: (1) Metadata describing the current step, (2) The set of invariants selected for that step from the deterministic invariant registry, along with criticality level and property category, (3) The local lineage and comprehensive captured context (What, When, Where, How, Who, Which, Why) derived from the metadata of the immediately preceding and following steps in the execution plan.

In one embodiment, the prompt generation module 1030 implements a template-driven prompt builder that uses predefined deterministic prompt templates for different transformation types (e.g., load, join, filter, aggregate, transform). These templates are fixed and version-controlled to ensure identical prompt phrasing for identical operations, which is key to reproducibility. Placeholders in the template are filled with the step metadata, selected invariants (capped per step for computational efficiency, e.g., max 5), captured context, and local lineage details. This approach ensures consistency in prompt structure and accommodates the input formatting requirements of the language model API. In another embodiment, the prompt generation module 1030 uses a rule-based formatter to dynamically select prompt structure according to the nature of invariants, transformation type classification from the execution plan traversal module 1010, or complexity of lineage.

The prompt generation module 1030 also implements privacy and compliance safeguards as part of deterministic verification. In one embodiment, a privacy filter subcomponent scans all metadata destined for the prompt to remove or mask values that could be considered sensitive, ensuring that only structural and statistical information (such as column names, data types, counts, and non-sensitive identifiers) is included.

To improve validation accuracy, the prompt generation module 1030 enriches the prompt with ordered lineage context and captured context based business intent metadata, explicitly enumerating the prior and next step metadata so the language model can account for data transformations before and after the current step. For example, if the current step is an aggregation, the prompt may include information about prior joins, downstream filters, critical invariants (e.g., preservation, completeness), and any temporal context to allow the generated verification code to validate not only aggregation correctness but also downstream constraints.

Verification Code Generation Module

The verification code generation module 1040 creates executable code used to validate individual steps of an execution plan, leveraging a machine learning based language model while maintaining strict controls on the data that is exposed. The verification code generation module 1040 transforms structured query input, built from metadata, selected invariants, and contextual lineage, into executable verification code that can be executed within the verification pipeline to check the correctness of intermediate results. The verification code generation module 1040 serves as the integration point with the language model interface module 260, submitting the prepared structured query input and receiving code output generated by the machine learning based language model. The verification code generation module 1040 also enforces privacy and compliance constraints by ensuring that only descriptive metadata and invariant specifications are provided to the machine learning based language model, never raw dataset values.

In one embodiment, the verification code generation module 1040 assembles the structured query input from multiple components, including the operation type for the step under verification, metadata summarizing inputs and outputs, and the set of invariants selected from the invariant processing module 1020. This structured query input is passed to the language model interface module 260, which handles communication with the underlying language model service. The verification code returned is then parsed, validated for syntactic correctness, and packaged for execution by the verification execution module 1050.

In another embodiment, the verification code generation module 1040 supports the use of invariant templates or skeletons, representing pre-defined code templates associated with base invariant structures. These templates are inserted into the prompt so that the language model only needs to fill in execution details, such as column names, aggregation parameters, or filter clauses, based on the current step's metadata and context. This approach improves determinism and reduces variation in generated code across runs, while still allowing adaptability to different step configurations.

The verification code generation module 1040 may further incorporate checks and post-processing routines to ensure the generated code conforms to expected resource usage policies, execution environments, and syntax for the target query language or programming language. In an embodiment, the verification code generation module 1040 maintains a cache of previously generated verification code snippets keyed by invariant and step type, allowing reuse in similar contexts without re-querying the language model, thereby improving efficiency.

In some embodiments, the verification code generation module 1040 optimizes prompt structure dynamically by analyzing historical language model performance for similar verification tasks. The verification code generation module 1040 may adjust prompt phrasing, order metadata sections for clarity, or add examples of past generated code to guide the machine learning based language model toward preferred verification logic. The verification code generation module 1040 safeguards sensitive data, produces executable and context-appropriate verification code, and integrates with the reverse execution plan traversal process for step-by-step result validation.

Verification Execution Module

The verification code generation module 1040 creates executable code used to validate individual steps of an execution plan, leveraging a machine learning based language model while maintaining strict controls on the data that is exposed. According to an embodiment, to perform deterministic verification, the verification code generation module 1040 operates within an independent verification pathway that is separated from the generation pathway, with distinct agent roles, execution environments, and artifact access patterns. The verification code generation module 1040 transforms structured query input, built from metadata, selected invariants, contextual lineage, and comprehensive captured context (What, When, Where, How, Who, Which, Why) into executable verification code that can be run within the verification pipeline to check the correctness of intermediate results. This execution is performed in a deterministic fashion using fixed, version-controlled invariant templates and reproducible prompt structures, ensuring identical outputs for identical inputs. The verification code generation module 1040 serves as the integration point with the language model interface module 260, submitting the prepared and immutable structured query input and receiving code output generated by the machine learning based language model. It enforces privacy and compliance constraints by ensuring only descriptive metadata, invariant specifications, and approved lineage context are provided to the language model, never raw data values, and that artifact access is strictly read-only.

In one embodiment, the verification code generation module 1040 assembles the structured query input from multiple components, including the classified transformation type for the step under verification, metadata summarizing inputs and outputs, criticality-level and property-category information for the invariants selected from the deterministic invariant registry in the invariant processing module 1020, and any temporal aggregation handling instructions identified during verification plan creation. This structured input is passed to the language model interface module 260, which manages communication with the underlying language model service. The verification code returned is parsed, syntactically and semantically validated by an agent, and packaged for execution by the verification execution module 1050.

In another embodiment, the verification code generation module 1040 uses pre-defined code templates associated with base invariant structures from the deterministic registry. These templates are embedded into the prompt so that the language model only fills in execution details, such as column names, aggregation parameters, or filter clauses based on the current step's metadata and captured context. This approach improves determinism, reproducibility, and efficiency, while reducing unwanted variation in generated code across runs, and still allows adaptation to different step configurations when necessary.

The verification code generation module 1040 may incorporate policy-driven checks and post-processing routines to ensure the generated code conforms to expected resource usage limits, execution environment constraints, and syntax for the target query or programming language. In one embodiment, the verification code generation module 1040 maintains a cache of previously generated verification code snippets keyed by invariant ID, transformation type, and criticality level, allowing deterministic reuse in similar contexts without re-querying the language model. In some embodiments, the verification code generation module 1040 optimizes prompt structure dynamically by analyzing historical language model performance and execution success rates for similar verification tasks, adjusting prompt phrasing, ordering metadata sections for clarity, and adding controlled examples from prior verified code to guide the machine learning based language model toward preferred logic.

Discrepancy Determination Module

The discrepancy determination module 1060 analyzes the output of the verification execution process to determine, in a deterministic and reproducible manner, whether each step in the execution plan meets the expectations defined by the selected invariants. The discrepancy determination module 1060 compares the verification results against invariant conditions drawn from a fixed, version-controlled invariant registry, identifies deviations, flags them as discrepancies, and localizes exactly which step or steps in the execution plan are responsible. In addition to discrepancy detection, the module correlates each violation with potential root causes, such as incorrect join type, unintended data loss during filtering, aggregation errors, or mismatched data formats, by leveraging transformation-type classifications, context capture (What, When, Where, How, Who, Which, Why), and lineage information to enable targeted remediation.

In one embodiment, the discrepancy determination module 1060 operates on a per-step basis, receiving from the verification execution module 1050 a structured, immutable output that includes both the computed metrics from the verification code and the expected values or properties defined by the invariants. The module calculates the difference or deviation for each invariant, determines whether the difference falls outside predefined tolerance thresholds, and flags it as a discrepancy when violations occur. Alongside the flag, it records the step identifier, input/output metadata, lineage context, and the specific invariants violated to assist in downstream reporting, ensuring that identical inputs produce identical discrepancy outputs across runs.

The discrepancy determination module 1060 may also operate in a multi-step, context-aware mode, where it not only flags a discrepancy at a single step but also traces its upstream and downstream propagation through the execution plan using multi-tier lineage tracking (programmatic, computed, semantic). For example, a data loss during an early filter step could surface as a metric mismatch in a final aggregation; the module performs tracing to correctly attribute the cause to the original filter rather than mislabel the aggregation.

Verification Report Generation Module

The verification report generation module 1070 produces a structured, deterministic verification report that captures both the results and the complete contextual record of the verification process applied to an execution plan. The verification report generation module 1070 consolidates and presents, in an organized format, the multi-tier lineage of the entire execution plan drawn from programmatic, computed, and semantic sources, the property-based invariants applied to each step along with their pass/fail outcomes, and quantitative metrics relevant to both successful and failed checks. Reports present evidence-based trust assessments, linking each intermediate transformation to its validation results. The module delivers these outputs as multi-level explanations calibrated to stakeholder expertise, ranging from high-level "What Happened" summaries to more detailed "How It Happened" transformation narratives and "Why These Decisions" intent rationales and may include textual summaries as well as visual representations such as discrepancy maps, annotated lineage diagrams, or step-by-step flow charts to help users understand both where and why data integrity issues have occurred.

In one embodiment, the verification report generation module 1070 aggregates structured outputs from upstream components, such as the discrepancy determination module 1060 and the verification execution module 1050, ensuring that all data originates from read-only, immutable artifacts to preserve reproducibility. It parses these outputs to build a hierarchical lineage view showing each step of the execution plan, its inputs, outputs, operational parameters, and W7 Ontology context dimensions (What, When, Where, How, Who, Which, Why) along with relationships between steps. For each step, the verification report generation module 1070 lists the invariants tested from the deterministic invariant registry, their descriptions, property categories and criticality levels, and the pass/fail status with associated metrics such as row counts, mismatch counts, aggregation discrepancies, preservation ratios, or null value statistics. Reports may be generated in machine-readable formats (e.g., JSON, XML) for programmatic consumption or in formatted, human-readable form (e.g., PDF, HTML) for presentation via the user interaction module 1080.

In another embodiment, the verification report generation module 1070 enhances the report with interactive visualizations. It may construct a lineage diagram by traversing the step graph produced by the execution plan traversal module 1010, labeling nodes with step IDs, transformation types, and invariant check results, and highlighting any failed steps with a distinct criticality-based visual style. The module may generate a discrepancy map by overlaying failure metrics and invariant categories on the lineage diagram or providing a side-by-side matrix view that lists each invariant, its expected property, actual outcome, and deviation values. These visual outputs can be interactive when delivered via a web-based client, allowing users to click on a failed step to drill down into detailed metrics, associated verification code snippets, and semantic explanations of the transformation.

User Interaction Module

The user interaction module 1080 manages communication between the verification system and human users, with a focus on capturing and processing targeted verification intent within a deterministic, pathway-separated trust architecture. Operating as part of an independent verification pipeline distinct from generation agents, the user interaction module 1080 enables a user to specify, via natural language or structured input a focused verification goal such as "verify why these customers were excluded" or "check if this aggregation dropped any valid records." The module interprets this intent, enriches it with comprehensive context capture using the W7 ontology (What, When, Where, How, Who, Which, Why), and integrates it into the verification workflow so that downstream processes, including prompt generation and invariant selection from the deterministic invariant registry, are aligned with the user's specific objective. Separation of duties is strictly maintained: while the planner and higher-level verification logic are aware of the verification goal and context, execution sub-agents that perform code execution (e.g., Code Executor in an isolated environment) do not have access to the overarching intent, thereby avoiding operational bias and ensuring reproducibility of verification outcomes.

In one embodiment, the user interaction module 1080 implements a natural language interface, either text-based or voice-based, using a combination of intent recognition models and domain-specific keyword mapping to extract verification goals. The extracted goal is stored as structured metadata, augmented with W7 ontology attributes and transformation-type classification that can be passed to the prompt generation module 1030, enabling embedding of goal-specific parameters, contextual constraints, and business-intent details into deterministic prompt templates for the machine learning based language model. In another embodiment, the module incorporates a guided form or wizard-style interface in which users select from predefined verification types (e.g., filter correctness, join completeness, aggregation consistency) and supply any additional conditions or identifiers. This structured approach reduces ambiguity, ensures invariants selected by the invariant processing module 1020 are appropriate for the stated goal and transformation type, and supports multi-category invariant combinations when necessary.

According to an embodiment, the user interaction module 1080 allows users to review verification outcomes in the verification report generation module 1070, presented at graduated detail levels ("What Happened," "How It Happened," "Why These Decisions") and provide additional clarification or follow-up goals. This refined intent, with W7 context and deterministic invariant mapping, is fed back into subsequent verification cycles, closing the loop between human guidance and automated, reproducible verification. By combining flexible intent-capture mechanisms, structured metadata handling enriched with ontology-based context, strict separation of roles, and integration into a deterministic, independent verification pathway, the user interaction module 1080 ensures that targeted verification is accurate, bias-resistant, reproducible, and responsive to stakeholder inquiries across diverse analytical workflows.

Inventory Registry Module

The invariant registry module 1085 provides a deterministic, version-controlled source of truth for invariant definitions and templates used during verification of analytical workflows. The invariant registry module 1085 hosts fixed invariant specifications, associates them with transformation types and property categories, assigns criticality levels, and enforces per-step caps so that verification remains computationally bounded and reproducible across runs. The invariant registry module 1085 exposes read-only query interfaces to downstream components during a verification session while preserving immutability guarantees by pinning a snapshot of the registry at session start. By separating invariant storage and governance from dynamic selection logic, the module ensures that identical inputs lead to identical invariant sets, templates, and limits, thereby embodying the system's immutability and reproducibility guarantees.

In one embodiment, the invariant registry module 1085 maintains a canonical data model for each invariant that includes a stable identifier, semantic name, human-readable description, transformation-type applicability (e.g., load, filter, join, aggregate, transform), property category tags (e.g., quality, completeness, integrity, algebraic, temporal), criticality (e.g., critical, warning, informational), parameter schema with defaults and validation rules, tolerance policies, applicability predicates, and references to versioned prompt fragments and code templates. Each invariant is stored such that it is content-addressable with cryptographic hashes, and grouped into immutable releases identified by a registry version. Release manifests include a mapping table from transformation type and context attributes to invariant identifiers and an enforcement policy that defines the maximum number of invariants per step.

In some embodiments, the invariant registry module 1085 stores deterministic code templates and prompt fragments alongside the invariant definitions so that code synthesis is constrained. In an embodiment, the invariant registry module 1085 implements a controlled lifecycle for new or modified invariants. Proposed entries pass automated checks for schema validity, unit tests against synthetic datasets, performance budgets, and conflict analysis with existing mappings. Human review by designated approvers is required to promote proposals into a candidate channel, and only a formal promotion to a stable channel produces an immutable registry release. The module supports deprecation windows wherein old invariants remain available for replay while new ones are introduced for future sessions, and the verification orchestration module 1005 selects the channel according to policy. Audit trails record who proposed, reviewed, and promoted each change, with signed attestations attached to the release manifest.

Explainability Module

The explainability module 1090 functions as a layered explanation engine that transforms verification outputs and captured W7 context into audience-calibrated narratives across graduated detail levels, including "What happened," "How it happened," and "Why these decisions." The module receives structured verification data and lineage from upstream components and assembles multi-level views that merge statistical evidence, invariant outcomes, and semantic intent into clear, reproducible explanations tuned to stakeholder expertise. By separating explanation logic from reporting, the module provides a deterministic framework for composing trust-assessment narratives, ensuring that identical inputs and policies yield identical explanations across runs while preserving privacy through metadata-only reasoning.

In operation, the explainability module 1090 consumes verification results, discrepancy classifications, and step lineage from the discrepancy determination module 1060 and the verification report generation module 1070, and augments them with records retrieved from the comprehensive context capture module 1025. The module references invariant descriptors, categories, and criticality levels from the invariant registry module 1085 to contextualize checks and translate pass/fail outcomes into confidence signals. Audience preferences, roles, and intents are obtained from the user interaction module 1080 to select appropriate explanation tiers, redaction levels, and visualization density. The verification orchestration module 1005 supplies session manifests and pinned versions for templates and policies to enforce determinism, while the execution plan traversal module 1010 provides the step graph that anchors per-transformation narratives.

In one implementation, the explainability module 1090 uses a template-driven composition engine with versioned narrative templates for common transformation types, including load, filter, join, aggregate, and transform. Each template defines canonical sections for the "what," "how," and "why" levels and maps structured inputs, step metadata, invariant outcomes, and W7 attributes into explanatory text and visual cues. A rule layer selects templates based on transformation type, blends invariant severity and categories into trust messaging, and applies audience-specific detail controls. The module emits views as structured payloads consumable by the verification report generation module 1070 or as embeddable components in dashboards and workflow systems.

In some embodiments, the explainability module 1090 implements graduated detail levels with explicit gating. The "what happened" tier presents high-level outcomes such as the count of checks passed, failed steps, and top lineage highlights. The "how it happened" tier explains the mechanics of transformations, for example, why rows were filtered, how groups were formed, and how joins matched or mismatched keys, using step metadata and invariant results. The "why these decisions" tier integrates business intent and policy rationales from the W7 context, showing how declared objectives or constraints influenced transformation choices and verification focus. Each tier employs deterministic ordering, fixed section headers, and stable phrasing drawn from pinned templates so that repeated runs produce identical narratives.

According to an embodiment, the explainability module 1090 computes confidence signals based on invariant criticality, coverage, and pass/fail counts. The module aggregates these signals at the step and pipeline levels and renders trust statements such as "all critical preservation and integrity invariants passed for aggregation steps," or "one critical join completeness check failed at step S4," accompanied by evidence references. Thresholds and weighting factors are sourced from policy overlays in the invariant registry module 1085 and sealed in the session manifest by the verification orchestration module 1005, ensuring reproducible trust scoring across sessions and tenants.

In an embodiment, the explainability module 1090 provides interactive views that allow users to drill into failing steps, and request additional rationale tied to policy references or intent annotations. The module integrates with the user interaction module 1080 to capture feedback signals that refine audience profiles, preferred phrasing, and visualization density, while preserving determinism through pinned template versions and stable ordering rules. Static export formats such as PDF or HTML are supported for audit and compliance artifacts, with embedded provenance records referencing session manifests and template digests.

Process of Verification

Figure 11:
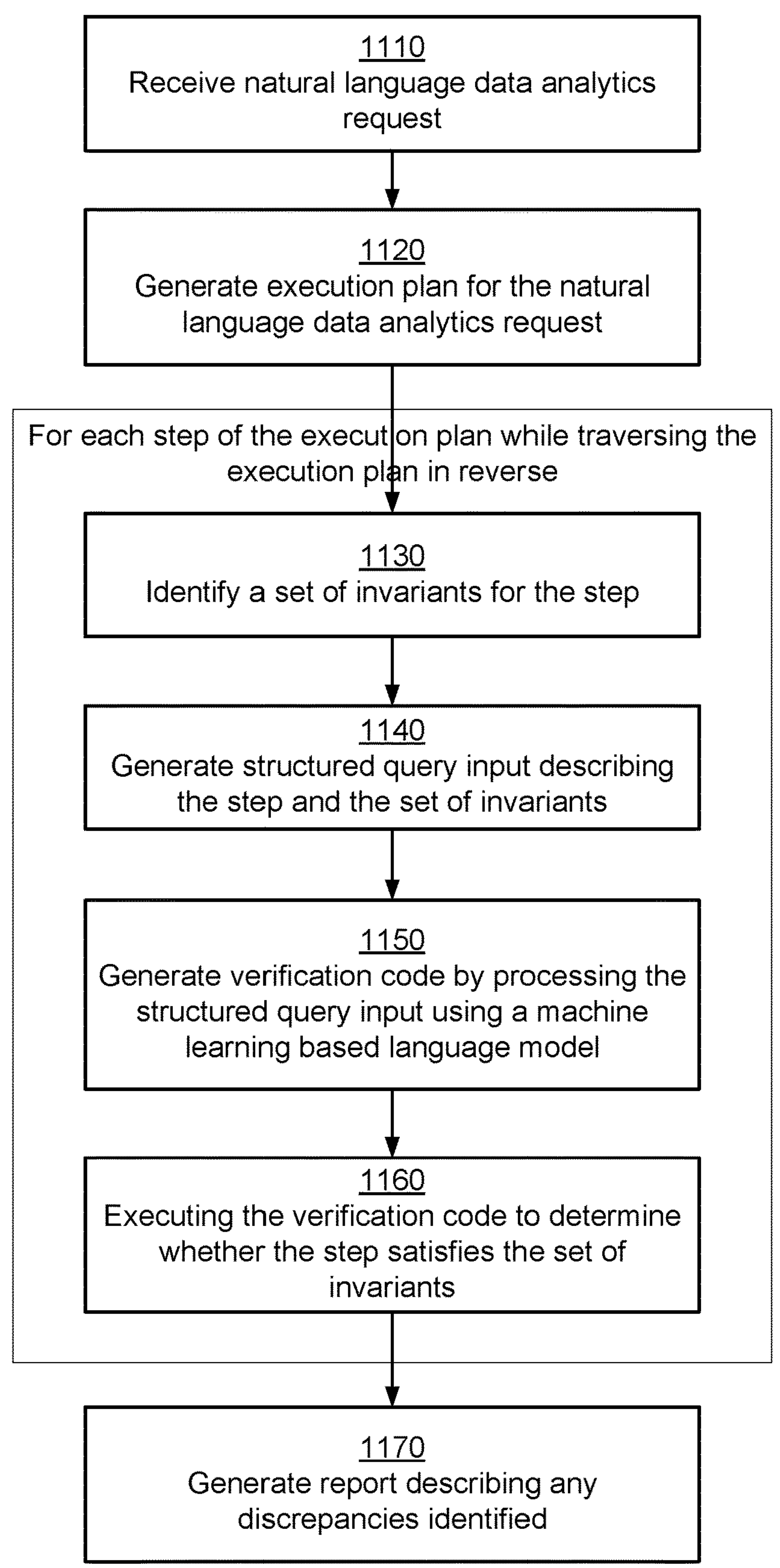
FIG. 11 is a flowchart illustrating the overall process for performing verification of analysis performed based on a natural language analytics request, according to an embodiment.

FIG. 11 is a flowchart illustrating the overall process for performing verification of analysis performed based on a natural language analytics request, according to an embodiment. The process may be executed by modules of a system, for example, the verification module 270 of the online system 200, and is coordinated by a verification orchestration module 1005 that operates an independent verification pathway separate from the generation pathway to ensure deterministic outcomes. The steps may be executed in an order different from that indicated herein, and certain steps may be performed in parallel where dependencies allow.

The user interaction module 1080 receives 1110 a natural language data analytics request from a user via a graphical interface displayed on a client device. In one embodiment, this step may involve parsing free-form text entered in a search or query field, where the user specifies the data analysis they wish to perform. The user interaction module 1080 may perform natural language processing (NLP) preprocessing to clean and tokenize the request before passing it onward. In alternative embodiments, the natural language data analytics request may be captured via voice input, a structured form, or API calls from other systems.

The prompt generation module 1030 generates 1120 an execution plan for the natural language data analytics request using a machine learning based language model. In one embodiment, the prompt generation module 1030 builds one or more structured query inputs containing the user intent, relevant domain metadata, and constraints, and sends it to the language model interface module 260. The response obtained by processing the structured query input by the machine learning based language model is processed to produce a sequence of ordered steps forming the execution plan. Before verification begins, the verification orchestration module 1005 pins the verification session to a deterministic configuration and establishes pathway separation so that subsequent verification code executes in isolated environments with read-only access to artifacts, avoiding leakage of raw data to external language model services.

The verification module 270 performs actions 1130, 1140, 1150, 1160 for each step of the execution plan while traversing the execution plan in reverse order, starting from the result of the analysis obtained by executing the execution plan back to the data input steps that start the execution of the execution plan. For each step, the verification orchestration module 1005 coordinates agent roles (planner, code writer, code critic, executor, summarizer), enforces computational limits, and tracks progress, while the execution plan traversal module 1010 and the comprehensive context capture module 1025 assemble per-step context and lineage that include the seven W7 dimensions (What, When, Where, How, Who, Which, Why) to supply complete evidentiary records into the verification pathway.

The invariant processing module 1020 identifies 1130 a set of invariants applicable to the current step of the execution plan as the verification process traverses it. In one embodiment, these invariants are selected deterministically from an invariant registry module 1085 that hosts fixed, version-controlled invariant definitions and templates tagged by transformation type and property category (e.g., quality, completeness, integrity, algebraic, temporal) and by criticality (e.g., critical, warning, info), with per-step maximum counts enforced for computational efficiency. Selection can be based on the step type (e.g., join, aggregation), metadata describing the step, the captured W7 context, or historical failure patterns. In alternative embodiments, if no suitable invariant exists in the registry, the invariant processing module 1020 requests the machine learning based language model to synthesize a new invariant, or combines multiple existing invariants to perform multi-constraint verification for the step. The metadata for the step may include column names, expected data types, cardinality information, row counts, or key uniqueness constraints.

The prompt generation module 1030 generates 1140 a structured query input describing the step and the set of invariants identified in the previous step. The structured query input may include metadata such as input/output column names, record counts, and transformation parameters, along with invariant definitions, and is enriched with the step's W7 context to carry both technical and business intent into code synthesis while excluding raw data values for privacy. The structured query input is formatted to meet any requirements of the machine learning based language model and is constructed from deterministic, versioned templates to reduce variance and improve reproducibility.

The verification code generation module 1040 generates 1150 executable verification code by processing the structured query input using the machine learning based language model. In one embodiment, the verification code generation module 1040 sends the prompt to the language model interface module 260, receives the generated code, and validates it for syntax and compliance with execution sandbox constraints. The generated verification code is tailored to check whether the step's actual output adheres to the identified invariants and may be constrained by fixed code templates associated with registry entries to ensure deterministic generation across runs. In alternative embodiments, code skeletons for common checks can be filled in with step-specific details by the language model to improve determinism and speed.

The verification execution module 1050 executes 1160 the verification code to determine whether the step satisfies the set of invariants identified. The execution is performed within an isolated, read-only sandbox environment under the independent verification pathway to preserve separation of duties and prevent unintended changes to production data or influence from generation agents. The results of individual invariant checks are recorded, including pass/fail status and any deviation metrics. Alternative embodiments may parallelize checks across multiple threads or distributed processing nodes to speed up analysis of large datasets. According to various embodiments, the executable verification code comprises instructions for performing one or more checks selected from: completeness of data joins, correctness of input columns, preservation or expected change of row counts, aggregation accuracy, mathematical consistency checks, and detection of null or missing values.

The discrepancy determination module 1060 analyzes verification outputs to localize deviations to specific steps and correlate them with likely causes based on transformation type and captured context, enabling targeted remediation and precise lineage-based attribution within the reverse-traversed plan. The verification orchestration module 1005 records outcomes against the pinned session configuration and advances the workflow or initiates remediation loops as required.

The verification report generation module 1070 and the explainability module 1090 generate 1170 a report comprising human-readable outputs from the same verification data. In one embodiment, the report includes a per-step breakdown of the invariants applied, the verification outcomes, and data lineage information showing where issues occurred, accompanied by discrepancy maps and annotated lineage diagrams for easier interpretation. The explainability module 1090 assembles graduated detail levels, "what happened," "how it happened," and "why these decisions" calibrated to stakeholder expertise, merging statistical results with semantic rationale drawn from the W7 context and invariant criticality to produce evidence-based trust assessments. Reports can be customized by audience, stored for future reference or policy compliance audits, and presented via a graphical user interface, including discrepancy maps showing failed verification steps of the execution plan. Visual outputs such as discrepancy maps and annotated lineage diagrams may be created for easier interpretation. In alternative embodiments, the report can be customized based on the user for whom the report is generated. For example, if the user requesting the results in a technical person, detailed technical data is generated in the report and if the user is a non-technical person, high-level summaries are generated in the report. The report may be stored for future reference or policy compliance audits. According to an embodiment, information describing the discrepancies are presented via a graphical user interface, a discrepancy map showing failed verification steps of the execution plan.

Example Execution of Natural Language Data Analytics Request

According to an illustrative example, the system receives a natural language request stating, "I have our Q1 2025 vendor invoices in the invoices/folder and our QuickBooks 'Expenses by Vendor Summary' report. Please reconcile these invoices against the QBO expense report and identify matched invoices, amount discrepancies, missing items, and vendor name variations." The system generates a forward execution plan that decomposes the task into concrete steps.

A first step loads 39 PDF invoices from the invoices/folder into a structured invoices_df table. A second step loads the QuickBooks "Expenses by Vendor Summary" for the same quarter into qbo_df representing 18 vendors across 3 months. A third step normalizes vendor names and formats in both datasets to reduce string variation, producing normalized_invoices_df and normalized_qbo_df. A fourth step performs a join to match normalized invoices to QBO entries, emitting matched_df as well as unmatched_invoices and unmatched_qbo sets. A fifth step aggregates discrepancies by type and vendor, generating discrepancy_summary_df that classifies amount mismatches, missing items on either side, and temporal misalignments. A final step composes a reconciliation report that summarizes matched counts, lists the discrepancy categories with supporting metrics, and aligns totals for human review.

Upon forward execution, the system outputs a reconciliation summary with concrete counts and exemplars. The system reports that 35 of 39 invoices are matched between invoices_df and qbo_df, with four discrepancies identified across distinct categories. The discrepancy summary flags a specific amount mismatch (for example, a cloud services invoice posted at $425 versus $385 in QBO), a vendor name variation case that required normalization to align a common supplier (for example, "Amazon Web Services" vs "AWS"), an instance of a partial payment or allocation issue (for example, a professional services vendor such as "Morrison & Associates"), and a temporal mismatch (for example, an insurance premium recorded in a different month for "Hartford Insurance"). The system also reports preserved totals and row counts across steps so an analyst can see that all records are accounted for and where exceptions lie.

Following forward execution, the system constructs a verification plan that validates each transformation step against property-based invariants, operating on intermediate artifacts in read-only mode. For both load steps, the plan applies row_count_validation invariant to ensure the expected number of records are ingested and schema_validation to confirm presence and types of required fields. For the normalization transform, the plan enforces row_preservation invariant to ensure no records are lost and column_mapping_validation invariant to confirm that vendor name standardization produced the expected columns and mappings. For the join step, the plan checks join_completeness invariant to ensure that the sum of matched and unmatched records equals the total inputs, key_integrity invariant to validate join keys and their uniqueness where applicable, and unmatched_tracking invariant to confirm all unmatched rows are captured for both sides. For the aggregation step, the plan applies group_uniqueness invariant to confirm one output row per group, count_consistency invariant to reconcile counts against inputs, and category_completeness invariant to ensure all discrepancy categories are represented without uncategorized residuals. For the final reconciliation transform, the plan enforces output_completeness invariant to ensure all required sections of the report are present and total_reconciliation invariant to assert that pipeline-level monetary totals are preserved or reconciled within configured tolerances.

Execution of the verification plan produces deterministic, step-by-step results that substantiate the reconciliation. All load and schema checks pass, confirming that the system ingested 39 invoices and the expected QuickBooks summary structure. Normalization checks pass with row preservation equal to 39 on the invoices side and complete mapping coverage for vendor fields, demonstrating that standardization did not drop or duplicate records. Join checks show that matched_df plus unmatched_invoices and unmatched_qbo exactly account for all inputs, with key integrity satisfied under the normalized keys. Aggregation checks pass, with group uniqueness established and count consistency demonstrating that discrepancy_summary_df aligns with matched and unmatched tallies. Final report checks confirm output completeness and that monetary totals reconcile end-to-end (for example, a preserved quarterly total such as $31,108.27 within tolerance). The verification run concludes with a consolidated assessment indicating that all selected invariants passed, the four reported discrepancies are correctly categorized and localized to specific steps, and the reconciliation output may be trusted because every transformation that produced it has been independently validated against its expected properties.

Alternative Embodiments of Verification of Execution of Requests

According to an embodiment, the verification module 170 enhances the verification process for a particular step in an execution plan by starting with a curated set of seed invariants, matching them to the characteristics of the step, and then using a machine learning based language model to synthesize new invariants where necessary. The system maintains a library of seed invariants that were manually derived from extensive prior analyses of data analytics execution plans, for example, a set of rules covering common operations such as joins, aggregations, filters, and data transformations. When a step is encountered during reverse traversal of the execution plan, metadata describing the step, for example, its operation type, input/output schema, row counts, column data types, and lineage context is used to select one or more relevant seed invariants from the library using deterministic matching, semantic search, or rule-based mapping. The system then generates a structured query input (prompt) for the machine learning based language model that encapsulates the step metadata, the selected seed invariants, and any contextual details from adjacent steps. The machine learning based language model processes this prompt and returns a response that may include code or natural language descriptions of invariants. The system extracts a new invariant to address edge cases or conditions unique to that execution step, such as domain-specific constraints, special aggregation rules, or tolerance thresholds. The newly generated invariant may be stored back into the library for future reuse, optionally subject to expert review. This allows the invariant store to evolve dynamically over time while improving coverage and robustness of the verification framework.

According to an embodiment, the system enhances the accuracy and robustness of the verification process by selecting not just individual invariants, but combinations of multiple invariants that are tailored to the specific type of data transformation being performed in a given step of the execution plan. In one implementation, when the verification module identifies that a step represents a join operation, it can select a combination of invariants such as "join completeness" to ensure all intended rows are matched, "mismatch detection" to flag unexpected key errors, and "row count preservation or expected change" to check that the join aligns with anticipated dataset size changes. For aggregation operations, combinations may include "aggregation accuracy" to confirm correctness of computed metrics, "group key integrity" to ensure groupings are consistent, and "null-value handling" to confirm proper treatment of empty fields. For filtering operations, combinations might involve "filter condition correctness" to ensure only intended rows remain, "excluded set validation" to check removed data matches conditions, and "post-filter continuity" to ensure key associations remain valid. For data type conversions, the system may select invariants like "type integrity" to verify conversions match expected formats, "data value range validation" to ensure converted values remain in valid bounds, and "encoding correctness" to prevent information loss during conversion. The combinations may be dynamically adjusted based on metadata context, user-provided intent, or predefined verification templates for common transformation categories, allowing flexible yet precise verification across diverse analytics workflows.

According to an embodiment, the system enhances the accuracy and relevance of the machine learning based language model's output for verification by embedding local lineage context into the structured query input. Accordingly, instead of describing only the current step under verification, the system also incorporates metadata from at least one preceding step and at least one succeeding step in the execution plan. The preceding step's context can include details such as the type of operation performed, input/output schemas, transformation parameters, and any applied filters, which help the model understand how the current step's inputs were produced. The succeeding step's context can likewise include expected outputs, downstream transformation types, or constraints that influence how the current step's output will be used. In one embodiment, the prompt generation module collects this metadata from the execution plan traversal module in reverse-walk order, ensuring no raw data is exposed, and appends it to the structured query input in a well-defined format recognized by the language model. In another embodiment, the lineage context spans multiple preceding and succeeding steps if the operations are complex or have dependent relationships, enabling deeper reasoning about data integrity across transitions.

According to an embodiment, the system enhances the verification process by not only detecting that a discrepancy exists, but also pinpointing the exact location in the execution plan where the deviation from expected output occurred and documenting it with comprehensive, structured details. In one embodiment, the discrepancy determination module 1060 receives step-level verification results from the verification execution module 1050 and compares them against expected outcomes defined by the applicable invariants. When a mismatch is detected, the verification execution module 1050 correlates it to the specific stage or step within the reverse-traversed execution plan, using metadata and lineage information collected by the execution plan traversal module 1010. A verification report generation module 1070 compiles a detailed report that includes the lineage of intermediate results, showing how data moved and transformed across steps, alongside a record of the invariants tested at each stage and explicit identification of any failed checks, including associated metrics such as row counts, null counts, or mismatched keys. In alternative embodiments, the lineage may be represented visually using annotated flow diagrams or discrepancy maps that highlight the failing step. The system may enrich the report with contextual information from preceding and succeeding steps to aid root-cause diagnosis, and the report can be output in machine-readable formats (e.g., JSON, XML) for integration into automated remediation workflows or compliance auditing systems.

According to an embodiment, the system stores intermediate verification outcomes during forward execution of the execution plan as checkpoint data for use in verifying execution of the execution plan. The system preserves verification-related information at various points during the forward execution of an execution plan so that it can later be used when the plan is traversed in reverse for verification purposes. By checkpointing intermediate verification outcomes, such as row counts, key distributions, null-value statistics, join match rates, or output of specific invariant checks, the system creates a step-by-step audit trail that captures the state of data and validation results immediately after each transformation. In one embodiment, the verification execution module 1050 records this checkpoint data in a secure, structured log or datastore, associating each record with the corresponding execution plan step identifier and metadata. When reverse verification is later performed by the execution plan traversal module 1010, these stored outcomes allow the system to quickly validate whether the forward execution satisfied relevant invariants without needing to re-compute intermediate results from scratch, improving efficiency and enabling verification even if source systems have changed. Alternative embodiments may store checkpoints in-memory for short-lived verification sessions, persist them long-term for compliance or audit workflows, or selectively capture only certain checkpoints based on configurable policies such as risk level or data sensitivity.

According to an embodiment, the system enhances the verification process by automatically recommending corrective modifications to the execution plan when discrepancies are detected between expected and actual outputs in one or more steps. In one embodiment, the discrepancy determination module 1060 analyzes the verification results from the verification execution module 1050 and identifies deviations from the invariants associated with specific steps. The prompt generation module 1030 then builds a structured query input for the machine learning based language model, ensuring that it includes a detailed description of the discrepancies, the nature of the failed invariants, and contextual lineage information for the associated steps in the execution plan. This structured query is provided to the language model interface module 260, which sends it for processing by the machine learning based language model. The response generated by the machine learning based language model is received and parsed to extract precise recommendations for corrective actions, for example, altering join conditions, adjusting filter parameters, changing data cleaning logic, or modifying aggregation methods. In alternative embodiments, the recommendations may include step reordering, substitution of more suitable algorithms, or introduction of additional validation checks upstream in the plan. The process may operate interactively by presenting the suggested changes to the user interaction module 1080 for approval before automatically applying them, or it may integrate with execution plan traversal module 1010 to dynamically inject modifications and re-run affected steps to confirm resolution of detected issues.

According to an embodiment, the verification orchestration module 1005 enforces pathway separation by operating a verification pathway independent from generation, assigning sub-roles including planner, code writer, code critic, executor, and summarizer, and executing all verification tasks in isolated environments with read-only access to intermediate artifacts to ensure deterministic behavior. The verification orchestration module 1005 schedules step work against a dependency graph derived from the execution plan, manages dedicated worker pools with resource budgets and back-pressure, and advances each step through a finite-state machine (queued, planned, code_generated, executed, evaluated, finalized) while saving transition events.

According to an embodiment, a verification session is pinned at start time by the verification orchestration module 1005 producing a signed session manifest that fixes invariant registry release, prompt template versions, tool/runtime image digests, canonical sorting rules, and random seeds. The manifest is attached to prompts, generated code, execution results, and reports, and is validated at each state transition so that replays reconstruct the exact inputs and environments. Downstream modules use the manifest token to retrieve pinned materials and to record provenance, ensuring that repeated runs with identical inputs produce identical outcomes.

According to an embodiment, the comprehensive context capture module 1025 records, for every transformation step, a W7 evidentiary record specifying What, When, Where, How, Who, Which, and Why, and persists these records with cryptographic digests and lineage links to upstream and downstream steps. The records are written to an append-only event store and may be anchored via a hash chain to a tamper-evident ledger for integrity. The module exports redacted, metadata-only context bundles to any language model interactions, and exposes full but privacy-controlled context to reporting and explainability so that business intent and technical artifacts are consistently represented across the pipeline.

According to an embodiment, the invariant registry module 1085 provides deterministic selection by hosting version-controlled invariant definitions and templates tagged by transformation type, property category (quality, completeness, integrity, algebraic, temporal), and criticality (critical, warning, informational), while enforcing a per-step maximum count to bound computation. When more candidates match than permitted by the cap, a registry-defined tie-break order based on criticality and stable identifiers yields a reproducible subset. Each registry release is addressed by a content digest and distributed with a signed manifest enumerating invariant definitions, mapping tables, and template artifacts; consumers reference specific digests when assembling prompts and code. Temporal variants and engine-specific template selections are made deterministically based on an environment profile captured at session start.

According to an embodiment, the prompt generation module 1030 selects transformation-type-specific, versioned prompt templates and fills placeholders with step metadata, selected invariant descriptors, and ordered lineage context using canonical field ordering to reduce variance across runs. Prompts are strictly metadata-only and exclude raw data values. According to an embodiment, the verification code generation module 1040 constrains synthesis using deterministic templates and parameter schemas sourced from the invariant registry, validates syntax and policy conformance, and reuses previously verified code fragments keyed by invariant identifier, transformation type, engine/dialect, and template version to reduce latency and variability while preserving determinism.

According to an embodiment, the verification execution module 1050 runs the generated verification code inside a container or process sandbox with read-only mounts to step artifacts, isolated credentials and network policies from any generation pathway, and optional remote attestation of the execution environment. The module records environment digests and runtime seeds for reproducibility and restricts egress to approved logging or telemetry endpoints. Pathway separation further restricts information exchange between generation and verification to signed references and metadata so that no raw data or execution artifacts cross pathways, and only metadata is provided to any language model service.

According to an embodiment, the discrepancy determination module 1060 maps invariant violations to probable root causes using deterministic rules keyed by transformation type and captured context, localizes failures to specific steps within the reverse-traversed plan, and may trigger remediation loops governed by the orchestration module. The orchestration module can schedule incremental verification only for steps affected by upstream dataset changes or policy modifications by computing impact scopes from lineage links, thereby reducing re-verification cost while maintaining coverage.

According to an embodiment, the explainability module 1090 generates audience-calibrated explanation tiers including at least "what happened," "how it happened," and "why these decisions," using pinned narrative templates selected by transformation type and audience role. Narratives are composed from invariant outcomes, W7 context, and invariant criticality to compute step- and pipeline-level trust assessments, and include provenance references to the session manifest and invariant registry release. Audience preferences captured via the user interaction module 1080 select redaction levels, visualization density, and narrative tier without altering verification computations or artifacts.

According to an embodiment, the system operates with comprehensive governance and scale features. Multi-tenant isolation is enforced through distinct credentials, network policies, and storage scopes so verification agents cannot modify generation artifacts and generation agents cannot access verification sandboxes. Observability signals and audit logs spanning the verification session are exported for enterprise governance. The architecture depicted in the verification module diagram identifies the cooperating modules that implement these embodiments and their interactions within the deterministic verification pipeline.

Verification User Interface

FIGS. 12A-12K present screens shots of user interfaces illustrating user interactions with a system performing verification of analysis results as described herein. These user interfaces are configured by the system and may be sent for presentation to a user via an application running on a client devices, for example, a browser. FIGS. 12A-12D illustrate how the system supports an end-to-end analytics workflow: accepting a natural language request, automatically identifying relevant data sources and constructing a forward execution plan, generating a backward-walking verification plan with dynamically selected invariants to validate each operation, and exposing a visual pipeline with drill-down step details for transparency and traceability.

Figure 12A:
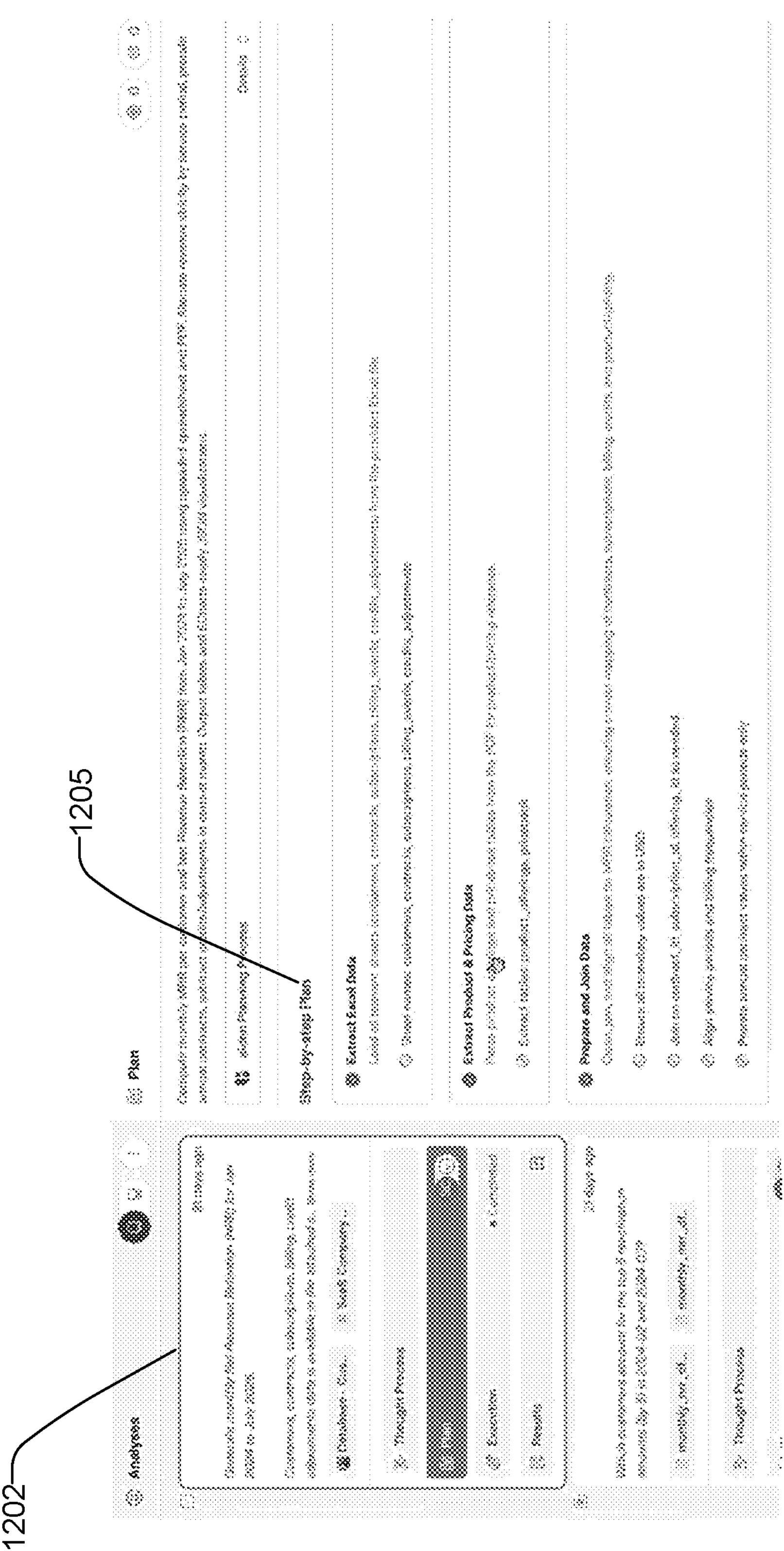
FIG. 12A shows a screenshot of a user interface for processing natural language data analytics requests, according to an embodiment.

FIG. 12A shows a screenshot of a user interface for processing natural language data analytics requests, according to an embodiment. In FIG. 12A, the user interface includes widget 1202, which is a text input area for receiving a natural language text query specifying the analytics to perform. For example, a user may enter "Generate monthly Net Revenue Retention (NRR) for January 2024 to May 2025," without needing to know where the relevant data resides. The system interprets this request and automatically identifies the required data sources, for example, customers, contracts, subscriptions, billing_events, and credits_adjustments from provided files or connected databases. The system generates an execution plan, shown in widget 1205, describing step-by-step operations: extracting Excel sheets (customers, contracts, subscriptions, billing_events, credits_adjustments), parsing product offerings and pricebook tables from PDFs; cleaning and joining data; ensuring monetary values are in USD, joining on key fields (contract_id, subscription_id, offering_id) as needed, aligning service periods and billing frequencies, and preparing annual contract values within the defined service periods. This execution plan represents the forward path from raw data to final computed metrics, such as the requested net revenue retention.

Figure 12B:
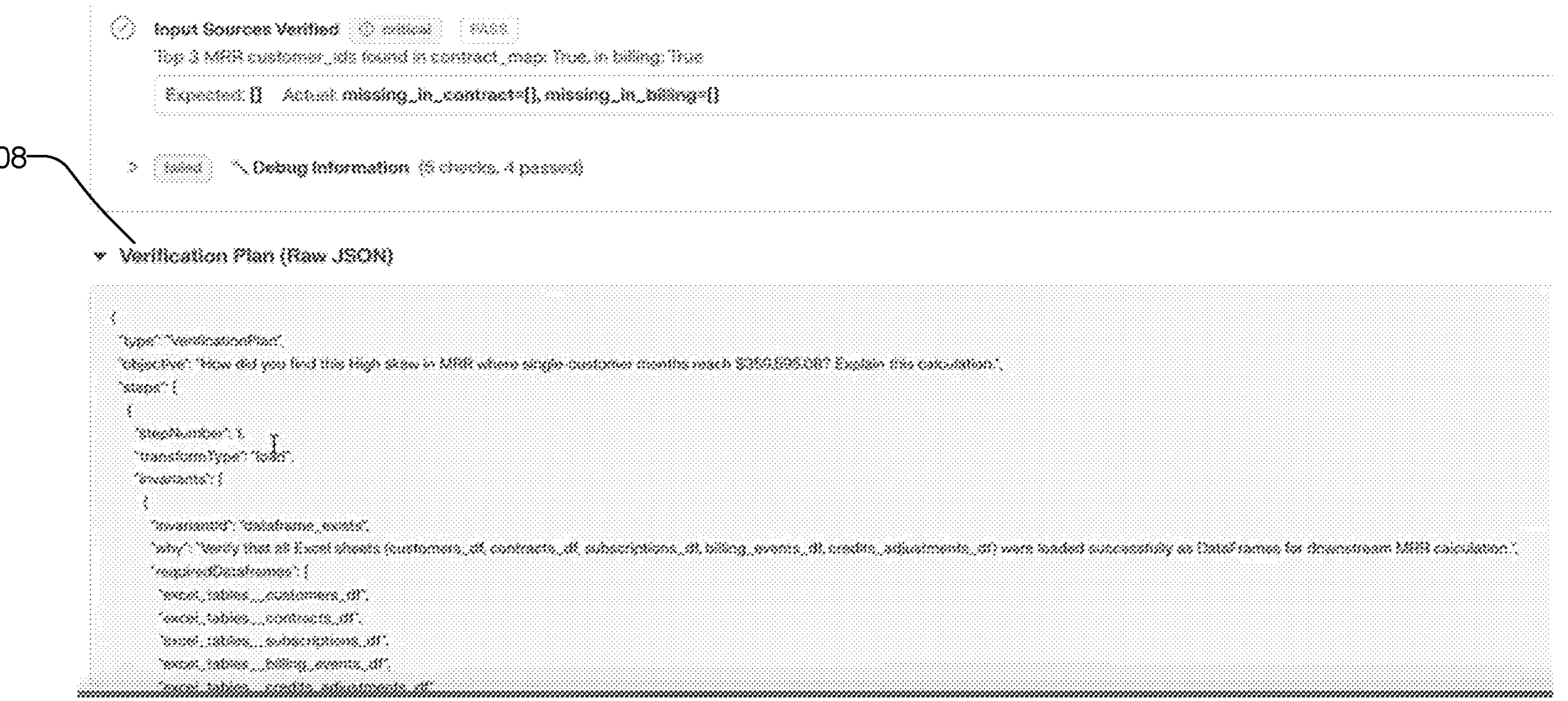
FIG. 12B shows a screenshot of a user interface displaying a verification plan, according to an embodiment.

FIG. 12B shows a screenshot of a user interface displaying a verification plan, according to an embodiment. The user interface presents a verification plan in widget 1208. This plan is derived by working backward from the execution plan to determine critical checks and invariants for validating each stage. For instance, the verification plan may include steps to verify that all required Excel dataframes (customers_df, contracts_df, subscriptions_df, billing_events_df, credits_adjustments_df) were loaded successfully, perform join completeness checks for top MRR customers across mapping and billing records, and ensure no rows are missing. Verification information is also displayed, showing which checks passed or failed. The verification plan encodes the validation logic in structured form (e.g., raw JSON) detailing the objective (such as explaining high skew in single-customer monthly revenue) and the specific invariants to apply.

Figure 12C:
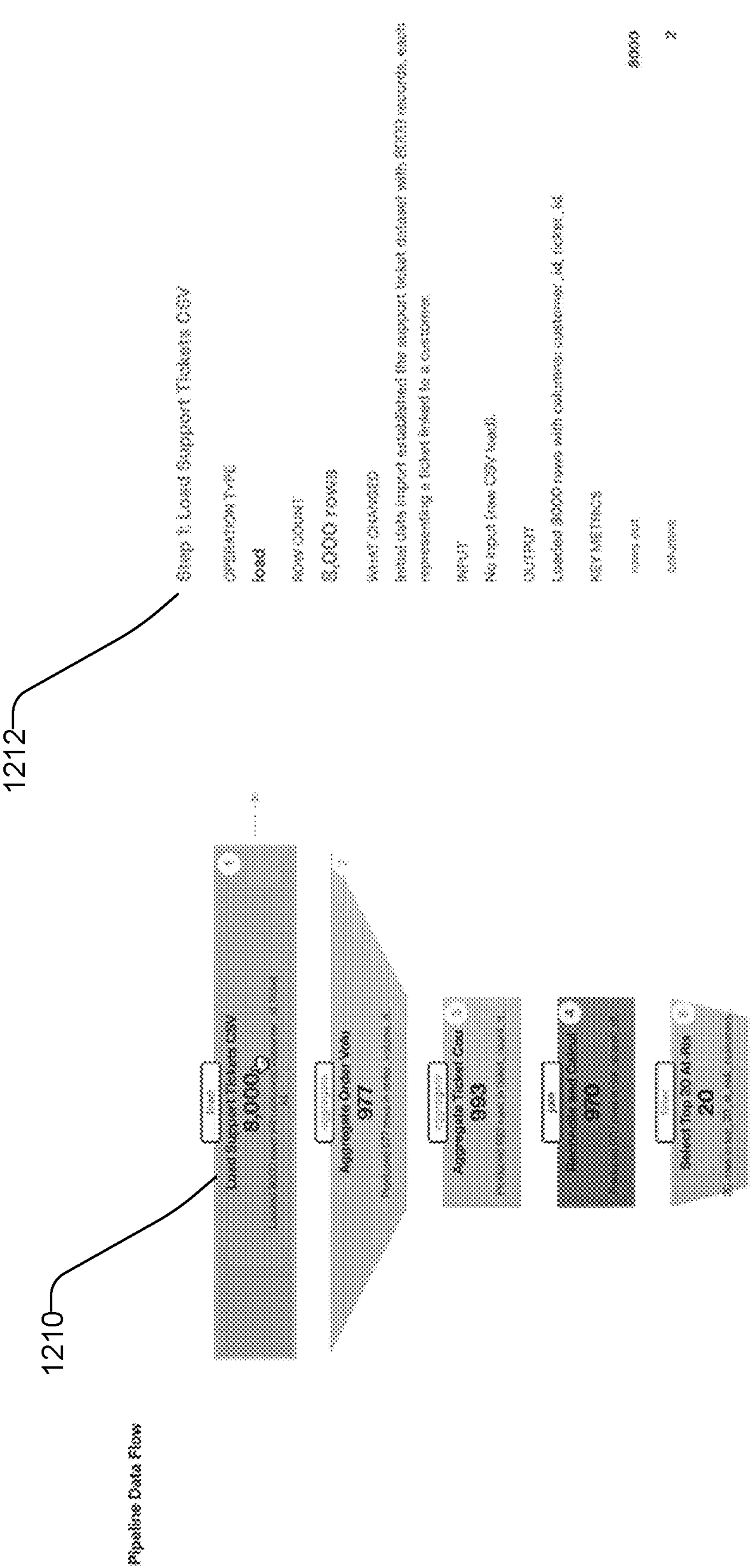
FIG. 12C shows a screenshot of a user interface displaying the pipeline data flow based on a natural language data analytics request, according to an embodiment.

FIG. 12C shows a screenshot of a user interface displaying the pipeline data flow based on a natural language data analytics request, according to an embodiment. The user interface includes a widget 1210 showing the pipeline data flow based on the natural language data analytics request 1202. The user interface shows the details 1212 of an individual step (e.g., step 1 of the execution plan) including input, output, and key metrics based on the step. For example, Step 1 ("Load Support Tickets CSV") has operation type "load" and imports 8,000 rows from a raw CSV file containing columns customer_id and ticket_id. No prior input exists for this step since it is a raw data ingestion. The detail view captures what changed (initial dataset establishment), input sources, output structure, and key metrics such as row count and columns loaded. This information serves as a checkpoint for subsequent verification.

Figure 12D:
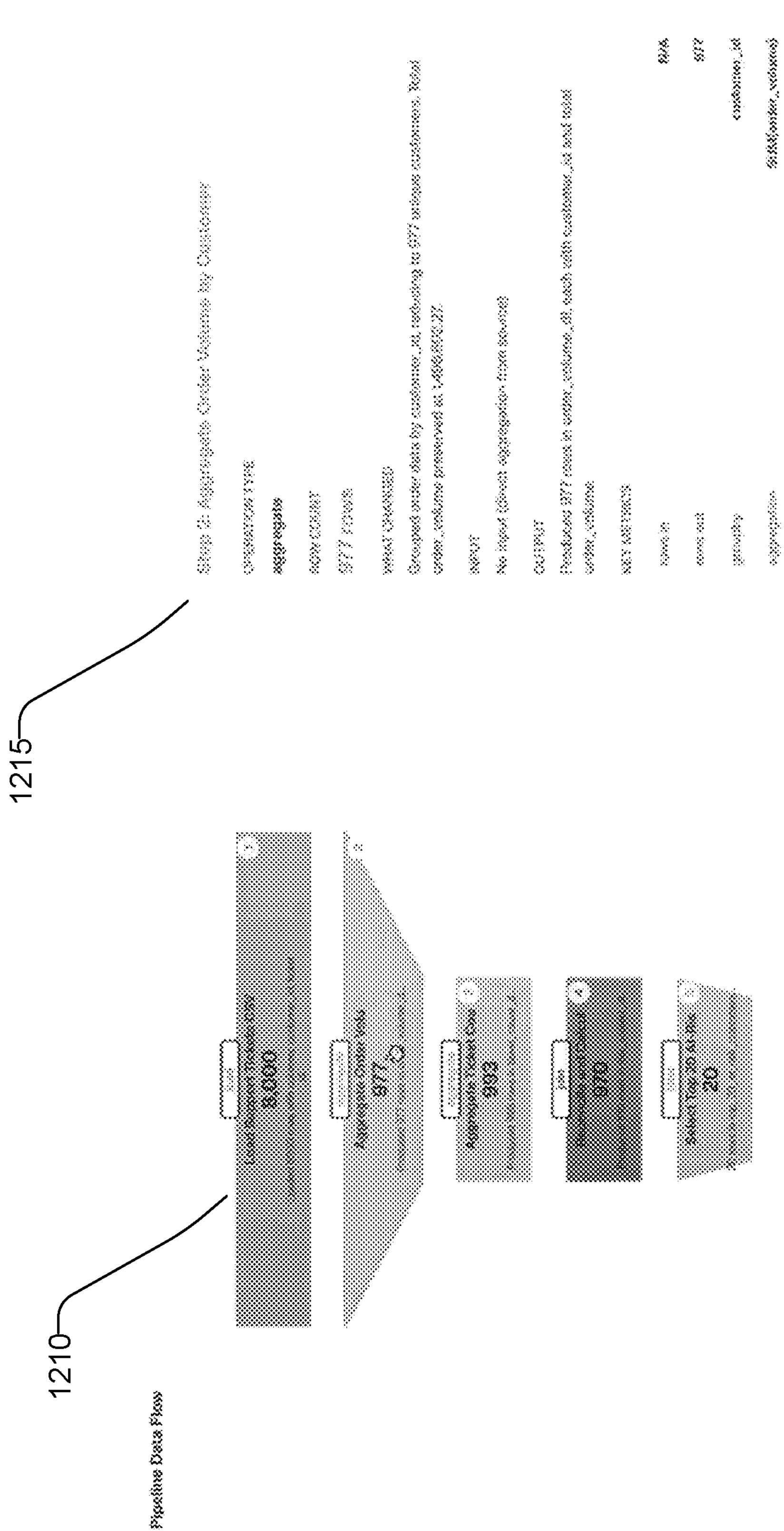
FIG. 12D shows another screenshot of a user interface displaying the pipeline data flow based on a natural language data analytics request, according to an embodiment.

FIG. 12D shows another screenshot of a user interface displaying the pipeline data flow based on a natural language data analytics request, according to an embodiment. FIG. 12D continues the pipeline view in widget 1210, showing Step 2 in detail via widget 1215 ("Aggregate Order Volume by Customer"). This operation type is "aggregate" and reduces the dataset to 977 rows, each representing a unique customer_id with summed order_volume. A key validation metric noted here is the preservation of the total order_volume at 1,496,602.27 after aggregation, ensuring no unintended data loss. The detail view shows grouping criteria (customer_id), aggregation function (SUM(order_volume)), and input/output characteristics, further serving as a verification checkpoint.

Figure 12E:
FIG. 12E shows a verification summary user interface that communicates overall status and lineage-aware context for a completed run.

FIG. 12E shows a verification summary user interface that communicates overall status and lineage-aware context for a completed run. The panel presents the plan objective, a "Verification Passed" indicator with check counts, a concise pipeline summary (steps and row counts), and a brief narrative explaining how the result was obtained, including why row reductions occurred. Controls allow viewing full lineage details and exporting artifacts, offering a high-level, evidence-based snapshot of outcome, coverage, and data flow.

Figure 12F:
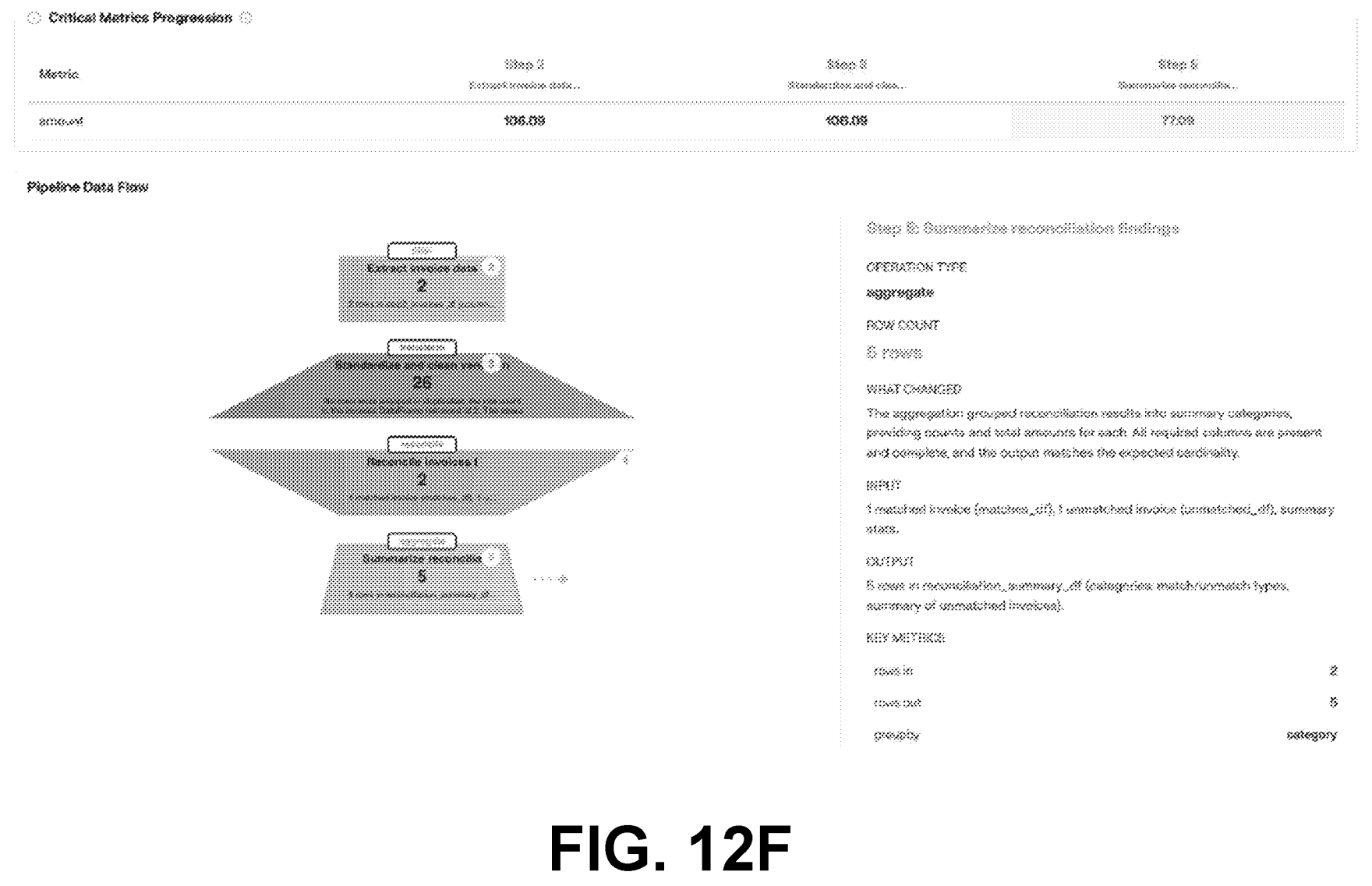

FIG. 12F depicts a detailed step view combining critical metrics progression, pipeline flow, and step-specific metadata. The interface highlights the aggregation step that summarizes reconciliation findings, including operation type, row counts, and "what changed" narrative. Inputs and outputs are enumerated with key metrics such as rows in and rows out, while a visual pipeline trace indicates how upstream steps feed the aggregation, supporting quick assessment of transformation mechanics and data coverage.

Figure 12G:
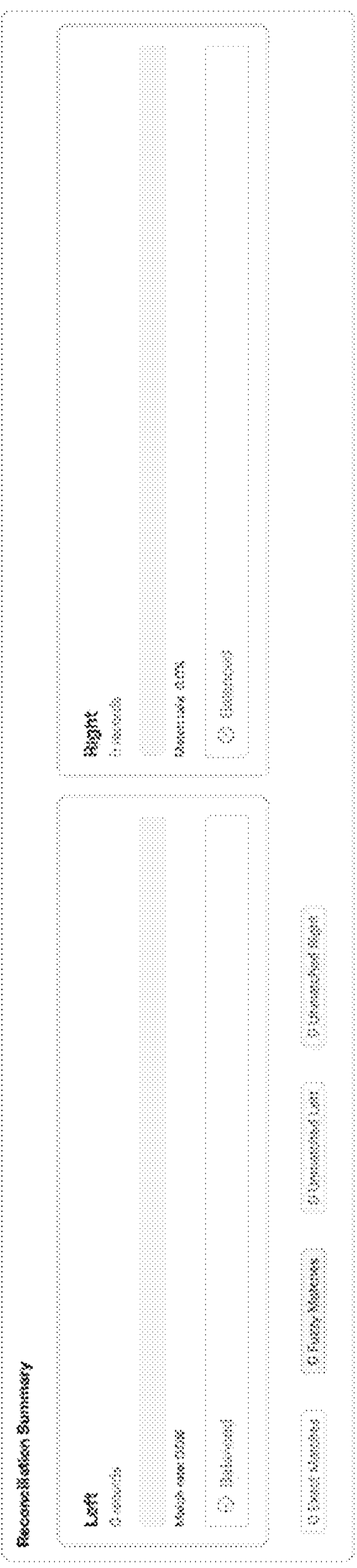
FIG. 12G presents a reconciliation summary visualization that organizes outcomes by category.

FIG. 12G presents a reconciliation summary visualization that organizes outcomes by category. The view separates left and right records and displays matched and unmatched categories, match rates, and counts, providing an at-a-glance breakdown of reconciliation completeness. This summary enables stakeholders to quickly identify where discrepancies reside and which side of the reconciliation they affect, supporting downstream remediation and reporting.

Figure 12H:
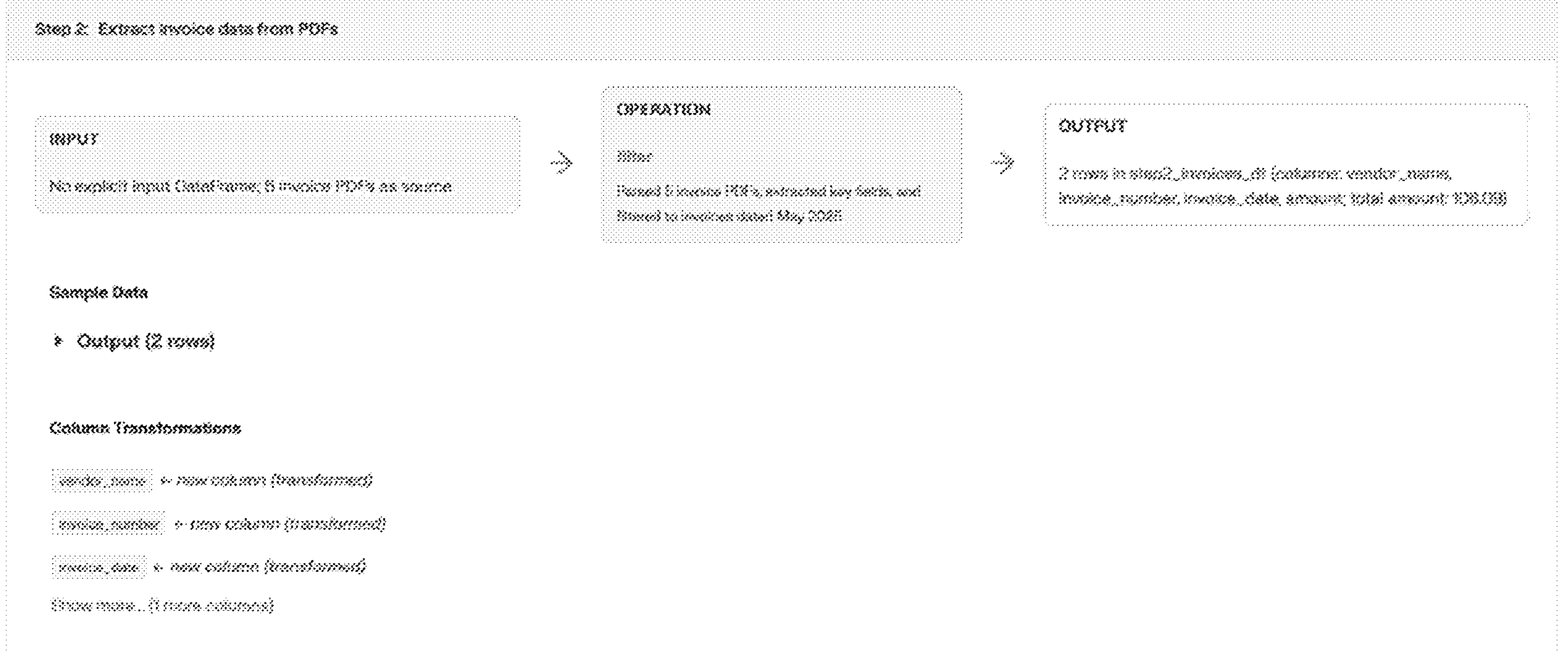
FIG. 12H shows the step view for extracting invoice data from PDFs and applying a date-based filter.

FIG. 12H shows the step view for extracting invoice data from PDFs and applying a date-based filter. The interface indicates that raw PDFs serve as the source, lists the output schema and sample data, and labels the operation as a filter that reduces five invoices to two based on the specified date constraint. Column transformations are cataloged, and the output row count and total amount are surfaced to establish a clear checkpoint for downstream verification and lineage.

Figure 12I:
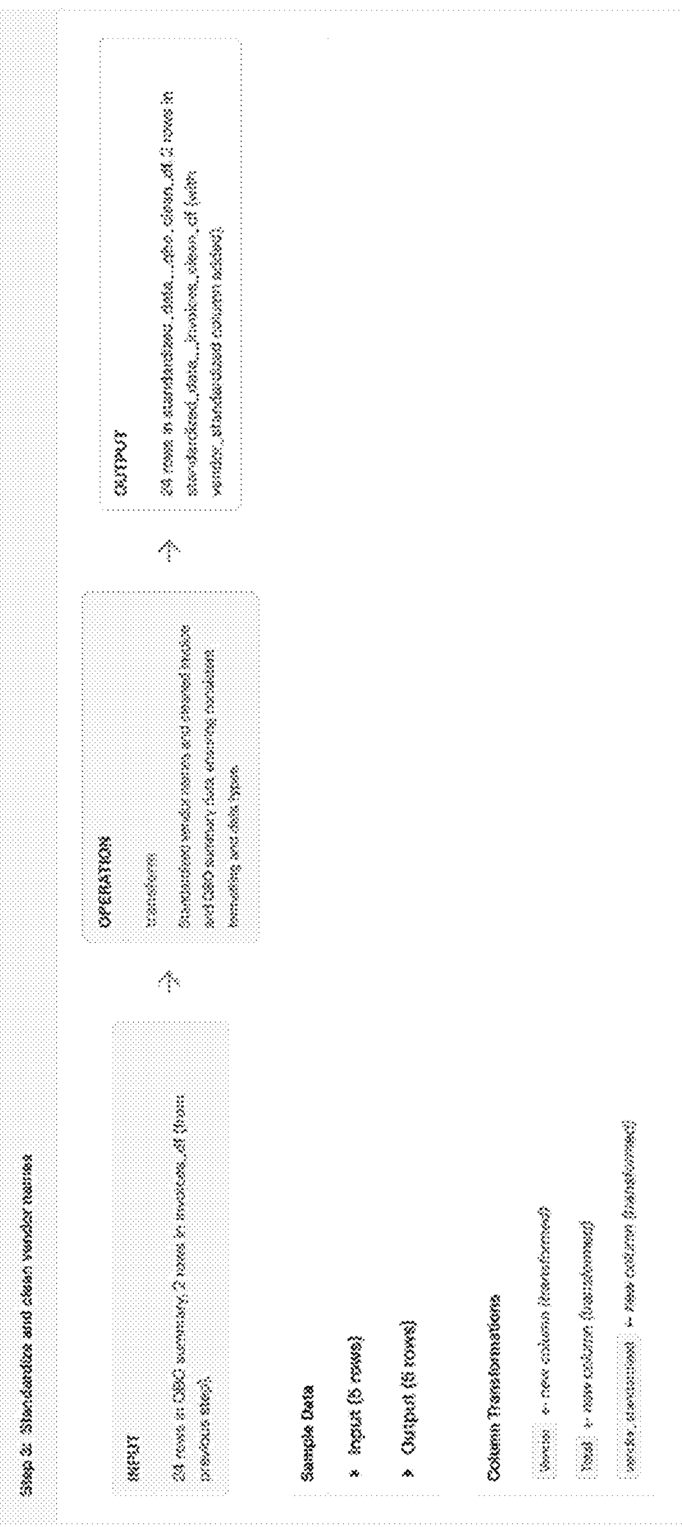
FIG. 12I displays the transformation step that standardizes and cleans vendor names across invoice and summary datasets.

FIG. 12I displays the transformation step that standardizes and cleans vendor names across invoice and summary datasets. The panel lists the inputs from the QBO summary and invoices, shows sample input and output rows, and describes the transformation performed to ensure consistent formatting and data types. Newly added standardized columns are identified, and output row counts per dataset confirm preservation and proper mapping of fields.

Figure 12J:
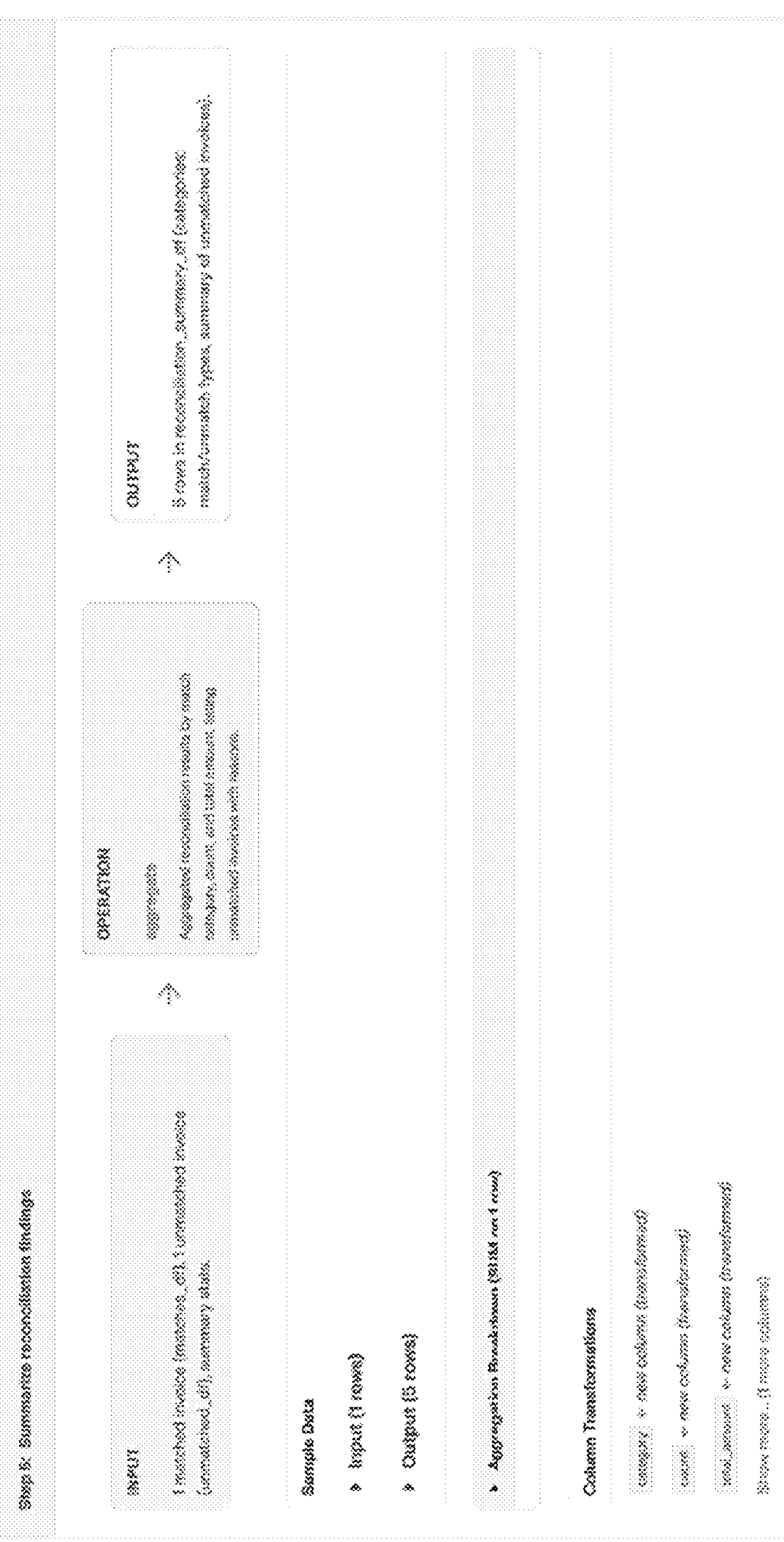
FIG. 12J illustrates the aggregation step that summarizes reconciliation findings into categorized results.

FIG. 12J illustrates the aggregation step that summarizes reconciliation findings into categorized results. The interface enumerates inputs (matched and unmatched sets), shows sample output, and details column transformations such as category, count, and total amount. The operation is labeled as aggregate, and the output structure is reported as six rows covering match/unmatch types and unmatched invoice details, enabling verification of group uniqueness and completeness.

FIG. 12K provides a consolidated step-results panel with pass/fail indicators and a narrative for the final aggregation. The view lists each step with the number of checks passed, marks critical checks, and explains expected behavior for the aggregation, including why the grouped output and required columns meet completeness criteria. Detailed results show expected output size, final output completeness, and debug information, tying verification outcomes to explicit metrics and ensuring traceable, audit-ready confirmation of correctness.

Technical Improvements

The techniques disclosed for verification of analysis results offer several concrete technical improvements to the functioning of computer systems, AI-driven analytics pipelines, and data processing based on machine learning based language models. The system includes a pathway separation architecture that improves computer system security and reliability by isolating verification from generation. Verification agents execute in distinct processes or containers with read-only mounts, separate credentials, and restricted egress, and exchange only signed references and metadata across the boundary. This design eliminates cross-path contamination, prevents raw data leakage into language model pathways, and removes nondeterministic feedback loops where generation and verification would otherwise influence each other, thereby producing more secure and reproducible computations in multi-agent analytical environments.

The system further improves determinism through session pinning with a signed manifest that fixes invariant registry releases, prompt template versions, tool/runtime image digests, canonical sorting rules, and random seeds. By attaching the manifest to all verification artifacts and validating it at each state transition, the system guarantees reproducibility across runs, enables reliable replay of partially completed sessions, and prevents configuration drift that would otherwise undermine verification integrity. This technical mechanism transforms inherently stochastic AI operations into controlled, repeatable workflows that can be audited and re-executed with identical outcomes.

A deterministic invariant registry enhances computational efficiency and reproducibility by centralizing version-controlled invariant definitions, transformation-type mappings, property categories, criticality tags, and per-step caps. Tie-break ordering yields identical invariant sets under cap constraints, while content-addressed templates constrain code synthesis to vetted patterns that are selected based on the execution environment profile. This reduces search and selection variance, lowers compute overhead by capping per-step checks, and ensures that verification logic is stable and repeatable across sessions and deployments.

The system provides comprehensive evidentiary capture via a W7 ontology (What, When, Where, How, Who, Which, Why) at every transformation boundary, persisted with cryptographic digests and lineage links. An optional hash chain anchored to a tamper-evident ledger allows independent verification that records have not been altered. This yields a machine-verifiable provenance graph that improves the computer's ability to audit, reconstruct, and reason over analytical pipelines without accessing raw datasets, thereby enabling privacy-preserving explainability and robust compliance attestation at scale.

A per-step finite-state machine with event-sourced, signed transitions provides fault tolerance and idempotent replay. When a worker fails, the orchestrator reconstructs state from the event log and resumes from the last consistent checkpoint without duplicating effects. This improves system resiliency, reduces the need for expensive full reruns, and guarantees consistent recovery semantics for large verification workloads operating under distributed resource constraints.

The system architecture strengthens runtime trust via isolated, attestable execution. Verification code runs in sandboxes or containers with read-only artifact mounts, restricted networking, and environment digests recorded in the session manifest. Optional remote attestation proves that checks executed in the expected environment. These controls harden the execution stack against tampering, improve reproducibility by fixing runtime characteristics, and enable evidence-backed assurance for regulated deployments.

The system includes a layered explanation engine that produces deterministic, audience-calibrated narratives ("what happened," "how it happened," "why these decisions") that map invariant outcomes and coverage into pipeline-level trust assessments. Pinned narrative templates and canonical ordering prevent variability in explanations across runs, while W7 context integrates business intent with technical evidence without exposing raw data. This improves the computer's ability to generate consistent, reusable explanation artifacts that support governance, audit, and stakeholder decision-making at different depth levels Another technical improvement is the reverse execution plan traversal architecture. Traditional systems validate analytics by re-running queries or relying on user spot-checks, which fail to localize errors without repeated full executions. The system performs an execution plan traversal module that walks backward from the final analytical result to original source inputs, using per-step metadata rather than raw data. This reverse walk, paired with checkpoints dropped during forward execution, enables precise error localization, reduces compute cost, and supports deterministic, reproducible investigations that are technically impossible with forward-only validation.

Another technical improvement is the invariant-driven verification framework. The system maintains a seed library of invariants (e.g., join completeness, aggregation preservation, null-handling correctness) and dynamically selects or generates new invariants using a machine learning based language model based on the operation type and metadata at each step. The system embeds the verification logic directly into the pipeline via machine-generated executable code. Unlike manual or generic validation routines, this invariant-selection process is a technical mechanism that tailors checks to the transformation being validated, enabling broader coverage and automated adaptation to new query patterns.

Another technical improvement is in privacy-preserving prompt generation for verification code synthesis using machine learning based language model. The system includes only metadata (schema names, row counts, null frequencies, transformation parameters, lineage context) in verification prompts, not raw data. This solves a technical problem for organizations that cannot transmit sensitive data to external AI services, while still allowing automated generation of accurate verification code.

Another technical improvement is the discrepancy determination and localization engine, which correlates failed invariants with exact pipeline steps and probable root causes (e.g., wrong join type, unintended data loss) without human review of intermediate datasets. This shortens root-cause analysis from hours/days of manual log inspection to near-real time automated detection.

Another technical improvement is the automated corrective-action recommendation loop, where detected discrepancies are converted into structured inputs to a machine learning based language model to produce executable plan modifications. This performs detection to remediation in a single automated workflow, a capability not present in conventional analytics systems.

Accordingly, the system includes several technical improvements including (1) Improvement of computational efficiency by avoiding full re-execution of pipelines and reducing network transfer to/from the language model service 210. (2) Enhancing determinism and reproducibility in verification code and results generated by machine learning based language model, mitigating the inherent stochasticity of language models. (3) Increasing accuracy of verification through per-operation invariant matching and dynamic invariant generation. (4) Enhancing security and compliance via metadata-only interactions with the machine learning based language model. (5) Enhancing user trust and explainability through structured, lineage-rich verification reports. These improvements alter the way a computer system processes, verifies, and corrects complex multi-step analytics, solving problems tied to machine learning based language model non-determinism, data privacy, and error localization that do not arise in manual methods. The system provides measurable performance, reliability, and compliance benefits.

The system performs tuning of the machine learning based language model for performing tasks such as generation of new invariants and generation of verification code. The tuning of the machine learning based language model may be performed by training the machine learning based language model using domain specific data, for example, proprietary data of an enterprise. Accordingly, the parameters of the machine learning based language model are adjusted based on training data represented by the enterprise data. The system may perform tuning of the model by tuning the prompts representing structured query input that is provided as input to the machine learning based language model. The system tunes the prompt by including context of each step, for example, preceding and subsequent steps in the execution plan.

The techniques disclosed improve the efficiency of execution of analytics reports based on data stored in heterogeneous data stores. The system allows generating context specific data analytics agents that are trained to perform efficiently in specific contexts, for example, for specific types of data sources or for specific vertical industries. The context specific data analytics agents are generated simply by using the system to process several natural language data analytics requests and answering questions generated by the system to guide the system through generation of execution plans. The context specific data analytics agents may be generated without adjusting parameters of a machine learning model. As a result, generation of the data analytics agents is an efficient process compared to training a machine learning based model using gradient descent technique or another technique that adjusts the parameters of the model.

A machine learning based language model may include stochastic components that result in generation of non-deterministic outputs. As a result, a machine learning based language model may generate different responses each time the machine learning based language model is executed for the same input. A different execution plan may be generated each time the machine learning based language model is executed even if the same natural language data analytics request is processed using the same prompt that was previously provided as input to the machine learning based language model. This is a technical problem specific to machine learning based language models that are non-deterministic. The techniques disclosed provide a technical solution to this problem by marking sets of instructions as materialized and modifying the prompts to ensure that the materialized sets of instructions are not changed across executions of the machine learning based language model, even if the remaining execution plan is changed. The processes described herein incrementally mark sets of instructions as materialized as the execution plan is iteratively refined, thereby making the output of the machine learning based language model deterministic at least for specific portions of the execution plans that may be critical to generating the answer. This allows the execution plans to generate consistent reports even if regenerated. A non-deterministic output of reports may not be acceptable for several applications or problem domains.

Furthermore, the materialized sets of instructions of execution plans may be reused across execution plans, thereby allowing new natural language data analytics requests to be processed efficiently and perform data processing in a manner that is consistent with previously generated reports. For example, if a natural language data analytics request is modified to change certain parts of the data analysis, the system ensures that the remaining parts of the data analysis use stored sets of instructions that were marked as materialized. That way the generation of the execution plan for the new natural language data analytics request is efficient due to reuse of the computational effort that was previously performed. Furthermore, the result of execution of the new natural language data analytics requests based on the new execution plan is consistent with previously executed natural language data analytics requests in spite of variations in the requests. For example, a change in one step of the analysis does not cause a nondeterministic machine learning based language model to generate a different execution plan that uses different sets of instructions for individual steps compared to previously generated sets of instructions.

The system further provides a representation for storing instructions representing policy constraints of an organization. The system provides a mechanism to efficiently determine the impact of changing policy constraints for an organization. Conventional techniques are unable to accurately determine the impact of making changes to policy constraints, thereby resulting in significant consumption of resources in enforcing the changes. The system allows efficiently identifying the data sets that are impacted by a policy constraint change. The system further allows identifying sets of instructions that need to be regenerated. As a result, the system improves the efficiency of implementing changes to policy constraints. Conventional techniques may require regeneration of more datasets than needed or regeneration of more execution plans than are impacted by the policy constraint change, thereby wasting computing and other resources.

ADDITIONAL CONSIDERATIONS

The foregoing description of the embodiments has been presented for the purpose of illustration; many modifications and variations are possible while remaining within the principles and teachings of the above description. Embodiments comprise computer-implemented methods comprising steps of processes described herein. Embodiments comprise non-transitory computer readable storage medium storing instructions that when executed by one or more computer processors cause the one or more computer processors to perform steps of methods disclosed herein. Embodiments comprise computer system comprising one or more computer processors and a non-transitory computer readable storage medium storing instructions that when executed by one or more computer processors cause the one or more computer processors to perform steps of method disclosed herein.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:

receiving, by an online system, a natural language data analytics request based on data stored in one or more data sources;

generating an execution plan comprising a plurality of ordered data processing steps for generating an analytical result based on the natural language data analytics request, each step having an input data, an output data, and metadata;

verifying execution of the execution plan, by traversing the execution plan in reverse order from the analytical result toward steps for receiving data from the one or more data sources, comprising, for a step encountered while traversing the execution plan in reverse order:

identifying, a set of invariants applicable to the step, wherein each invariant defines expected properties or relationships between the input data and the output data of the step, generating a first structured query input for a machine learning based language model, the first structured query input describing the step and the set of invariants identified, generating, via the machine learning based language model, executable verification code based on the first structured query input, and executing the executable verification code to determine whether the step satisfies the set of invariants identified;

detecting one or more discrepancies between expected and actual outputs for each step; and recommending a modification to the execution plan, comprising:

generating a second structured query input describing the one or more discrepancies and a context comprising information describing steps of the execution plan associated with the one or more discrepancies, sending the second structured query input for execution to the machine learning based language model, and determining, from a response generated by executing the machine learning based language model, a recommended modification to the execution plan.

2. The computer-implemented method of claim 1, further comprising, identifying a set of invariants applicable to a particular step, comprising:

accessing a library of seed invariants derived from prior analyses of data analytics execution plans;

selecting one or more seed invariants from the library based on the step;

generating a structured query input for the machine learning based language model describing the step and the one or more seed invariants; and generating, from a response received by processing the structured query input using the machine learning based language model, a new invariant to address conditions specific to the step.

3. The computer-implemented method of claim 1, wherein identifying the set of invariants comprises selecting combinations of two or more invariants based on a type of data transformation performed in the step, including at least one of:

join operations, aggregation operations, filtering operations, and data type conversions.

4. The computer-implemented method of claim 1, wherein the metadata for the step comprises at least one of: column names, expected data types, cardinality information, row counts, or key uniqueness constraints.

5. The computer-implemented method of claim 1, wherein generating the first structured query input for the machine learning based language model further comprises including contextual information from at least one preceding step and at least one succeeding step in the execution plan to provide context for verification.

6. The computer-implemented method of claim 1, wherein executing the executable verification code comprises performing one or more checks selected from:

completeness of data joins, correctness of input columns, preservation or expected change of row counts, aggregation accuracy, mathematical consistency checks, and detection of null or missing values.

7. The computer-implemented method of claim 1, wherein detecting discrepancies further comprises:

identifying a location within the execution plan where a discrepancy occurred, and generating a verification report comprising lineage of intermediate results, invariants tested at each step, and any failed checks.

8. The computer-implemented method of claim 1, further comprising:

presenting via a graphical user interface, a discrepancy map showing failed verification steps of the execution plan.

9. The computer-implemented method of claim 1, further comprising:

storing intermediate verification outcomes during forward execution of the execution plan as checkpoint data for use in verifying execution of the execution plan.

10. A non-transitory computer readable storage medium storing instructions that when executed by one or more computer processors cause the one or more computer processors to perform steps comprising:

receiving, by an online system, a natural language data analytics request based on data stored in one or more data sources;

generating an execution plan comprising a plurality of ordered data processing steps for generating an analytical result based on the natural language data analytics request, each step having an input data, an output data, and metadata;

verifying execution of the execution plan, by traversing the execution plan in reverse order from the analytical result toward steps for receiving data from the one or more data sources, comprising, for a step encountered while traversing the execution plan in reverse order:

identifying, a set of invariants applicable to the step, wherein each invariant defines expected properties or relationships between the input data and the output data of the step, generating a first structured query input for a machine learning based language model, the first structured query input describing the step and the set of invariants identified, generating, via the machine learning based language model, executable verification code based on the first structured query input, and executing the executable verification code to determine whether the step satisfies the set of invariants identified;

detecting one or more discrepancies between expected and actual outputs for each step; and recommending a modification to the execution plan, comprising:

generating a second structured query input describing the one or more discrepancies and a context comprising information describing steps of the execution plan associated with the one or more discrepancies, sending the second structured query input for execution to the machine learning based language model, and determining, from a response generated by executing the machine learning based language model, a recommended modification to the execution plan.

11. The non-transitory computer readable storage medium of claim 10, wherein the instructions when executed, further cause the one or more computer processors to perform steps comprising:

identifying a set of invariants applicable to a particular step, comprising:

accessing a library of seed invariants derived from prior analyses of data analytics execution plans;

selecting one or more seed invariants from the library based on the step;

generating a structured query input for the machine learning based language model describing the step and the one or more seed invariants; and generating, from a response received by processing the structured query input using the machine learning based language model, a new invariant to address conditions specific to the step.

12. The non-transitory computer readable storage medium of claim 10, wherein identifying the set of invariants comprises selecting combinations of two or more invariants based on a type of data transformation performed in the step, including at least one of:

join operations, aggregation operations, filtering operations, and data type conversions.

13. The non-transitory computer readable storage medium of claim 10, wherein generating the first structured query input for the machine learning based language model further comprises including contextual information from at least one preceding step and at least one succeeding step in the execution plan to provide context for verification.

14. The non-transitory computer readable storage medium of claim 10, wherein executing the executable verification code comprises performing one or more checks selected from:

completeness of data joins, correctness of input columns, preservation or expected change of row counts, aggregation accuracy, mathematical consistency checks, and detection of null or missing values.

15. The non-transitory computer readable storage medium of claim 10, wherein detecting discrepancies further comprises:

identifying a location within the execution plan where a discrepancy occurred, and generating a verification report comprising lineage of intermediate results, invariants tested at each step, and any failed checks.

16. The non-transitory computer readable storage medium of claim 10, wherein the instructions when executed, further cause the one or more computer processors to perform steps comprising:

storing intermediate verification outcomes during forward execution of the execution plan as checkpoint data for use in verifying execution of the execution plan.

17. A computer system comprising:

one or more computer processors; and a non-transitory computer readable storage medium storing instructions that when executed by one or more computer processors cause the one or more computer processors to perform steps comprising:

receiving, by an online system, a natural language data analytics request based on data stored in one or more data sources;

generating an execution plan comprising a plurality of ordered data processing steps for generating an analytical result based on the natural language data analytics request, each step having an input data, an output data, and metadata;

verifying execution of the execution plan, by traversing the execution plan in reverse order from the analytical result toward steps for receiving data from the one or more data sources, comprising, for a step encountered while traversing the execution plan in reverse order:

identifying, a set of invariants applicable to the step, wherein each invariant defines expected properties or relationships between the input data and the output data of the step, generating a first structured query input for a machine learning based language model, the first structured query input describing the step and the set of invariants identified, generating, via the machine learning based language model, executable verification code based on the first structured query input, and executing the executable verification code to determine whether the step satisfies the set of invariants identified;

detecting one or more discrepancies between expected and actual outputs for each step; and recommending a modification to the execution plan, comprising:

generating a second structured query input describing the one or more discrepancies and a context comprising information describing steps of the execution plan associated with the one or more discrepancies, sending the second structured query input for execution to the machine learning based language model, and determining, from a response generated by executing the machine learning based language model, a recommended modification to the execution plan.

18. The computer system of claim 17, wherein the instructions when executed, further cause the one or more computer processors to perform steps comprising:

identifying a set of invariants applicable to a particular step, comprising:

accessing a library of seed invariants derived from prior analyses of data analytics execution plans;

selecting one or more seed invariants from the library based on the step;

generating a structured query input for the machine learning based language model describing the step and the one or more seed invariants; and generating, from a response received by processing the structured query input using the machine learning based language model, a new invariant to address conditions specific to the step.

19. The computer system of claim 17, wherein identifying the set of invariants comprises selecting combinations of two or more invariants based on a type of data transformation performed in the step, including at least one of:

join operations, aggregation operations, filtering operations, and data type conversions.

20. The computer system of claim 17, wherein executing the executable verification code comprises performing one or more checks selected from:

completeness of data joins, correctness of input columns, preservation or expected change of row counts, aggregation accuracy, mathematical consistency checks, and detection of null or missing values.

* * * * *